US008365300B2

(12) United States Patent
Senshu

(10) Patent No.: US 8,365,300 B2
(45) Date of Patent: Jan. 29, 2013

(54) INFORMATION PROCESSING DEVICE, DISC, INFORMATION PROCESSING METHOD, AND PROGRAM

(75) Inventor: Susumu Senshu, Kanagawa (JP)

(73) Assignee: Sony Corporation, Tokyo (JP)

( * ) Notice: Subject to any disclaimer, the term of this patent is extended or adjusted under 35 U.S.C. 154(b) by 688 days.

(21) Appl. No.: 12/417,209

(22) Filed: Apr. 2, 2009

(65) Prior Publication Data
US 2009/0282257 A1 Nov. 12, 2009

(30) Foreign Application Priority Data
May 8, 2008 (JP) .................... 2008-121907

(51) Int. Cl.
*G06F 21/00* (2006.01)
(52) U.S. Cl. ........................................ 726/27
(58) Field of Classification Search .............. 713/182; 726/27, 31, 26, 30; 720/718, 719; 380/202
See application file for complete search history.

(56) References Cited

U.S. PATENT DOCUMENTS

| 6,044,046 A | * | 3/2000 | Diezmann et al. | 369/14 |
| 7,810,162 B2 | * | 10/2010 | Lee et al. | 726/27 |
| 8,031,869 B2 | * | 10/2011 | Yamaoka et al. | 380/202 |
| 2007/0104054 A1 | | 5/2007 | Senshu | |
| 2009/0092019 A1 | | 4/2009 | Senshu | |

FOREIGN PATENT DOCUMENTS

| JP | 6-131806 A | | 5/1994 |
| JP | 2003-132623 A | | 5/2003 |
| JP | 2005-85418 A | | 3/2005 |
| JP | 2005-316994 | | 11/2005 |
| JP | 2005316994 A | * | 11/2005 |
| JP | 2007-133608 | | 5/2007 |
| WO | WO 00/74046 A1 | | 12/2000 |

* cited by examiner

*Primary Examiner* — Ali Abyaneh
(74) *Attorney, Agent, or Firm* — Oblon, Spivak, McClelland, Maier & Neustadt, L.L.P.

(57) ABSTRACT

An information processing device includes: a usage permission requesting unit configured to read out data from an IC chip in which the usage control information of a disc recorded content to confirm the validity of the usage control information; and a usage execution unit configured to perform usage of the disc recorded content in accordance with a usage permission mode recorded in the usage control information on condition that the validity of the usage control information has been confirmed by the usage permission requesting unit.

19 Claims, 31 Drawing Sheets

INFORMATION PROCESSING DEVICE, DISC, INFORMATION PROCESSING METHOD, AND PROGRAM

BACKGROUND OF THE INVENTION

1. Field of the Invention

The present invention relates to an information processing device, disc, information processing method, and program, and further specifically, relates to an information processing device, disc, information processing method, and program, which include a configuration whereby usage control of a content recorded in an information recording medium can be performed.

The present invention further relates to an information processing device, disc, information processing method, and program, which have a configuration wherein activation processing of usage control information of a content recorded in an information recording medium is executed to determine whether or not the usage control information is activated, and in a case where the usage control information is activated, usage of the usage control information is performed.

2. Description of the Related Art

Discs such as DVD (Digital Versatile Disc), Blu-ray Disc (registered trademark), and so forth have been employed as content recording media. For example, various types of content such as a movie content or the like is recorded in a disc (e.g., ROM disc), and is provided to a user. Such a disc recorded content is frequently a content of which the copyright and distribution right and so forth are possessed by a creator or vendor. With regard to such a content, a certain usage control configuration has been employed to prevent, for example, unauthorized copying and so forth.

There is AACS (Advanced Access Content System) as specification regarding contents copyright protection. AACS stipulates, for example, copyright protection technology employing, for example, the AES encryption or the like.

According to the AACS standard, for example in a case where content reproduction, copy processing, or the like is performed from a disc, identification information recorded in a disc, e.g., a PMSN (Pre-recorded Media Serial Number) which is identification unique to a disc, has to be read. Further, processing in accordance with the sequence stipulated by AACS, e.g., authentication processing and encryption processing have to be performed. With the content recorded disc in accordance with the AACS standard, the PMSN which is identification information unique to a disc is recorded in a BCA (Burst Cutting Area) of the disc, and processing employing this identification information is requested.

The BCA region is a region different from a normal data recording region, where data is recorded by physical cutting different from a normal data recording method. Accordingly, rewriting is difficult for the recorded data in the BCA region, and with reproduction processing as well, particular reading processing different from normal data reproduction processing is employed.

Description will be made regarding an example of a processing sequence in the case of the reproduction processing of a disc recorded content in accordance with the AACS standard, or in a case where a content is copied to another medium such as a hard disk or the like, with reference to FIGS. 1 and 2.

FIG. 1 is a diagram describing a disc recorded content reproducing sequence in accordance with the AACS standard. FIG. 1 illustrates from the left a disc (information recording medium) 10 in which a content is stored, a drive 20 on which the disc 10 is mounted to perform reading of data, and a host 30 which obtains recorded data of the disc 10 through the drive 20 to perform content decoding and reproducing processing. Note that though the drawing illustrates the drive 20 and host 30 as separate configurations, the drive and host may have an integral configuration of one device, for example, such as a reproducing device or the like. The disc 10 at the left end is, for example, a disc 10 compatible with the AACS standard, wherein a content such a movie has been recorded as an encrypted content 17 beforehand.

A content ID 14 which is identification information of the encrypted content 17, a volume ID 15 serving as a manufacturing serial No. of the disc 10, and a PMSN (Pre-recorded Media Serial Number) serving as a media ID 16 which is identification information unique to a disc are recorded in the disc 10. Note that the content ID 14 is not recorded in some cases, and accordingly is described with parentheses as (content ID) in the drawing. Also, the media ID (PMSN) is recorded in the BCA region as described above.

The disc 10 further stores a script 11 which is a simple program for executing reproduction or copying processing in accordance with the AACS standard, a URL 12 of a server to be connected to obtain permission of copying processing, for example, at the time of copying processing of a disc recorded content, and an MKB (Media Key Block) 13 which is an encryption key block where key information to be applied to decoding processing of the encrypted content 17.

The MKB (Media Key Block) 13 is encryption information (encryption key) block to be generated based on a tree-structured key distribution method known as one mode of the broadcast encryption method. The MKB 13 is an encryption information block where a media key [Km] which is a key for decoding of a content is encrypted and stored, and the media key [Km] can be obtained by processing employing a device key [Kd] stored in a user device having a valid license.

The drive 20 includes key data 21 including a public key of the AACS management center, a drive public key, and a drive secret key, and a host revocation list 22. The host revocation list 22 is a list in which the identification information of a host determined to be an unauthorized host by the AACS management center is recorded, i.e., a blacklist. For example, the identification number of a host public key certificate corresponding to the host is recorded as the identification information of the host. A signature by the secret key of the AACS management center is added to the host revocation list 22 so as to prevent tampering.

The host 30 includes key data 31 including a public key of the AACS management center, a host public key, and a host secret key, and a drive revocation list 32. The drive revocation list 32 is a list in which the identification information of a drive determined to be an unauthorized drive device by the AACS management center is recorded, i.e., a blacklist. For example, the identification number of a drive public key certificate corresponding to the drive is recorded as the identification information of the drive. A signature by the secret key of the AACS management center is added to the drive revocation list 32 so as to prevent tampering. Note that an arrangement may be made wherein the host revocation list 22 and drive revocation list 32 are recorded in the disc 10, and the drive 20 and host 30 read and employ the data recorded in the disc 10.

Description will be made regarding a sequence in the case of the host 30 performing reproduction of a content. The host 30 and drive 20 first execute authentication processing between an authentication processing unit 22 of the host 30 and an authentication processing unit 23 of the drive 20. This authentication processing is executed in accordance with the processing sequence stipulated by AACS. With this processing, principal processes executed by each device are as follows.

The drive 20 reads out the host revocation list 22, employs the public key of the AACS management center to perform signature verification of the host revocation list 22, thereby confirming that there is no tampering, and confirming that the identification information of the host 30 has not been described in the host revocation list 22, i.e., that the host 30 has not been revoked.

The host 30 also reads out the drive revocation list 32, employs the public key of the AACS management center to perform signature verification of the drive revocation list 32, thereby confirming that there is no tampering, and confirming that the identification information of the drive 20 has not been described in the drive revocation list 32, i.e., that the drive 20 has not been revoked.

In a case where determination is made that both of the drive 20 and host 30 have not been revoked, communication of encrypted data in accordance with the AACS standard is executed between the drive 20 and host 30, and a shared secret key is generated, and is shared between the drive 20 and host 30.

Upon authentication between the host and drive being completed, the drive 20 reads out the media ID (PMSN) 16 from the disc 10, executes MAC generation processing to which the shared key generated at the authentication processing is applied, at an MAC calculating unit 24, and transmits the generated MAC value and media ID (PMSN) 16 to the host 30.

Note that, as described above, the media ID (PMSN) 16 has to be recorded in the BCA region different from a normal data recording region, and has to be subjected to particular reading processing different from normal data reproduction processing.

An MAC calculating unit 34 of the host 30 executes MAC verification processing to which the shared key generated at the time of the authentication processing is applied. Specifically, the MAC calculating unit 34 subjects the media ID received from the drive 20 MAC generation processing to which the shared key is applied, and compares the generated MAC value and the MAC value received from the drive 20. In a case where the two MAC values are matched, determination is made that verification has succeeded, and an encryption processing module 36 executes content decoding and reproducing processing in accordance with the AACS standard.

With the content decoding in accordance with the AACS standard executed at the encryption processing module 36, according to the processing of the MKB 13 to which the device key [Kd] 35 is applied, a media key [Km] is obtained from the MKB 13, and according to the processing to which the media key [Km] is applied, a key for content decoding is obtained, and accordingly, content decoding processing is executed.

Next, description will be made regarding a copy processing sequence of a disc recorded content as to another medium, for example, such as a hard disk or the like, with reference to FIG. 2. At the time of copying of a disc recorded content in accordance with the AACS standard, copy permission information has to be obtained from the administrative server in accordance with the AACS standard. Copy processing based on this permission is referred to as managed copy.

FIG. 2 illustrates from the left an administrative server 50 which outputs copy permission information, an information processing device 40 which executes copy processing, and a disc 10 in which a content to be copied is stored. Note that the information processing device 40 is a device having both functions of the host and drive described with reference to FIG. 1. The disc 10 is a disc compatible with the AACS standard as with the disc 10 described with reference to FIG. 1, in which a content such as a movie content or the like is recorded as the encrypted content 17. The other information of the disc 10 is the same information as described with reference to FIG. 1.

In the case of copying the encrypted content 17 recorded in the disc 10 to a recording medium 44, e.g., a recording medium 44 such as a hard disk included in the information processing device 40, the information processing device 40 causes a script execution unit 41 to execute a script 11 (simple program) recorded in the disc 10 to obtain copy permission information from the administrative server 50.

A program for executing a series of procedures at the time of executing copy processing is recorded in the script 11. A copy permission requesting unit 42 of the information processing device 40 reads the media 10 (PMSN) 16, or the content ID 14 and media ID (PMSN) 16 from the disc 10, and transmits the ID information thereof to the administrative server 50 in accordance with the URL 12 recorded in the disc 10. Note that, as described above, the media ID (PMSN) 16 has to be recorded in the BCA region different from a normal data recording region, and has to be subjected to particular reading processing different from normal data reproduction processing.

A copy permission determining unit 51 of the administrative server 50 receives the media ID (PMSN) 16, or the content ID 14 and media ID (PMSN) 16 from the information processing device 40, confirms a recorded disc, or confirms a content to be copied and a recorded disc thereof, and determines whether or not copying is permitted. The administrative server 50 holds copy permission information in increments of discs or in increments of discs and contents. For example, information is held such that a content A in a particular disc is a content which permits one-time copy processing.

The copy permission determining unit 51 of the administrative server 50 determines in accordance with such copy permission information whether to permit the copy request from the information processing device 40, and informs the information processing device 40 of copy validity determination information through a copy permission notification unit 52.

Upon receiving the copy permission information from the administrative server 50, the information processing device 40 causes the copy execution unit 43 to read the encrypted content 17 recorded in the disc 10, and execute processing for copying the encrypted content 17 to a recording medium 44 such as a hard disk or the like included in the information processing device 40. Note that at the time of this copy processing, decoding processing of the encrypted content 17 is executed, whereby this content can be recorded as a decoded content, and in this case, the MKB 13 and volume ID 15 are read from the disc 10, such read data is employed to execute a decoding sequence in accordance with the AACS standard, and the obtained decoded content is recorded in the recording medium 44.

Description has been made so far regarding the reproduction processing of a disc recorded content, and a copy processing sequence of a disc recorded content, in accordance with the AACS standard, with reference to FIGS. 1 and 2.

SUMMARY OF THE INVENTION

However, as can be clearly understood from the above description, existing sequences have a problem in that reproducing a disc and reading data from the BCA region are necessary, and accordingly, the processing load before starting the reproduction or copy processing of a content is great, and also time for such processing increases.

Japanese Unexamined Patent Application Publication No. 2007-133608 is an example of the related art in which is disclosed an arrangement wherein a portion of data is not recorded in a disc but stored in a device capable of high-speed data reading, e.g., an IC chip capable of proximity communication with a high frequency. Japanese Unexamined Patent Application Publication No. 2007-133608 has disclosed therein an arrangement wherein an IC chip is embedded in an optical disc, and in order to install software recorded in the optical disc, the identification information and usage control information of the software are stored in the IC chip, and the stored information of the IC chip is employed to execute pre-processing before installation of the software. Also, Japanese Unexamined Patent Application Publication No. 2005-316994 has disclosed therein an arrangement wherein a RFID tag is embedded in an optical disc, and key information is recorded in the RFID tag.

Note that with the content copy processing described with reference to FIG. 2, an arrangement has to be made wherein the information processing device of a user is connected to the administrative server, and the content ID and media ID (PMSN) recorded in a disc to the administrative server. In this case, the information processing device of the user has to obtain copy permission information from the administrative server. In other words, if the information processing device fails to connect to the administrative server, the information processing device fails to perform copy processing. Accordingly, this results in a problem wherein a device having no server connection function fails to execute copy processing and so forth. This problem is not solved even with the related art disclosed in Japanese Unexamined Patent Application Publication Nos. 2007-133608 and 2005-316994.

It has been found desirable to provide an information processing device, disc, information processing method, and program whereby connection to the administrative server can be omitted, and accordingly, rapid and sure content usage control can be performed by employing an arrangement wherein at the time of content usage processing such as reproduction processing or copy processing or the like of a disc recorded content, content usage in accordance with usage control information stored in a IC chip embedded in the disc is executed.

An according to an embodiment of the present invention, an information processing device includes: a usage permission requesting unit configured to read out data from an IC chip in which the usage control information of a disc recorded content to confirm the validity of the usage control information; and a usage execution unit configured to perform usage of the disc recorded content in accordance with a usage permission mode recorded in the usage control information on condition that the validity of the usage control information has been confirmed by the usage permission requesting unit.

The usage permission requesting unit may determine whether or not a flag indicating validity is set to the usage control information, or whether or not a code indicating that the usage control information is valid is recorded in the usage control information to execute confirmation of the validity of the usage control information.

The usage permission requesting unit may determine whether or not data indicating the validity of usage control information is recorded in the IC chip to execute confirmation of the validity of the usage control information.

Data indicating the validity of the usage control information may be a volume ID serving as identification information which is set for every predetermined manufacturing increment of the disc.

Data indicating the validity of the usage control information may be the generating information of an encryption key to be applied to decoding processing of the disc recorded content.

The usage control information may include encryption key generating information to be applied to decoding of the disc recorded content, and in a case where the usage control information is valid, the usage control information includes the generating information of an encryption key to succeed at decoding of the disc recorded content.

The generating information of the encryption key may be a volume ID serving as identification information which is set for every predetermined manufacturing increment of the disc.

The IC chip may be configured so as to record at least either a content ID which is the identifier of a disc recorded content or a media ID which is an identifier unique to a disc, with the usage permission requesting unit determining a content to be used by employing at least either the content ID or media ID read out from the IC chip.

The information processing device may further include an authentication processing unit configured to execute authentication processing, with the authentication processing unit performing authentication processing with an authentication processing unit configured within the IC chip, and with the information processing device being configured so as to execute usage processing of recorded data of the IC chip or disc on condition of success in the authentication processing.

The usage permission requesting unit may be configured so as to perform confirmation processing of the validity of the usage control information on condition of success in the authentication processing.

The usage permission requesting unit may be configured so as to execute validity confirmation processing of the usage control information in accordance with a program stored in the disc recorded content.

The information processing device may further include a signature verifying unit configured to execute signature verification set in a program stored in the disc recorded content, with the usage permission requesting unit being configured so as to execute validity confirmation processing of the usage control information in accordance with the program on condition that the validity of the program has been confirmed by the signature verification.

The disc recorded content may be software to be installed in the information processing device, and the usage control information is usage control information corresponding to the software, with the usage execution unit being configured so as to perform installation of the software in accordance with a usage permission mode recorded in the usage control information on condition that the validity of the usage control information has been confirmed by the usage permission requesting unit.

The IC chip may be configured integrally with the disc.

The IC chip may be configured separately from the disc.

According to an embodiment of the present invention, an information processing device includes an activation execution unit configured to execute activation processing of usage control information which is set according to a disc recorded content, with the activation execution unit being configured so as to write activation information of the usage control information in an IC chip set according to the disc.

According to an embodiment of the present invention, an IC chip usage has recorded therein control information corresponding to a content recorded in a disc, with the IC chip being configured to store validity determination data for determining the validity of the usage control information, and with usage of a disc recorded content in accordance with the usage control information being able to be performed on condition that at the time of employing a disc recorded content with an information processing device, determination has been made that the usage control information has validity by executing reading of validity determination data from the IC chip, and executing validity determination processing.

According to an embodiment of the present invention, with a disc in which a program is stored, the program includes the steps of: causing a usage permission requesting unit of an information processing device to read out data from an IC chip in which usage control information of a disc recorded content is recorded to conform the validity of the usage control information, which is referred to as a usage permission requesting step; and causing a usage execution unit of the information processing device to perform usage of the disc recorded content in accordance with a usage permission mode recorded in the usage control information on condition that the validity of the usage control information has been confirmed in the usage permission requesting step.

According to an embodiment of the present invention, with a disc in which a program is stored, the program includes a step of: causing an activation execution unit of an information processing device to execute activation processing of usage control information which is set according to a disc recorded content, which will be referred to as an activation execution step, with the activation execution step being a step for causing the activation execution unit of the information processing device to perform writing of activation information of the usage control information in an IC chip which is set according to the disc.

According to an embodiment of the present invention, an information processing method executed with an information processing device, includes the steps of: causing a usage permission requesting unit to read out data from an IC chip in which usage control information of a disc recorded content is recorded to conform the validity of the usage control information, which is referred to as a usage permission requesting step; and causing a usage execution unit to perform usage of the disc recorded content in accordance with a usage permission mode recorded in the usage control information on condition that the validity of the usage control information has been confirmed in the usage permission requesting step.

According to an embodiment of the present invention, an information processing method executed with an information processing device, includes a step of: causing an activation execution unit to execute activation processing of usage control information which is set according to a disc recorded content, which will be referred to as an activation execution step, with the activation execution step being a step for causing the activation execution unit of the information processing device to perform writing of activation information of the usage control information in an IC chip which is set according to the disc.

Note that a program according to the present invention is, for example, a computer program which can be provided with a recoding medium or the like in a computer-readable form as to a system capable of executing various types of program code. Such a program is provided in a computer-readable form, thereby realizing processing according to the program on an information processing device.

Further objects, features, and advantages of the present invention will become apparent from the later-described embodiments of the present invention and the attached drawings. Note that system as used in the present specification is a logical group configuration of multiple devices, and is not restricted to each component device being within the same housing.

According to an embodiment of the present invention, an IC chip in which the usage control information of a disc recorded content is recorded is set, whereby activation processing of the usage control information stored in the IC chip can be executed at a terminal within a shop or the like. The activation processing of the usage control information is executed, for example, as processing for storing validity determination data, for example, such as a flag, code, volume ID, or the like, in the IC chip. A user device employing a content performs usage of a disc recorded content in accordance with a usage permission mode recorded in the usage control information on condition that confirmation of validity of the usage control information stored in the IC chip has been executed, and the validity thereof has been confirmed. According to the present arrangement, for example, in a case where theft or the like occurs at a disc shop, a disc recorded content of which the usage control information has not been subjected to the activation processing fails to be employed, whereby unauthorized content usage can be prevented.

DESCRIPTION OF THE PREFERRED EMBODIMENTS

Description will be made below regarding the details of an information processing device, disc, information processing method, and program according to embodiments of the present invention, with reference to the drawings. The embodiments listed next will be described in order.

First embodiment: basic arrangement of content usage control processing based on activation of usage control information Second embodiment: an example wherein a volume ID is stored in an IC chip Third embodiment: an example wherein a content ID is stored in an IC chip Fourth embodiment: a processing example wherein authentication processing is executed at the time of usage of a content, or activation processing of usage control information Fifth embodiment: a processing example wherein signature verification of a program is executed Sixth embodiment: arrangement wherein a media ID is not recorded in the BCA but in an IC chip alone Seventh embodiment: installation of software and a usage control processing example

First Embodiment

Figure 3:
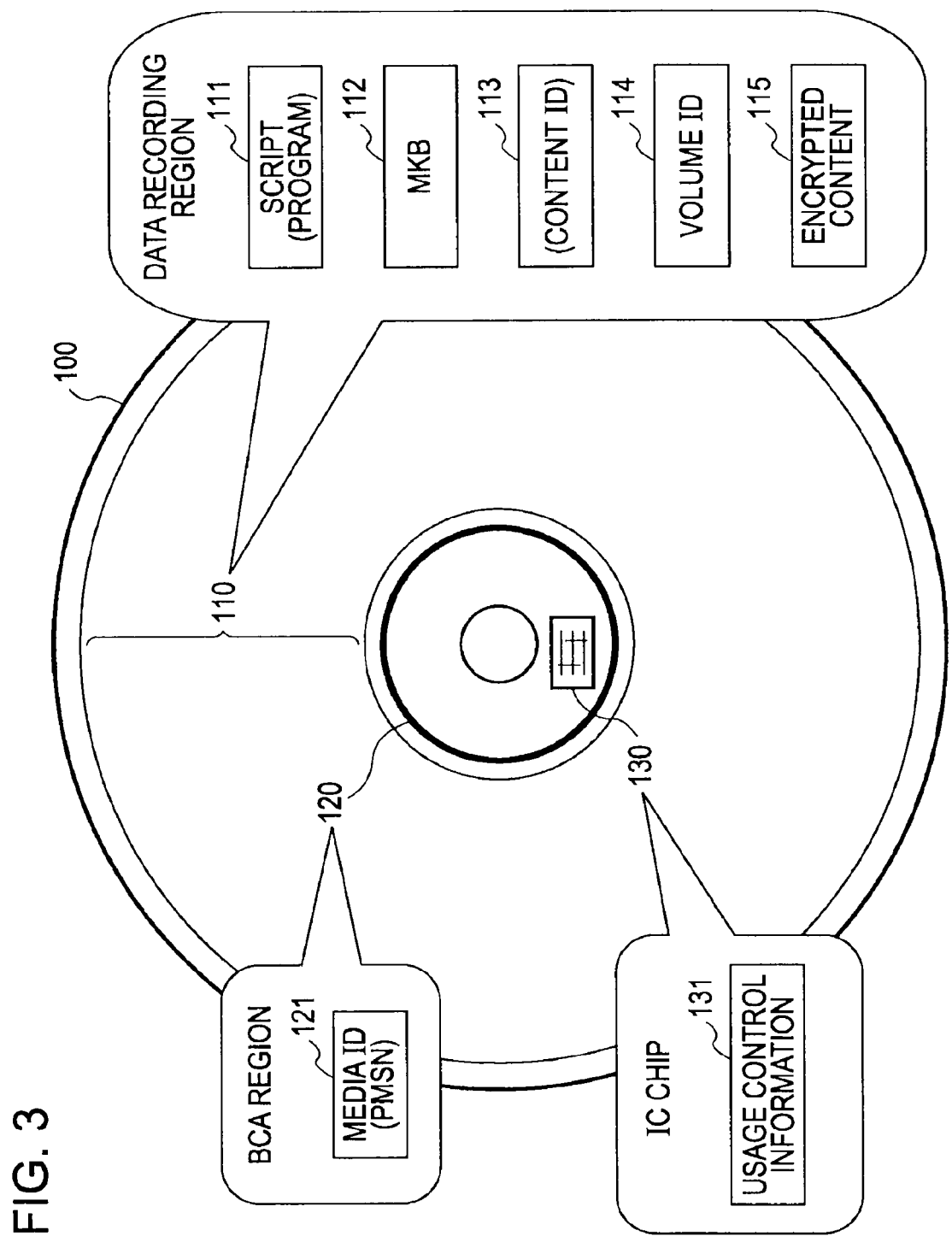
FIG. 3 is a diagram describing a disc data recording configuration example according to a first embodiment of the present invention.

First, description will be made regarding the basic arrangement of content usage control processing based on activation of usage control information serving as a first embodiment of the present invention, and a processing example thereof, with reference to FIG. 3 and thereafter. FIG. 3 is a diagram describing a recorded data example of a disc (information recording medium) 100 in which a content is recorded. The disc 100 is a disc, for example, such as DVD (Digital Versatile Disc), Blu-ray Disc (registered trademark), or the like, wherein a content such as a movie or the like is recorded in the data recording region thereof.

The disc 100 includes a data recording region 110 in which a content or the like is recorded, and a BCA (burst cutting area) region 120 in which a media ID (e.g., PMSN: Prerecorded Media Serial Number) 121 which is identification information unique to a disc is recorded, and further includes an IC chip 130 in which usage control information 131 is recorded.

The disc 100 is a disc manufactured in accordance with the AACS (Advanced Access Content System) standard which is a standard relating to contents copyright protection, wherein data for content usage in accordance with the AACS standard is recorded in the data recording region 110 and BCA region 120.

The following data is recorded in the data recording region 110 of the disc 100.

Script (program) 111 which is a script or program which is a simple program for executing reproduction or copy processing in accordance with the AACS standard, MKB (Media Key Block) 112 which is an encryption key block in which key information to be applied to decoding processing of a later-described encrypted content 115 is stored, Content ID 113 which is identification information of a later-described encrypted content 115, Volume ID 114 which is an identifier serving as a manufacturing serial No. of the disc 100, and Encrypted content 115 which is data obtained by encrypting a content such as a movie or the like Note that the content ID 113 is not recorded in some cases, and accordingly is shown in parentheses in the drawing.

Further, the following data is recorded in the BCA region 120 of the disc 100.

Media ID (PMSN) 121 which is Identification Information Unique to a Disc

As described above, the BCA region is a region different from a normal data recording region, wherein data is recorded by physical cutting different from a normal data recording method. Accordingly, rewriting is difficult for the recorded data of the BCA region, and with reproduction processing as well, particular reading processing different from normal data reproduction processing is employed.

Further, the following data is recorded in the IC chip 130 provided in the disc 100.

Usage Control Information 131

The usage control information 131 includes data recording the usage conditions of a content recorded in the information recording medium 100, and for example, the reproduction permission information of a content recorded in the information recording medium 100, e.g., the number of times which reproduction is permitted (including unlimited, etc.), reproduction limit, and further, reproduction output permission information, content copy permission information, e.g., the number of times which copying is permitted (zero times is prohibited), copy limit, and further, content output permission information, e.g., validity of digital output, and so forth are recorded.

The IC chip 130 is, for example, an IC chip referred to as a RFIC (Radio Frequency IC) having a communication function for performing communication between the IC chip 130 and a reader/writer (or reader) disposed in a contact or non-contact state. The usage control information 131 stored in memory within the IC chip 130 is readable/writable through a reader/writer. The IC chip is configured so as to receive an electric wave or magnetic field output from the reader/writer at an antenna to convert this into power, and output the usage control information 131 stored in the memory to the reader/writer, or input data through the reader/writer to write this in the memory within the IC chip.

Next, description will be made regarding a usage processing sequence of a content recorded in a disc having the data storage configuration shown in FIG. 3, with reference to FIG. 4. That is to say, this sequence is a sequence in the case of performing usage of a content, such as reproduction of a disc recorded content, output processing, and further, copy processing as to another medium such as a hard disk or the like.

In the case of performing usage of the content 115 recorded in the disc 100, e.g., content reproduction or copy processing, content usage processing is executed in accordance with the script (program) 111 recorded in the disc 100. In a case where the user attempts to use a content recorded in the disc 100, in accordance with the script (program) 111 recorded in the disc 100, the identification information (media ID, and also content ID as appropriate) on the disc 100 is obtained, the usage control information 131 corresponding to the content to be used determined from the obtained identification information (media ID, and also content ID as appropriate) is read out from the IC chip 130.

Further, confirmation is made whether or not the read usage control information 131 is valid usage control information. Specifically, verification is made whether or not a flag set in the configuration data of the usage control information 131 is active (indicates an activated state), or whether or not a stipulated code is included. In a case where the flag set within the configuration data of the usage control information 131 is active (indicates an activated state), or the stipulated code is included, the usage control information 131 recorded in the IC chip 130 is determined to be valid, and content usage processing is permitted.

On the other hand, in a case where the flag set within the configuration data of the usage control information 131 is not active, or the stipulated code is not included, the usage control information 131 read out from the IC chip 130 is determined to be invalid, and usage of the content is stopped. This specific processing sequence will be described with reference to FIG. 4.

Figure 4:
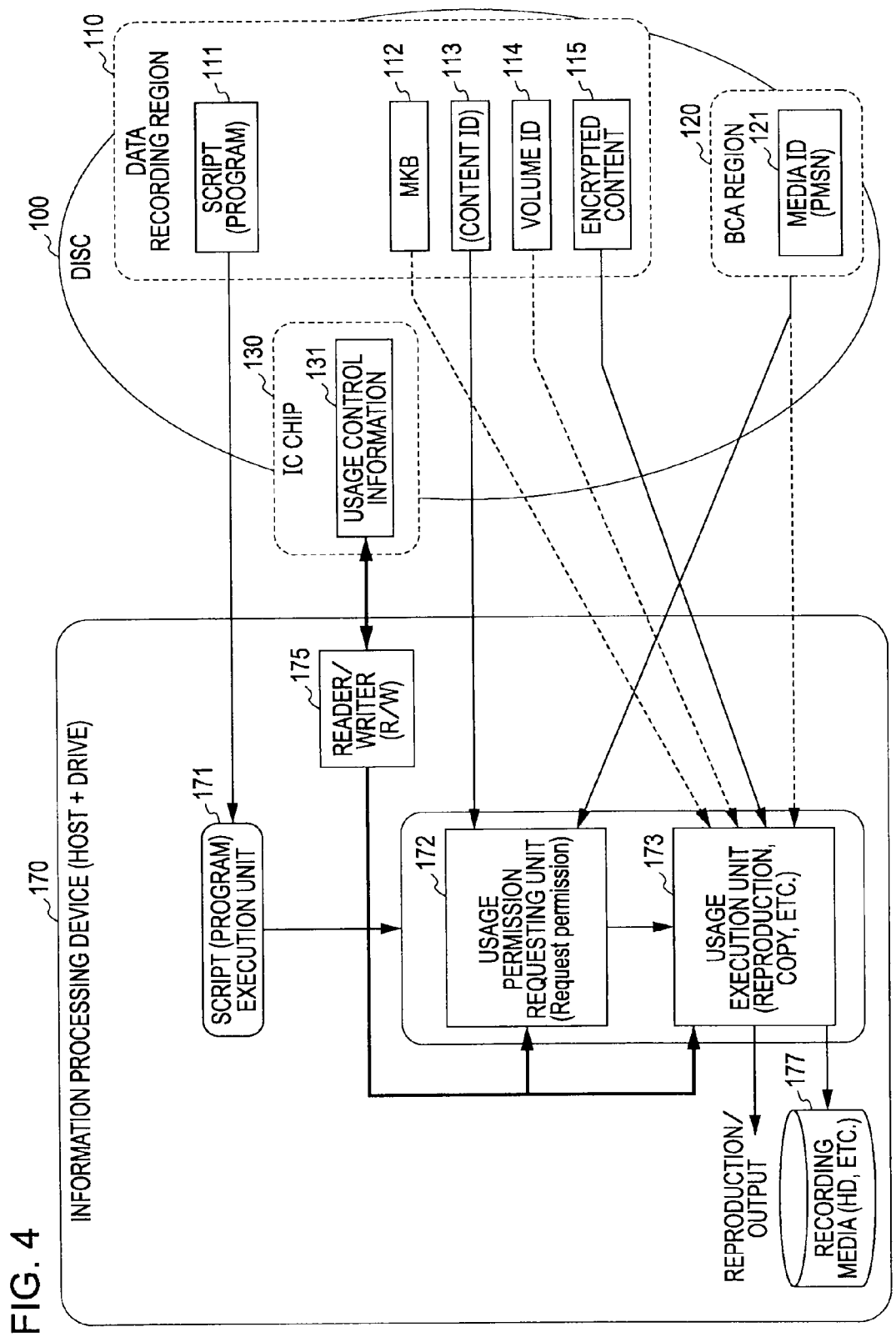
FIG. 4 is a diagram describing a disc recorded content usage sequence according to the first embodiment of the present invention.

FIG. 4 illustrates an information processing device 170 for executing content usage processing, and a disc 100 in which a content to be used is stored. The disc 100 is the disc having the data recording configuration described with reference to FIG. 3, and an IC chip 130 in which the usage control information 131 is recorded is provided in the disc 100.

The information processing device 170 is a device having both of a function serving as a host for executing usage of a content such as content reproduction processing or copy processing or the like, and a drive function for performing driving of a disc, and reading of data.

The information processing device 170 includes a script (program) execution unit 171 for interpreting and executing the script (or program) recorded in the disc 100, a usage permission requesting unit 172 for performing obtaining and validity confirmation processing of the usage control information, in accordance with the script (program) 111 at the time of content usage processing, and a usage execution unit 173 for performing content usage processing in accordance with the usage mode permitted by the usage control information of which validity has been confirmed. Further, the information processing device 170 includes a recording medium 177 such as an HDD serving as a copy destination, for example, at the time of the copy processing of a content. Note that the usage permission requesting unit 172 and usage execution unit 173 are also data processing units for executing processing in accordance with the script (program) 111, and these data processing units are data processing units making up the script (program) execution unit 171.

With the present embodiment, in the case of performing content usage processing such as reproduction or copying of the encrypted content 115 recorded in the disc 100, the information processing device 170 does not have to obtain permission information from the administrative server. Specifically, the information processing device 170 determines whether or not the encrypted content 115 can be used in accordance with the usage control information 131 recorded in the IC chip 130 provided in the disc 100 to confirm that usage of the content is permitted, and in the case where affirmative confirmation has been made, usage of the content is performed.

Further, at the time of this processing, the information processing device 170 confirms whether or not the usage control information 131 read out from the IC chip 130 is valid usage control information. Specifically, the information processing device 170 verifies whether or not the flag set in the configuration data of the usage control information 131 is active (indicates an activated state), or whether or not a stipulated code is included therein. Only in a case wherein the flag set in the configuration data of the usage control information 131 is active (indicates an activated state), or a stipulated code is included therein, usage of the content is permitted.

The usage permission requesting unit 172 of the information processing device 170 first reads out the usage control information from the IC chip 130 through the reader/writer (R/W) 175 according to a content usage request from an unshown user input unit, and further, reads out the media ID (PMSN) 121 recorded in the BCA region 120.

The usage permission requesting unit 172 obtains the identification information on the disc 100 (media ID, and also content ID as appropriate) in accordance with the script (program) 111 recorded in the disc 100, and reads out the content determined by the obtained identification information, i.e., the usage control information 131 corresponding to the content recorded in the disc determined by the media ID (or media ID and content ID) from the IC chip 130. Further, the usage permission requesting unit 172 confirms whether or not the read usage control information 131 is valid usage control information.

Specifically, as described above, the usage permission requesting unit 172 verifies whether or not the flag set in the configuration data of the usage control information 131 is active (indicates an activated state), or whether or not a stipulated code is included therein. In a case where the flag set in the configuration data of the usage control information 131 is active (indicates an activated state), or a stipulated code is included therein, the usage control information 131 recorded in the IC chip 130 is determined to be valid. According to this determination, the content usage processing is permitted, and with the usage execution unit 173, the content usage is performed with the usage mode permitted by the usage control information 131. For example, in the case of performing content copy processing, the usage execution unit 173 executes processing for copying a content to a recording medium 177 such as a hard disk or the like included in the information processing device 170.

On the other hand, with the verification processing of the usage control information at the usage permission requesting unit 172, in a case where confirmation is made that the flag set in the configuration data of the usage control information 131 is not active, or a stipulated code is not included therein, the usage control information 131 read out from the IC chip 130 is determined to be invalid. In this case, usage of the content with the usage execution unit 173 is stopped. In this case, for example, an arrangement may be made wherein a message indicating that the content is a content of which the usage is not permitted is displayed on a display serving as a user interface.

Figure 1:
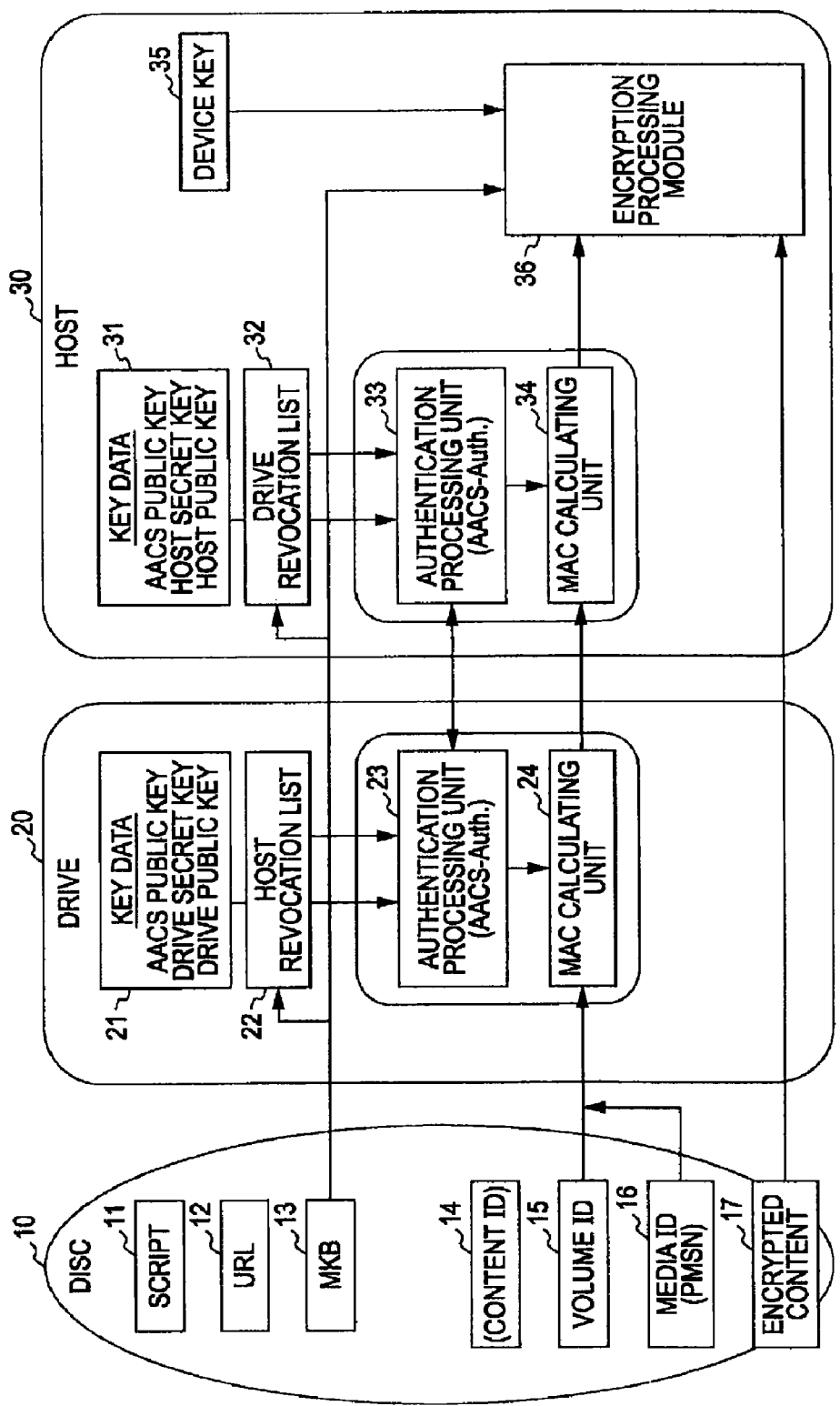
FIG. 1 is a diagram describing a disc recorded content reproducing sequence in accordance with the AACS standard.
Figure 2:
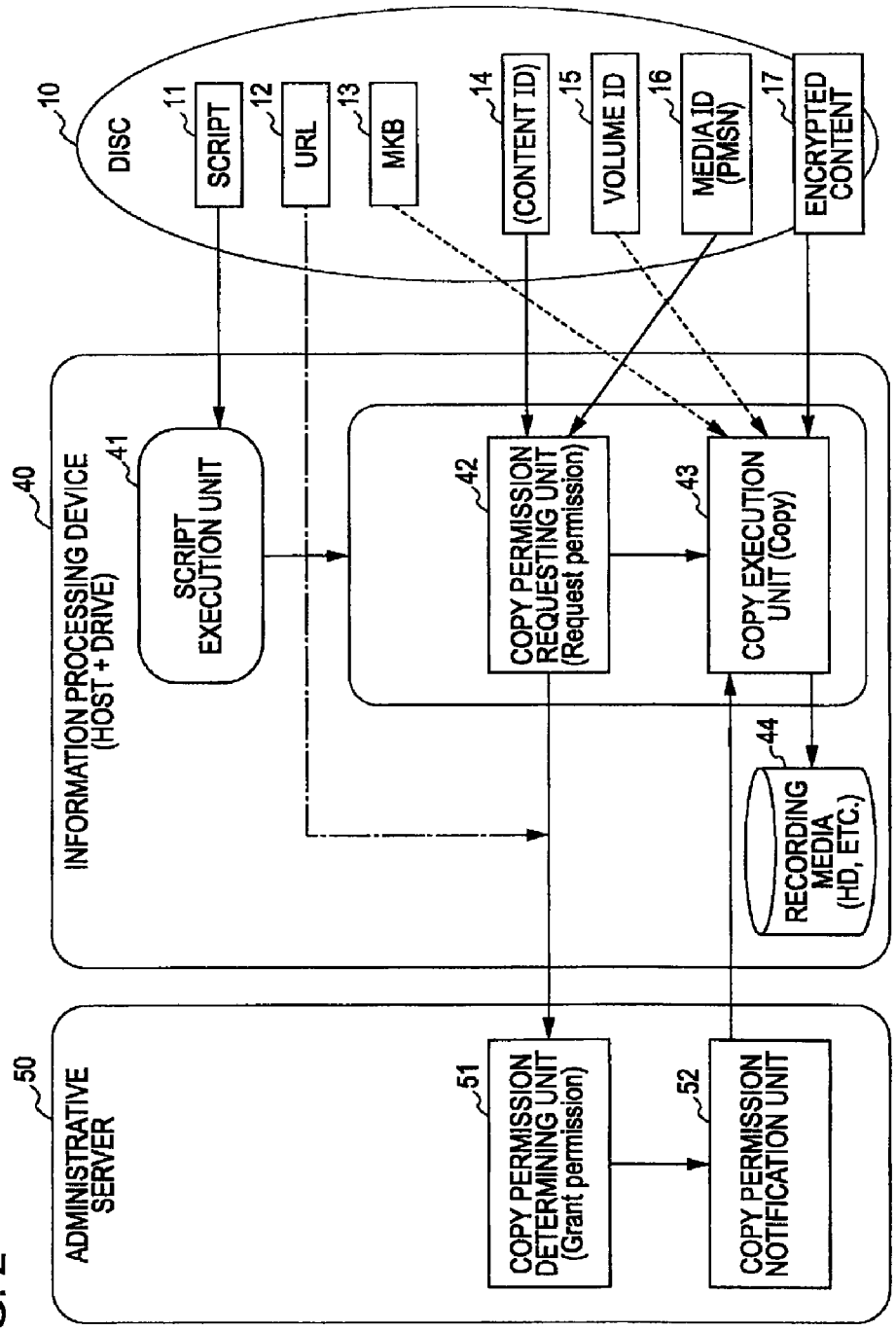
FIG. 2 is a diagram describing a disc recorded content copy sequence in accordance with the AACS standard.

Note that the content usage permission information according to the media ID (PMSN) or media ID and content ID is recorded in the usage control information 131, and the usage permission requesting unit 172 determines the medium or content based on this recorded information, and determines whether or not content usage such as reproduction or copying of the determined content is permitted. That is to say, the usage permission requesting unit 172 performs, for example, the same processing as the determination of whether or not copying at the administrative server is permitted, described with reference to FIG. 2, by employing the usage control information 131 recorded in the IC chip 130.

Note that, for example, in a case where confirmation is made that the content to be used is a copy permission content based on the usage control information 131, content copying is performed at the usage execution unit 173, and the content is copied to the recording medium 177. In a case where the usage control information recorded in the IC chip 130 is data to which the number of times of copy permission has been set, for example, Number of times of copy permission=3
in the case of such data, following execution of copying processing, this setting information has to be updated. That is to say, in a case where copying has been performed once, Number of times of copy permission=2
processing for rewriting the value to the above setting is performed. This processing is performed at the copy execution unit 173. That is to say, following execution of the copy processing, the copy execution unit 173 performs rewriting of the data in the IC chip 130 through the reader/writer (R/W) 175.

Note that in a case where at the time of content reproduction processing or content copy processing, decoding processing of the encrypted content 115 is executed, information for the decoding processing, e.g., the MKB 112 and volume ID 114 recorded in the data recording region 110, the media ID (PMSN) 121 recorded in the BCA region 120, and so forth are read out. A stipulated decoding sequence including encryption key generation in accordance with the AACS standard, decoding processing employing an encryption key, and so forth is executed by applying the read data thereto, thereby obtaining a decoded content.

Thus, with the content usage processing in accordance with the present embodiment, validity of content usage, i.e., validity of content usage such as reproduction, copy output, or the like is determined based on the recorded information of the usage control information 131 recorded in the IC chip 130 provided in the disc 100 without obtaining the usage permission information from the administrative server. Therefore, server connection is omitted, and accordingly, rapid processing can be performed, and even in a case where the information processing device has no server connection function, content usage control based on sure usage control can be performed.

Note that the above-mentioned example is an example wherein the usage permission requesting unit 172 employs the media ID (PMSN) 121 recorded in the BCA region 120 of the disc 100 to obtain the usage permission information of the content determined by the media ID (PMSN) 121. However, a processing example different from this example may be employed, for example, an arrangement may be made wherein the usage permission requesting unit 172 reads out the content ID 113 recorded in the disc 100, and employs the content ID 113 to perform processing for obtaining the usage permission information of the content determined by the content ID 113.

Figure 5:
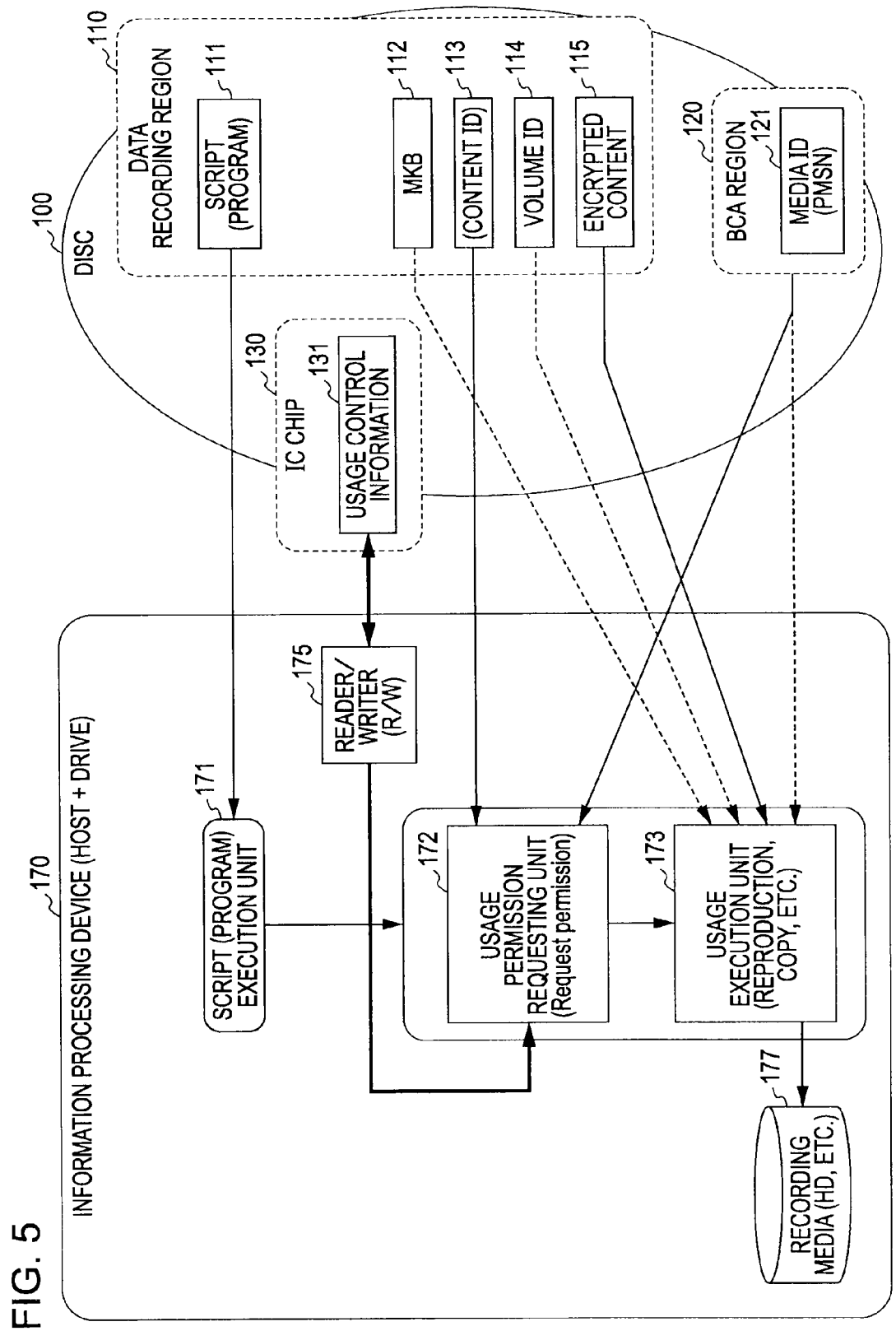
FIG. 5 is a diagram describing a disc recorded content usage sequence according to the first embodiment of the present invention.

FIG. 5 is a modification of the arrangement described with reference to FIG. 4. With the arrangement shown in FIG. 5, at the time of execution of content usage processing, the usage permission requesting unit 172 performs all the control. The usage permission requesting unit 172 outputs enable or disable information to the usage execution unit 173 based on confirmation processing of the usage control information within the IC chip 130. Further, after execution of content usage, the usage permission requesting unit 172 performs rewriting of the data in the IC chip 130 through the reader/writer (R/W) 175 as appropriate.

Figure 6:
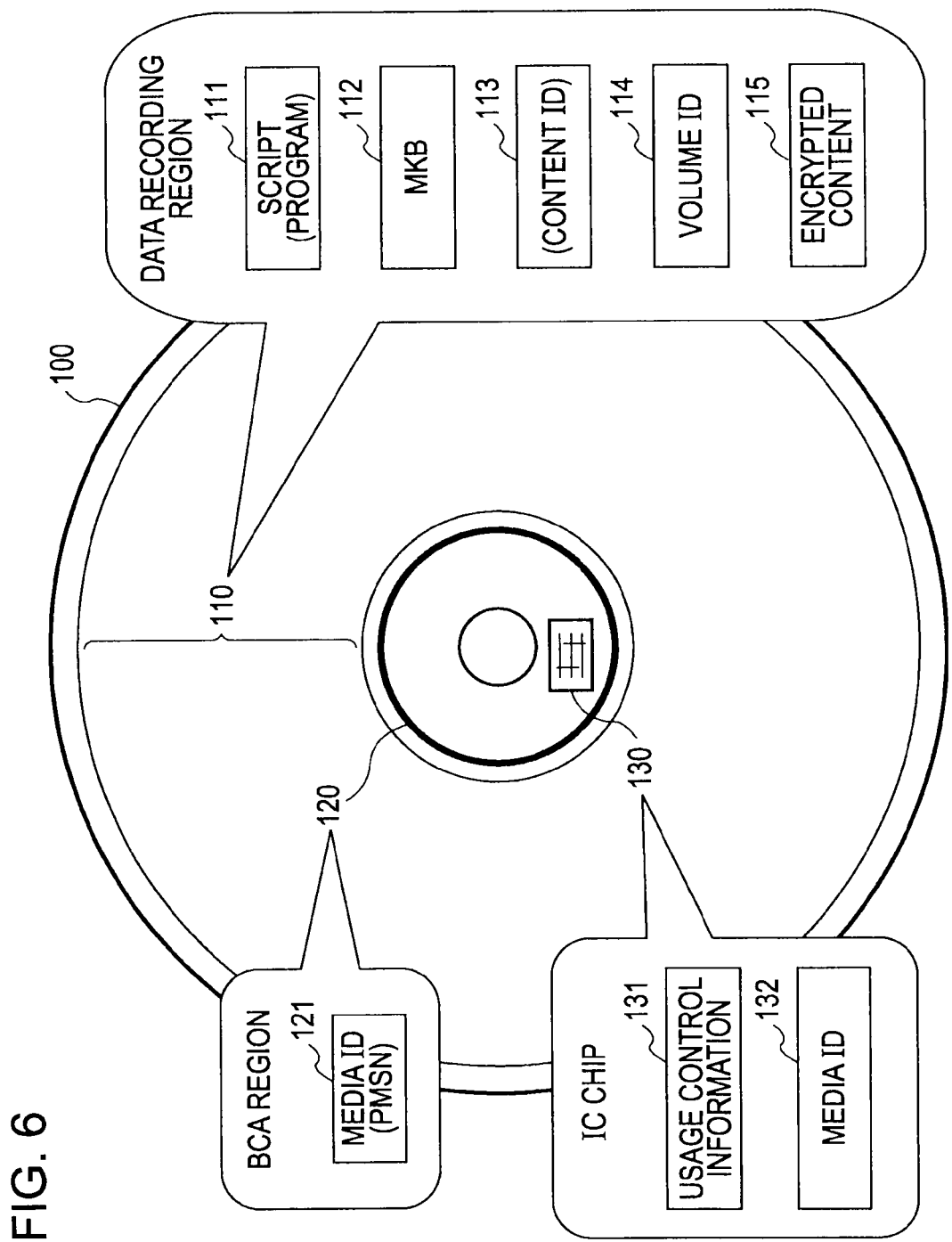
FIG. 6 is a diagram describing a disc data recording configuration example according to the first embodiment of the present invention.

Also, as shown in FIG. 6, an arrangement may be made wherein an media ID 132 is recorded in the IC chip 130, and reading of the media ID is not performed from the BCA region 120 of the disc 100 but performed from the IC chip 130.

Note that with the above-mentioned example, an arrangement is made wherein the IC chip 130 is set to the disc 100, but for example, an arrangement may be made wherein an IC chip in which usage control information and media ID are stored is provided in the case of a disc or the like.

For example, in a case where the reader compatible with the IC chip is set within the drive within the device for performing reproduction of a disc, after a disc is mounted on the reproducing device, reading of data within the IC chip can be performed. However, in a case where the drive does not include a reader compatible with the IC chip, and has an external configuration, for example, such as a USB connection device, the disc has to be removed from the processing device drive to read out the usage control information of the IC chip.

An arrangement is made wherein the IC chip is not included in a disc but in a disc case, whereby such operations can be omitted. With such an arrangement, it is desirable to store the media ID in the IC chip along with the usage control information so as to ensure the correspondence between the disc (content) and the IC chip (usage control information).

As described above, in a case where the information processing device 170 performs usage of the content recorded in the disc 100, verification is made whether or not the usage control information of the IC chip 130 is valid information. Specifically, the information processing device 170 verifies whether or not the flag set in the configuration data of the usage control information 131 is active (indicates an activated state), or whether or not a stipulated code is included therein, or the like.

With the arrangement according to an embodiment of the present invention, the activation processing of the usage control information, i.e., processing for setting the flag set within the configuration data of the usage control information 131 to a value indicating an activated state, or processing for writing a valid code therein, or the like is executed, for example, at a shop which is a vendor of discs. This activation processing sequence will be described with reference to FIG. 7.

Figure 7:
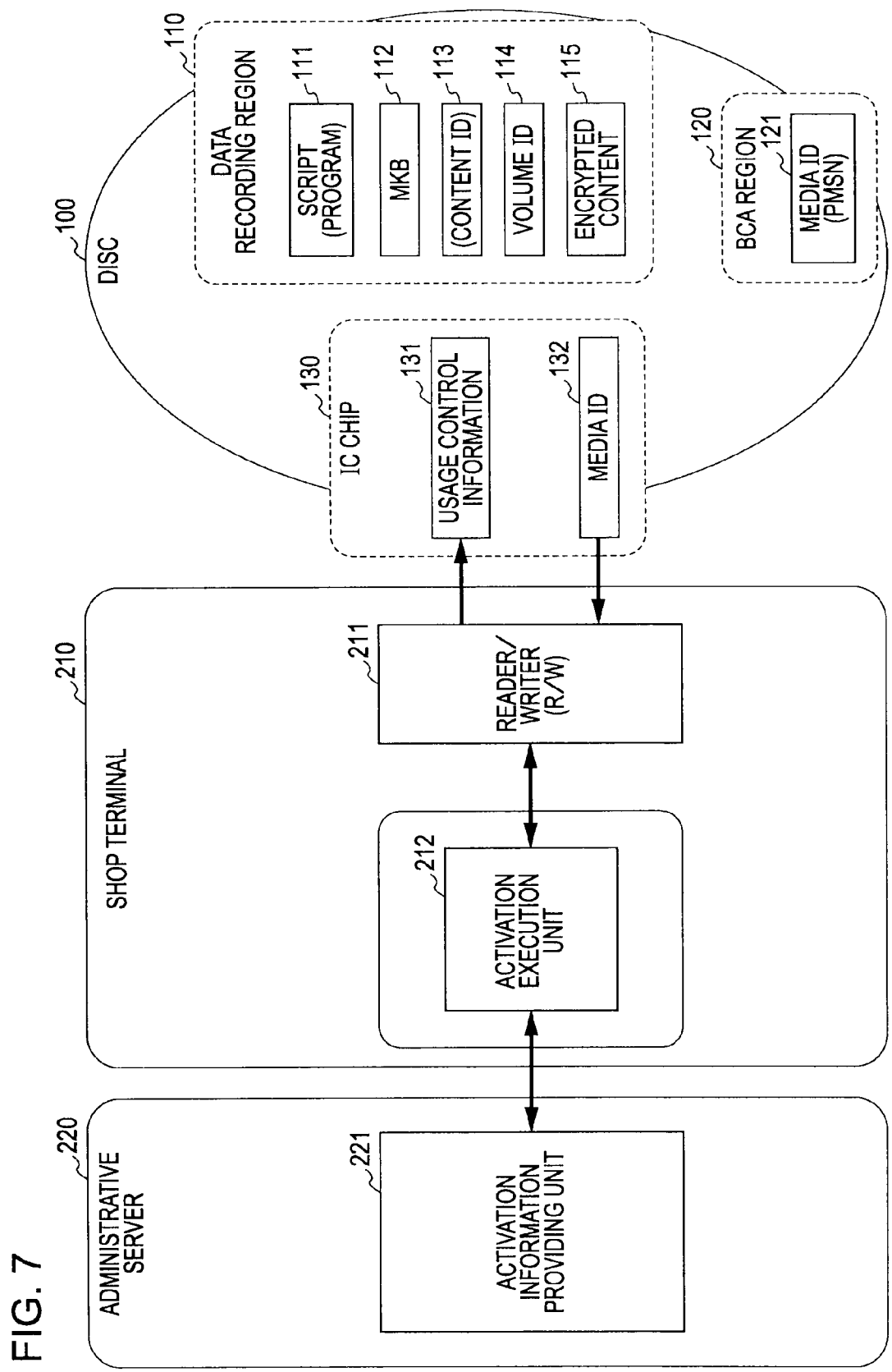
FIG. 7 is a diagram describing a usage control information activation processing sequence as to a disc recorded content according to the first embodiment of the present invention.

FIG. 7 illustrates a disc 100 to be provided to a user, a shop terminal 210 provided at a shop for providing the disc 100 to a user, and an administrative server 220 for performing communication with the shop terminal 210 through a network. The shop terminal 210 includes a reader/writer 211 for performing reading/writing of data of the IC chip 130, and an activation execution unit 212 for executing activation processing. The administrative server 220 includes an activation information providing unit 221 for providing activation permission information and so forth to the shop terminal 210.

The disc 100 has, in the same way as described with reference to FIGS. 3 and 6, a configuration including the IC chip 130 in which the usage control information 131 is recorded. For example, in a case where a disc is legally purchased, the shop terminal 210 executes activation processing of the usage control information 131 of the IC chip 130 of the disc 100. Specifically, the shop terminal 210 performs processing for setting the flag set within the configuration data of the usage control information 131 to an active state (a value indicating an activated state), or processing for writing a stipulated code therein. Alternatively, the shop terminal 210 executes rewriting processing.

This usage control information activation processing may be executed by the shop terminal 210 alone in accordance with a program at the shop terminal 210. Alternatively, an arrangement may be made wherein the disc identification information such as a media ID, and the content identification information such as a content ID are transmitted to the administrative server 220 for performing the usage management of contents, the activation permission information based on confirmation of the identification information at the activation information providing unit 221 of the administrative server 220 is received, thereby performing activation.

Now, let us say that, with regard to processing for determining a disc to be activated, a method is employed such that external information (number described in a disc/case, bar code) is input to the shop terminal 210, or the like. Alternatively, an arrangement may be made wherein the media ID 132 within the IC chip 130 is read out and determined. Note that the media ID 132 is recorded at the time of shipment (at the time of manufacturing) beforehand. Note that in the case of direct sales, or in a case where activation has to be performed at a shop, activation may be performed at the time of manufacturing or shipment.

With the processing described with reference to FIG. 7, the shop terminal installed in a shop for selling discs performs the activation processing of the usage control information stored in the IC chip of a disc. However, the activation processing of the usage control information stored in the IC chip of a disc may be performed by employing a user's reproducing device or PC instead of the shop terminal.

Figure 8:
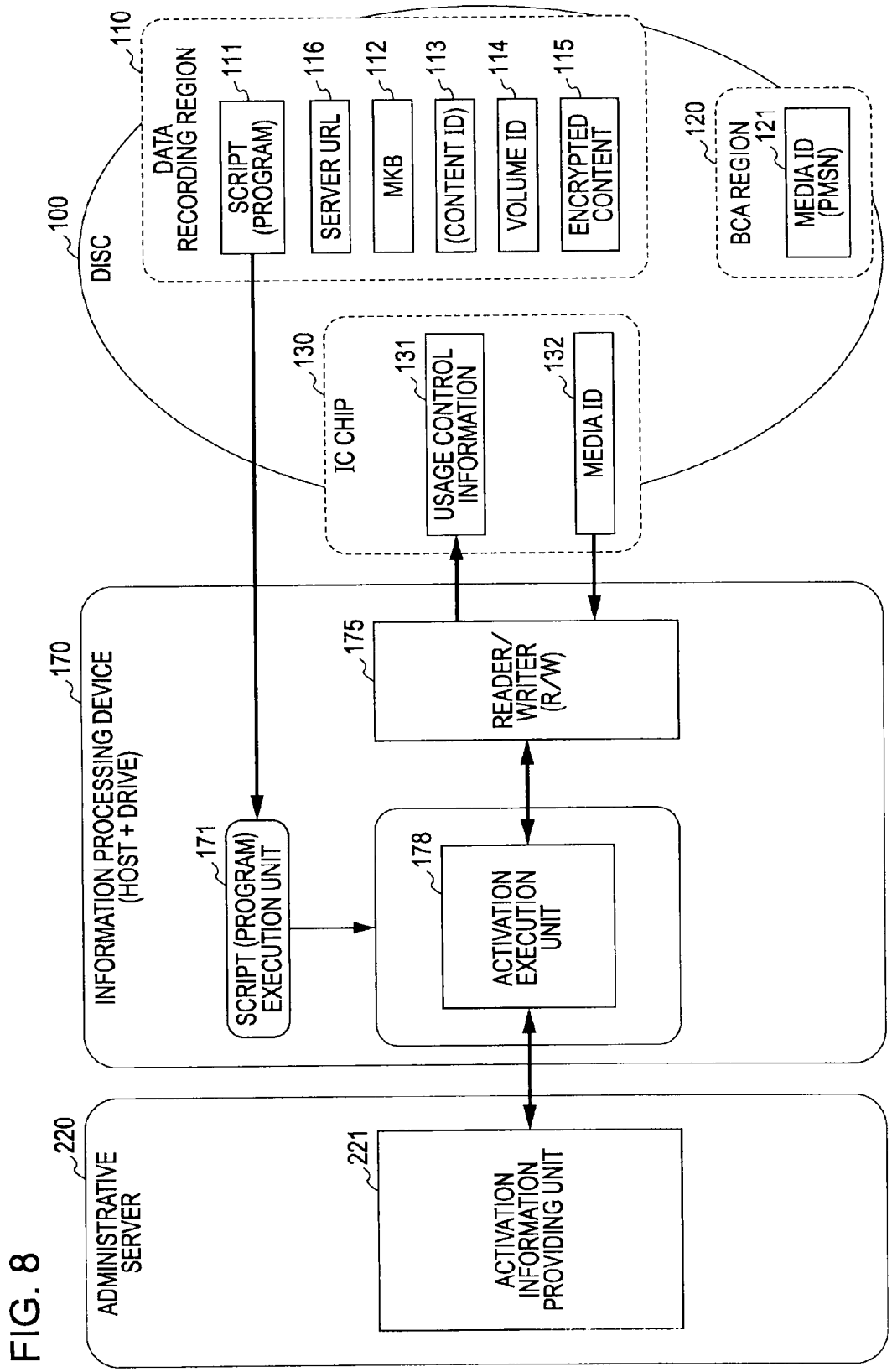
FIG. 8 is a diagram describing a usage control information activation processing sequence as to a disc recorded content according to the first embodiment of the present invention.

This processing example will be described with reference to FIG. 8. FIG. 8 illustrates a disc 100 possessed by a user, an information processing device 170 serving as a user device for performing reproduction processing of the disc 100, and an administrative server 220 for performing communication with the information processing device 170 through a network. The information processing device 170 includes a program execution unit 171 serving as an execution unit of a program 111 recorded in the disc 100, a reader/writer 175 for performing reading/writing of the data of the IC chip 130, and an activation execution unit 178 for executing activation processing. The activation execution unit 178 executes processing in accordance with, for example, the program 111 recorded in the disc 100. The administrative server 220 includes an activation information providing unit 221 for providing activation permission information and so forth to the information processing device 170 serving as a user device.

A server URL 116 serving as access information as to the administrative server 220 is recorded in the disc 100. The activation execution unit 178 of the information processing device 170 employs the URL 116 recorded in the disc 100 to connect to the administrative server 220 through a network by the program 111 recorded in the disc 100 being executed. Specifically, the activation execution unit 178 of the information processing device 170 reads out, for example, the media ID 132 recorded in the IC chip 131, and transmits this to the administrative server 220.

The activation information providing unit 221 of the administrative server 220 receives the media ID, executes confirmation of the medium, and provides information for the activation processing to the information processing device 170. The activation execution unit 178 of the information processing device 170 employs the information received from the administrative server 220 to perform the activation processing of the usage control information 131 stored in the IC chip 130 of the disc 100.

Note that the activation processing of the usage control information to which the information processing device 170 serving as a user device has been applied may be executed by employing the program 111 recorded in the disc 100, or may be executed by employing an application program possessed by the information processing device 170 beforehand.

Second Embodiment

Next, as a second embodiment of the present invention, a processing example will be described wherein a volume ID is stored in the IC chip, and volume ID storage processing is taken as the activation processing of the usage control information 131. This is a processing example wherein a volume ID(b) different from the volume ID(a) recorded in the disc is stored in the IC chip, and is used.

With the above-mentioned first embodiment, as described with reference to FIGS. 4 and 5, a content recorded in the disc 100 is used in accordance with the following sequences (S1) through (S3).

(S1) The usage permission requesting unit 172 of the information processing device 170 obtains the identification information on the disc 100 (media ID, and also content ID as appropriate) in accordance with the script (program) 111 recorded in the disc 100.

(S2) The content determined by the obtained identification information, i.e., the usage control information 131 corresponding to the content recorded in the disc determined by the media ID (or media ID and content ID) is read out from the IC chip 130. Further, confirmation is made whether or not the read usage control information 131 is valid usage control information. Specifically, verification is made whether or not the flag set in the configuration data of the usage control information 131 is active (indicates an activated state), or whether or not a stipulated code is included therein, or the like.

(S3) Upon determining that the usage control information is valid, the content usage processing is permitted, and with the usage execution unit 173, content usage is performed in the usage mode permitted by the usage control information 131. For example, in the case of performing content copy processing, processing for copying the content in the recording medium 177 such as a hard disk possessed by the information processing device 170.

Specifically, the usage execution unit 173 reads out the MKB 112 recorded in the data recording region 110 of the disc 100, and the media ID (PMSN) 121 recorded in the BCA region 120, and so forth, and employs such read data to execute decoding of the encrypted content 115, thereby performing content usage.

In the case of employing such processing sequence, there is a possibility that the program (script) which the usage execution unit 173 executes is tampered (partially skipped), and accordingly, the program (script) is tampered so as to perform content usage by omitting the confirmation processing of the media ID at the usage permission requesting unit 172. An example described below is a processing example which prevents such a situation, and enables more rigid content usage control. A content usage processing sequence according to the second embodiment will be described with reference to FIG. 9.

Figure 9:
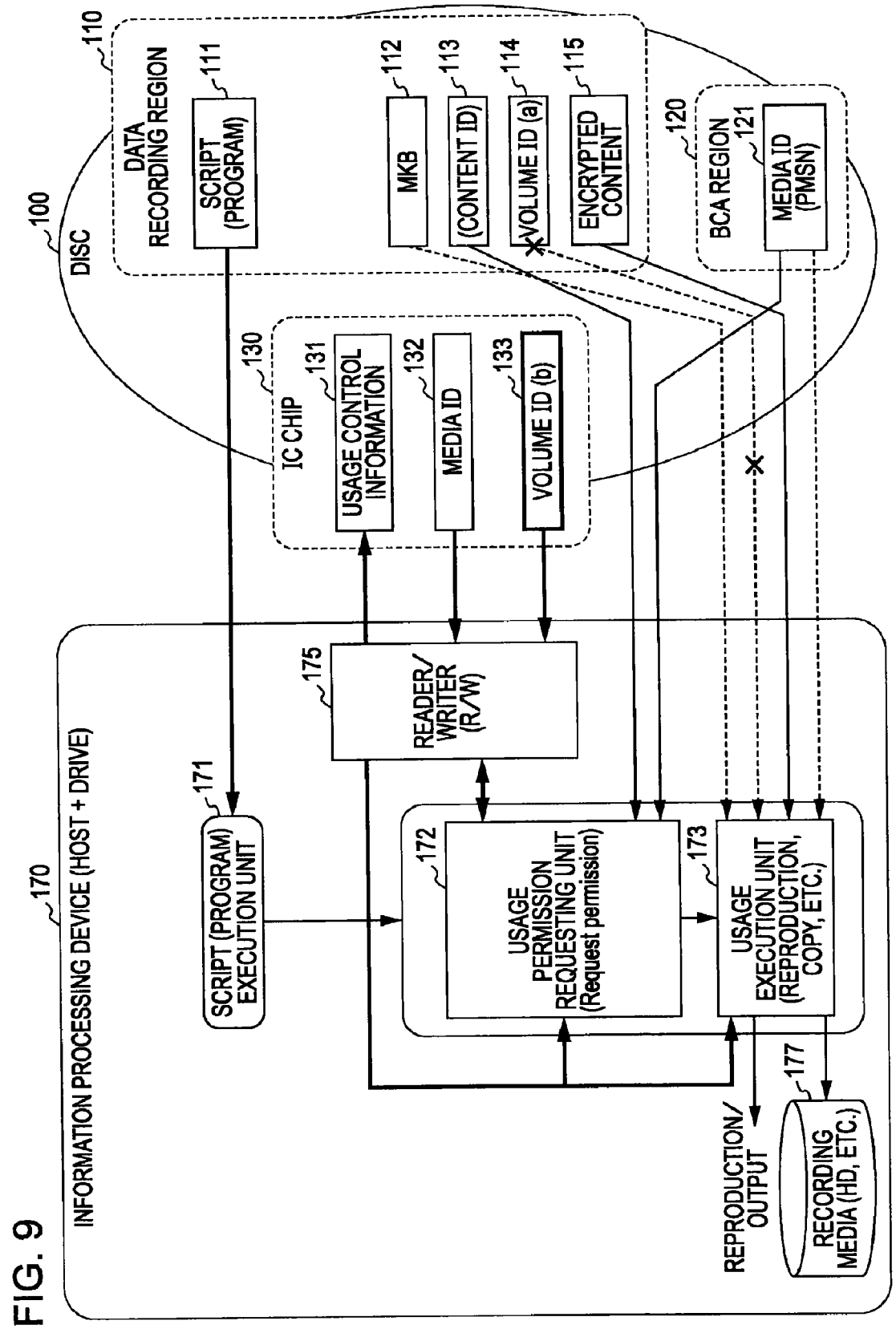
FIG. 9 is a diagram describing a disc recorded content usage sequence according to a second embodiment of the present invention.

The disc shown in FIG. 9 differs in that a volume ID(b) 133 is added to the IC chip 130 of the disc 100 described with reference to FIG. 6. The volume ID(b) 133 within the IC chip 130 is data stored as the activation information of the usage control information 131 recorded in the IC chip 130. This ID is recorded, for example, at the time of disc purchasing processing at a sales shop of the disc 100 or the like.

The volume ID(a) 114 in the data recording region 110 is the same data as the volume ID 114 of the first embodiment described with reference to FIGS. 2 through 8. In order to clarify distinction with the volume ID(b) 133 stored in the IC chip 130, FIG. 9 illustrates this as the volume ID(a) 114. As described above, the volume ID(a) 114 is an identifier for every manufacturing increment of the disc 100, serving as a manufacturing serial No.

The volume ID(b) 133 is also set, for example, as an identifier for every manufacturing increment of the disc 100, serving as a manufacturing serial No., but is not stored in the IC chip 130 at the time of manufacturing of the disc. The volume ID(b) 133 is recorded in the IC chip 130, for example, at a shop or the like at the time of the activation processing as the activation information of the usage control information 131 which is recorded in the IC chip 130.

The volume ID(b) 133 stored in the IC chip 130 of the disc 100 is employed as the generating information of an encryption key to be applied to the decoding processing of the encrypted content 115. With the first embodiment, the volume ID(a) 114 recorded in the data recording region 110 of the disc 100 has been employed as encryption key generating information, but with the present embodiment, the volume ID(a) 114 recorded in the data recording region 110 is not employed as encryption key generating information.

In response to the content usage request from an unshown user input unit, the usage permission requesting unit 172 of the information processing device 170 first reads out the usage control information 131 from the IC chip 130 through the reader/writer (R/W) 175, and further, reads out the media ID (PMSN) 121 recorded in the BCA region 120.

The usage permission requesting unit 172 obtains the media ID 132 of the IC chip 130, or the identification information (media ID, and also content ID as appropriate) on the disc 100 in accordance with the script (program) 111 recorded in the disc 100, and reads out the content determined by the obtained identification information, i.e., the usage control information 131 corresponding to the content recorded in the disc determined by the media ID (or media ID and content ID) from the IC chip 130. Further, confirmation is made whether or not the read usage control information 131 is valid usage control information.

With the present example, confirmation processing regarding whether or not the read usage control information 131 is valid usage control information is executed as confirmation processing regarding whether or not the volume ID(b) 133 is recorded in the IC chip 130. In a case where the volume ID(b) 133 is recorded in the IC chip 130, the usage control information 131 recorded in the IC chip 130 thereof is determined to be valid.

On the other hand, in a case where the volume ID(b) 133 is not recorded in the IC chip 130, the usage control information 131 recorded in the IC chip 130 thereof is determined to be invalid.

Only in the case where the volume ID(b) 133 is recorded in the IC chip 130, and the usage control information 131 is determined to be valid, content usage processing is permitted, and with the usage execution unit 173, content usage is performed in the usage mode permitted by the usage control information 131.

The usage execution unit 173 reads out the volume ID(b) 133 stored in the IC chip 130 of the disc 100, and further, the MKB 112 recorded in the data recording region 110, and so forth. Such read data is employed to execute the generating processing of an encryption key for executing decoding of the encrypted content 115, and the obtained encryption key is employed to execute decoding of the content, thereby performing content usage.

Content usage means, for example, content reproduction processing, or processing for copying a decoded content to the recording medium 177 such as a hard disk included in the information processing device 170, or the like.

With the present embodiment, the usage execution unit 173 confirms whether or not the volume ID(b) 133 is recorded in the IC chip 130 of the disc 100, and only in the case where the volume ID(b) 133 is recorded, the usage control information 131 is determined to be valid. Only in the case where this validity is determined, the processing proceeds to content decoding processing. Further, at the time of content decoding, an encryption key has to be generated by employing the volume ID(b) 133 stored in the IC chip 130.

According to such an arrangement, for example, even if the script 111 is rewritten to a program which omits processing such as confirmation of the media ID to proceed to content decoding, due to tampering of the script 111, the volume ID(b) 133 for generating an encryption key fails to be read out from the IC chip 130, and decoding of the content is prevented, and accordingly, unauthorized content usage is prevented.

Figure 10:
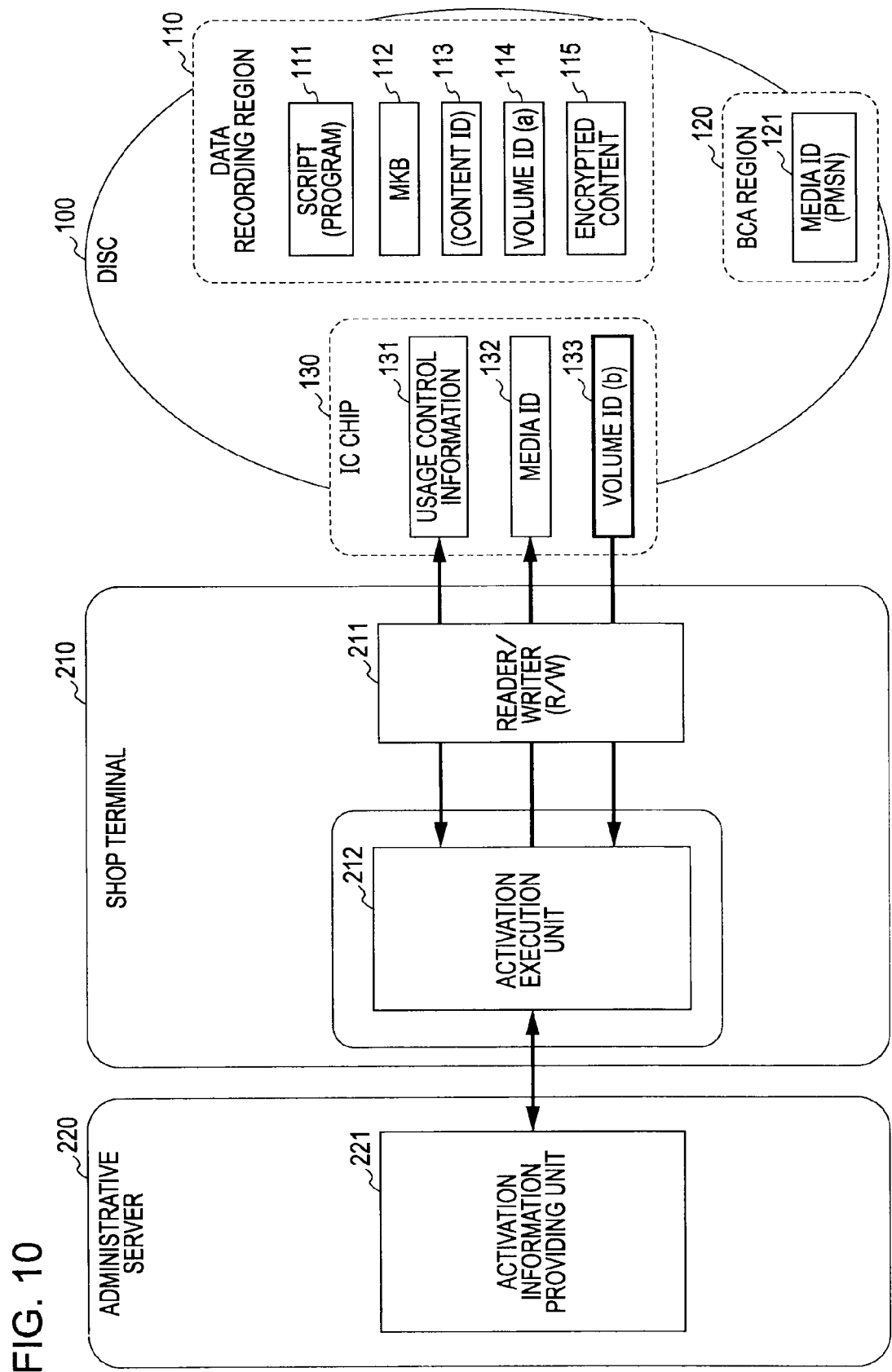
FIG. 10 is a diagram describing a usage control information activation processing sequence as to a disc recorded content according to the second embodiment of the present invention.

FIG. 10 is a diagram describing the activation processing of the usage control information according to the present second embodiment. With the present embodiment, the activation processing of the usage control information is performed as writing processing of the volume ID(b) as to the IC chip.

FIG. 10 illustrates a disc 100 to be provided to a user, a shop terminal 210 provided in a shop for providing the disc 100 to a user, and an administrative server 220 for performing communication with the shop terminal 210 through a network. The shop terminal 210 includes a reader/writer 211 for performing reading/writing of data of the IC chip 130, and an activation execution unit 212 for executing activation processing. The administrative server 220 includes an activation information providing unit 221 for providing activation permission information and so forth to the shop terminal 210.

The disc 100 has a configuration including the IC chip 130 in which the usage control information 131 is recorded. For example, in a case where a disc is legally purchased, the shop terminal 210 executes activation processing of the usage control information 131 of the IC chip 130 of the disc 100. Specifically, the shop terminal 210 performs writing processing of the volume ID(b) 133 as to the IC chip 130. Note that an arrangement may be made wherein the usage control information 131 is also written along with the volume ID(b) 133 at the time of the activation processing.

This usage control information activation processing can be executed by the shop terminal 210 alone in accordance with a program on the shop terminal 210. Alternatively, an arrangement may be made wherein the disc identification information such as a media ID, and the content identification information such as a content ID are transmitted to the administrative server 220 for performing the usage management of contents, the activation permission information based on confirmation of the identification information at the activation information providing unit 221 of the administrative server 220 is received, thereby performing activation.

Now, let us say that, with regard to processing for determining a disc to be activated, a method is employed such that external information (number described in a disc/case, bar code) is input to the shop terminal 210, or the like. Alternatively, an arrangement may be made wherein the media ID 132 within the IC chip 130 is read out and determined. Note that the media ID 132 is recorded at the time of shipment (at the time of manufacturing) beforehand. Note that in the case of direct sales, or in a case where activation has to be performed at a shop, activation may be performed at the time of manufacturing or shipment.

With the processing described with reference to FIG. 10, the shop terminal installed in a shop for selling discs performs the activation processing of the usage control information stored in the IC chip of a disc. However, in the same way as described with the first embodiment with reference to FIG. 8, the activation processing of the usage control information stored in the IC chip may be performed by employing a user's reproducing device or PC instead of the shop terminal.

Third Embodiment

Figure 11:
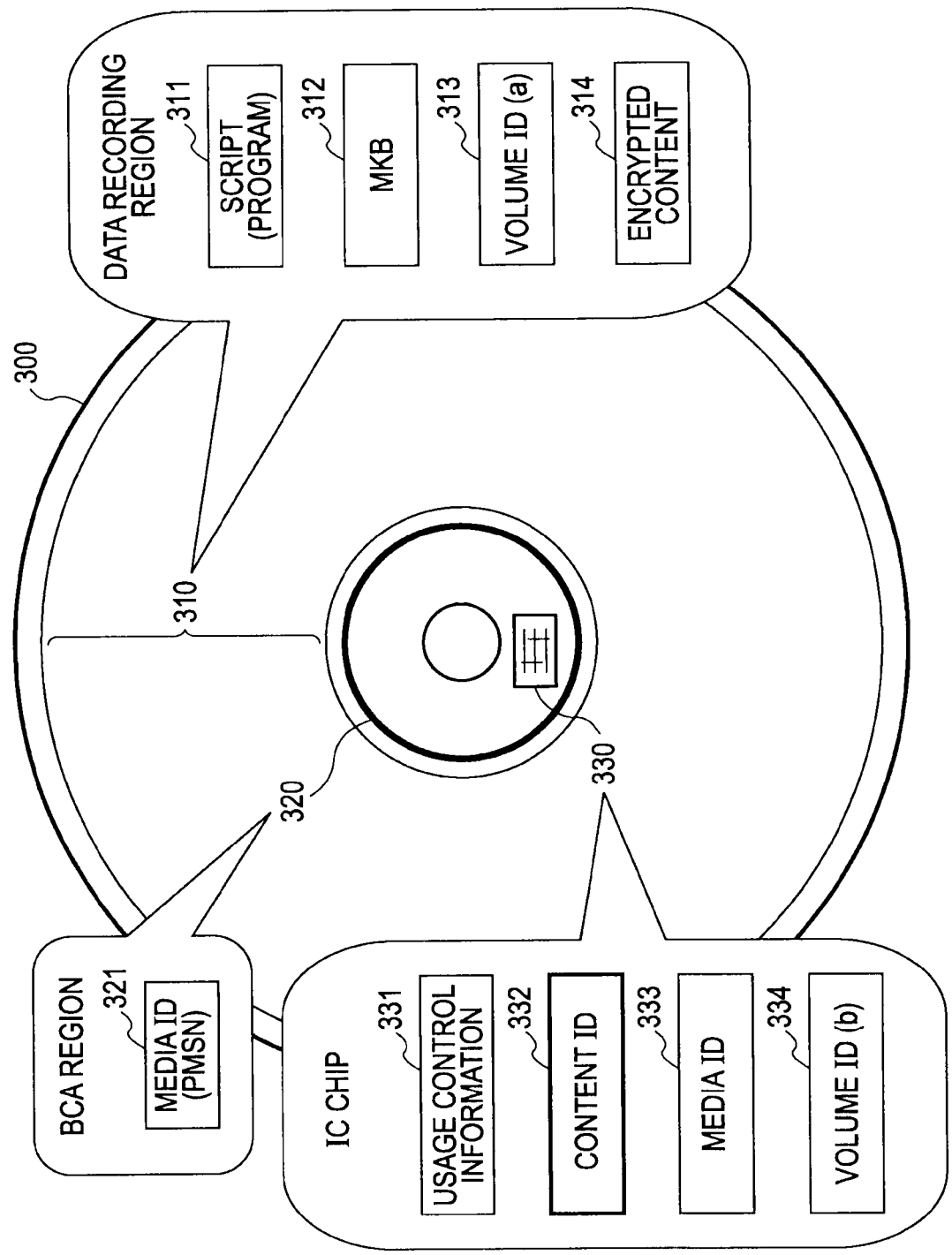
FIG. 11 is a diagram describing a disc data recording configuration example according to a third embodiment of the present invention.

Next, as a third embodiment of the present invention, an example will be described wherein the content ID is stored in the IC chip. FIG. 11 is a diagram describing a recorded data example of a disc (information recording medium) 300 in which a content is recorded. The disc 300 is a disc, for example, such as DVD (Digital Versatile Disc), Blu-ray Disc (registered trademark), or the like, wherein a content such as a movie or the like is recorded in the data recording region thereof.

The disc 300 includes, in the same way as described in the first embodiment with reference to FIG. 3, a data recording region 310 in which a content or the like is recorded, and a BCA (burst cutting area) region 320 in which a media ID (e.g., PMSN) 321 which is identification information unique to a disc is recorded, and further includes an IC chip 330 in which usage control information 331 is recorded.

The following data is recorded in the data recording region 310 of the disc 300.

Script (program) 311 which is a simple program for executing reproduction of copy processing in accordance with the AACS standard, MKB (Media Key Block) 312 which is an encryption key block in which key information to be applied to decoding processing of a later-described encrypted content 314 is stored, Volume ID(a) 313 serving as a manufacturing serial No. of the disc 300, and Encrypted content 314 which is data obtained by encrypting a content, for example, such as a movie or the like Further, the following data is recorded in the BCA region 320 of the disc 300.

Media ID (PMSN) 321 which is Identification Information Unique to a Disc

As described above, the BCA region is a region different from a normal data recording region, wherein data is recorded by physical cutting different from a normal data recording method. Accordingly, rewriting is difficult for the recorded data of the BCA region, and with reproduction processing as well, particular reading processing different from normal data reproduction processing is employed.

Further, the following data is recorded in the IC chip 330 provided in the disc 300.

Usage control information 331,

Content ID 332 which is identification information of the encrypted content 314, Media ID (e.g., PMSN) 333 which is identification information unique to a disc, and Volume ID(b) 334 employed as encryption key generating information to be applied to decoding of the encrypted content 314 described with the second embodiment The media ID (PMSN) 333 recorded in the IC chip 330, and the media ID (PMSN) 321 recorded in the BCA region 320 are the same data.

The usage control information 331 is, for example, the copy permission information of the encrypted content 314 recorded in the information recording medium 300, and specifically, whether or not copy is permitted, the number of times of copy permission in the case where copy is permitted, and further, content output permission information, e.g., usage control information in which validity of digital output, and so forth are recorded.

Note that, in the same way as described in the second embodiment, the volume ID(b) 334 is information indicating that the usage control information 331 is valid. The volume ID(b) 334 is written in the IC chip 330 by activation processing at a shop, or activation processing which a user information processing device executes by connecting to the server.

With the configuration shown in FIG. 11, the content ID 332 is recorded in the IC chip 330, and for example, in a case where the activation processing of the usage control information, or rewriting processing is performed at a shop, the content ID of the IC chip 330 is confirmed, thereby facilitating processing for determining a content within the disc 300. In a case where the user connects to the administrative server through a network or the like to perform the activation processing of the usage control information, or rewriting processing as well, the content ID of the IC chip 330 is confirmed, thereby facilitating processing for determining a content within the disc 300. Note that the content ID 332 is, as with the media ID 333, recorded in the IC chip 330 at the time of shipping (manufacturing).

Figure 12:
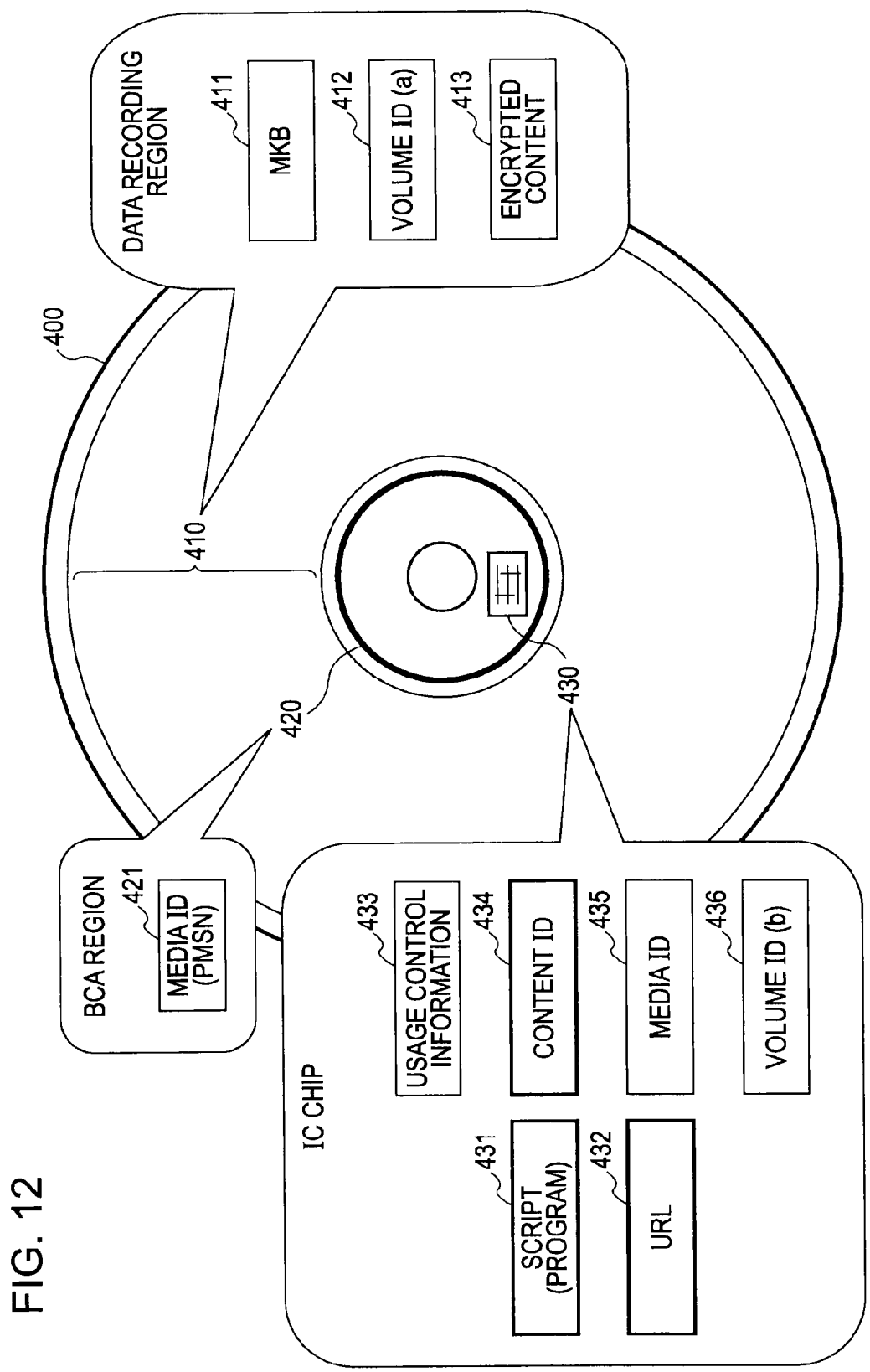
FIG. 12 is a diagram describing a disc data recording configuration example according to the third embodiment of the present invention.

The disc 400 shown in FIG. 12 records, in the same way as the configuration shown in FIG. 11, Usage control information 433, Content ID 434 which is the identification information of a later-described encrypted content 413, Media ID (e.g., PMSN) 435 which is an identification information unique to a disc, and Volume ID(b) 436 employed as encryption key generating information to be applied to decoding to a later-described encrypted content 413 in the IC chip 430, and further the following data is added thereto.

Script 431 which is a simple program for executing reproduction or copy processing in accordance with the AACS standard, and URL 432 of a server to be connected, for example, for obtaining copy processing permission at the time of copy processing of a disc recorded content A data recording region 410 of the disc 400 records the following data.

MKB (Media Key Block) 411 which is an encryption key block in which key information to be applied to decoding processing of a later-described encrypted content 413 is stored, Volume ID(a) 412 serving as a manufacturing serial No. of the disc 400, and Encrypted content 413 which is data obtained by encrypting a content, for example, such as a movie or the like Description will be made regarding an update processing sequence of stored data of the IC chip 430 employing a disc having the data storage configuration shown in FIG. 12, with reference to FIG. 13. Note that the update processing also includes the activation processing of the usage control information.

Figure 13:
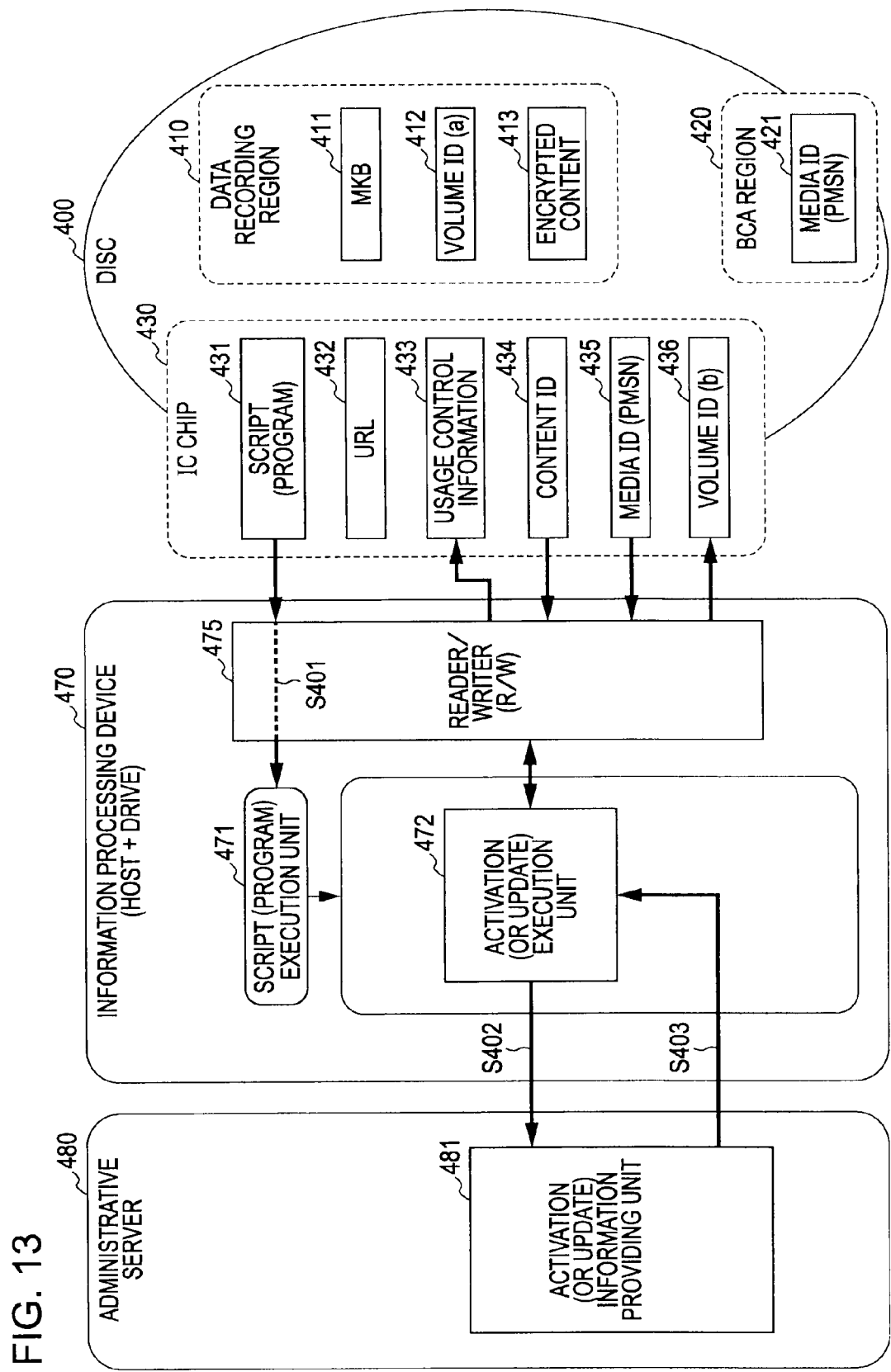
FIG. 13 is a diagram describing a usage control information activation processing sequence as to a disc recorded content according to the third embodiment of the present invention.

FIG. 13 illustrates from the left an administrative server 480, an information processing device 470 on which the disc 400 is mounted, and the disc 400. The disc 400 is a disc having the data recording configuration described with reference to FIG. 12, in which there is provided the IC chip 430 including the following data in addition to usage control information 433.

(a) Script 431 which is a simple program for executing reproduction or copy processing in accordance with the AACS standard, (b) URL 432 of a server to be connected, for example, for obtaining copy processing permission at the time of copy processing of a disc recorded content, (c) Content ID 434 which is identification information of the encrypted content 413, (d) Media ID (e.g., PMSN) 435 which is identification information unique to a disc, and (e) Volume ID(b) 436 employed as encryption key generating information to be applied to decoding to the encrypted content 413

Note that the volume ID(b) 436 is not recorded before execution of the activation processing.

The information processing device 470 is a device having both of a function serving as a host for executing content reproduction processing or copy processing or the like, and a drive function for performing driving of a disc, and reading of data.

The information processing device 470 includes a script execution unit 471 for executing the script 431 (simple program) recorded in the IC chip 430, and an activation (or update) execution unit 472 for executing updating of the data of the IC chip 430, or the activation processing of the usage control information 433.

With the present embodiment, in the case of performing updating of the data of the IC chip 430, e.g., updating of the usage control information 433, or the activation processing (activation) of the usage control information 433, the information processing device 470 first reads out the script 431 recorded in the IC chip 430 through a reader/writer (R/W) 475, and executes this at the script execution unit 471.

With the present embodiment, the script 431 is recorded in the IC chip 430, and the information processing device 470 obtains the script 431 from the IC chip 430 through the reader/writer (R/W) 475 to execute this at the script execution unit 471. Step S401 shown in the drawing indicates the readout processing of the script 431.

A program for executing a series of procedures at the time of executing the update processing of the IC chip 430, or the activation processing (activation) of the usage control information 433 is recorded in the script 431. The activation (or update) execution unit 472 of the information processing device 470 obtains data to be transmitted to the administrative server 480 from the IC chip 430 through the reader/writer (R/W) 475 in accordance with this program.

Specifically, the activation (or update) processing execution unit 472 of the information processing device 470 reads out the content ID 434 and media ID (PMSN) 435 from the IC chip, further obtains the URL of the administrative server 480, and transmits such data, i.e., the content ID 434 and media ID (PMSN) 435 to the administrative server 480 in accordance with the URL. Step S402 shown in the drawing indicates this processing.

Upon receiving the data from the information processing device 470, an activation (or update) information providing unit 481 of the administrative server 480 obtains update information from a database, and provides this to the information processing device 470. Step S403 shown in the drawing indicates this processing. When executing the activation processing (activation) of the usage control information 433, the information processing device 470 obtains the volume ID(b) 436 from the administrative server 480.

The activation (or update) processing execution unit 472 of the information processing device 470 executes writing of data to the IC chip 430 through the reader/writer (R/W) 475 based on the reception information from the administrative server 480 to perform update processing of the recorded information within the IC chip 430, e.g., update processing of the usage control information 433. When executing the activation processing (activation) of the usage control information 433, the activation (or update) execution unit 472 of the information processing device 470 writes the volume ID(b) 436 obtained from the administrative server 480 in the IC chip 430.

Note that the processing described with reference to FIG. 13 can be applied to the following processing.

The activation processing (activation) of the usage control information 433, and The usage control information update processing in a case where the usage control information initially stored in the IC chip of the disc prohibits copying of a certain content, but this content has to be changed to a copy permission content after elapse of a certain period of time.

With the present embodiment, as shown in FIG. 13, all of the information for the update processing of the IC chip is obtainable within the IC chip, whereby the activation processing of the usage control information or data update processing can be performed without reading out the data of the data recording region and BCA region.

Fourth Embodiment

Next, a fourth embodiment of the present invention will be described wherein authentication processing is executed at the time of content usage such as content reproduction or copy processing, the activation processing of the usage control information, the update processing, or the like. Description will be made with reference to FIG. 14 and thereafter.

Figure 14:
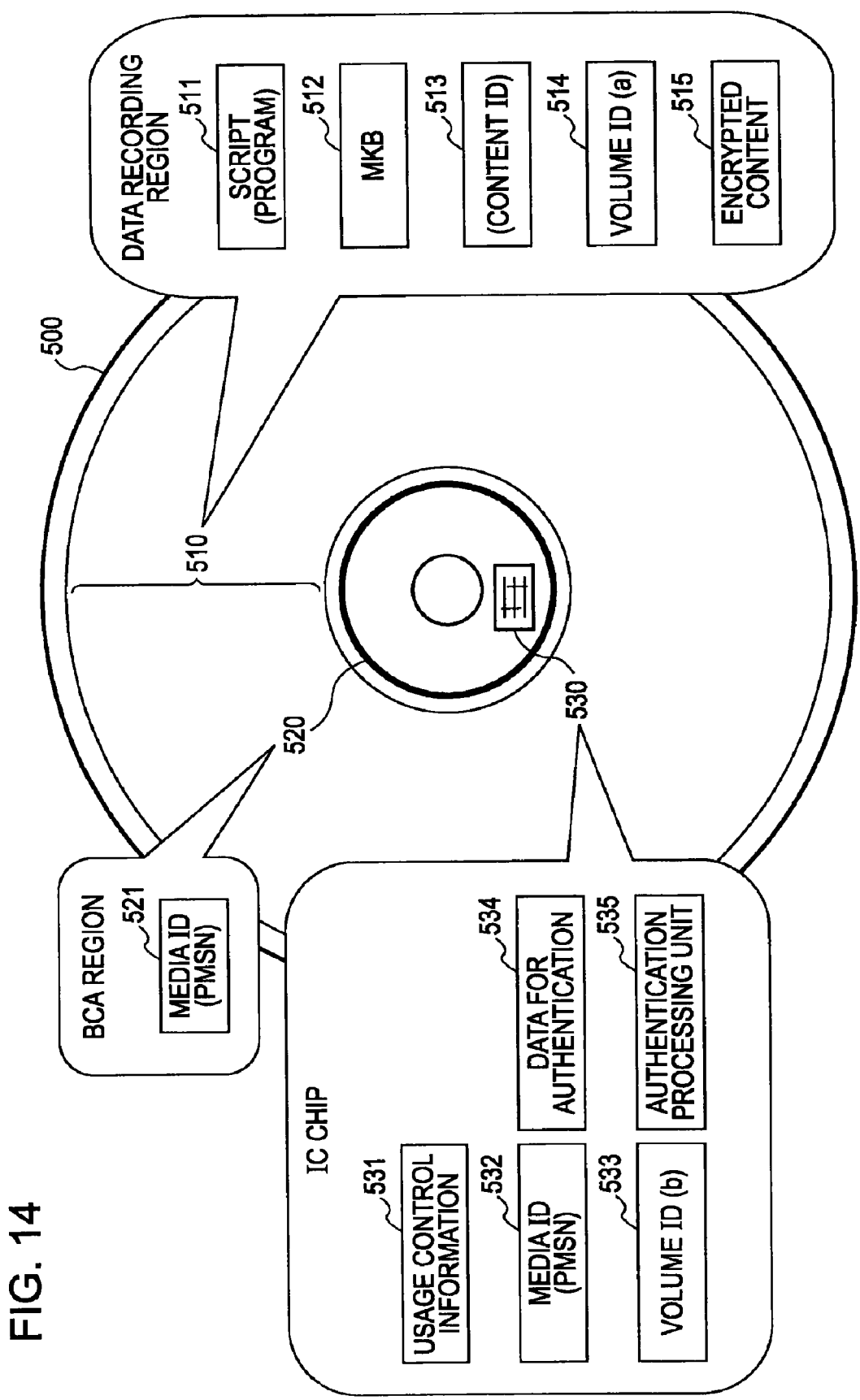
FIG. 14 is a diagram describing a disc data recording configuration example according to a fourth embodiment of the present invention.

FIG. 14 is a diagram describing the recorded data of a disc (information recording medium) 500 in which a content is recorded. The disc 500 is a disc, for example, such as DVD (Digital Versatile Disc), Blu-ray Disc (registered trademark), or the like, wherein a content such as a movie or the like is recorded in the data recording region thereof.

The disc 500 includes, in the same way as described in the first embodiment with reference to FIG. 3, a data recording region 510 in which a content or the like is recorded, and a BCA (burst cutting area) region 520 in which a media ID (e.g., PMSN) 521 which is identification information unique to a disc is recorded, and further includes an IC chip 530 in which usage control information 531 is recorded.

The following data is recorded in the data recording region 510 of the disc 500.

Script (program) 511 which is a program for executing various types of data processing, MKB (Media Key Block) 512 which is an encryption key block in which key information to be applied to decoding processing of a later-described encrypted content 515 is stored, Content ID 513 serving as content identification information, Volume ID(a) 514 which is an identifier serving as a manufacturing serial No. of the disc 500, and Encrypted content 515 which is data obtained by encrypting a content, for example, such as a movie or the like Further, the following data is recorded in the BCA region 520 of the disc 500.

Media ID (PMSN) 521 which is Identification Information Unique to a Disc

As described above, the BCA region is a region different from a normal data recording region, wherein data is recorded by physical cutting different from a normal data recording method. Accordingly, rewriting is difficult for the recorded data of the BCA region, and with reproduction processing as well, particular reading processing different from normal data reproduction processing is employed.

Further, the following data and functions are included in the IC chip 530.

Usage control information 531 in which the usage conditions of the encrypted content 515, e.g., content reproduction permission information, e.g., the number of times which reproduction is permitted (including unlimited, etc.), reproduction limit, and further, reproduction output permission information, content copy permission information, e.g., the number of times which copying is permitted (zero times is prohibited), copy limit, and further, content output permission information, e.g., validity of digital output, and so forth are recorded, Media ID (e.g., PMSN) 532 which is identification information unique to a disc, Volume ID(b) 533 employed as the generating information of an encryption key to be applied to decoding of the encrypted content 515, Data for authentication 534, and Authentication processing unit 535

Description will be made regarding various types of processing sequence accompanying authentication processing employing a disc having the data storage configuration shown in FIG. 14, with reference to FIGS. 15 through 19. FIGS. 15 through 19 are diagrams describing the following authentication processes, respectively.

Example 1

Figure 15:
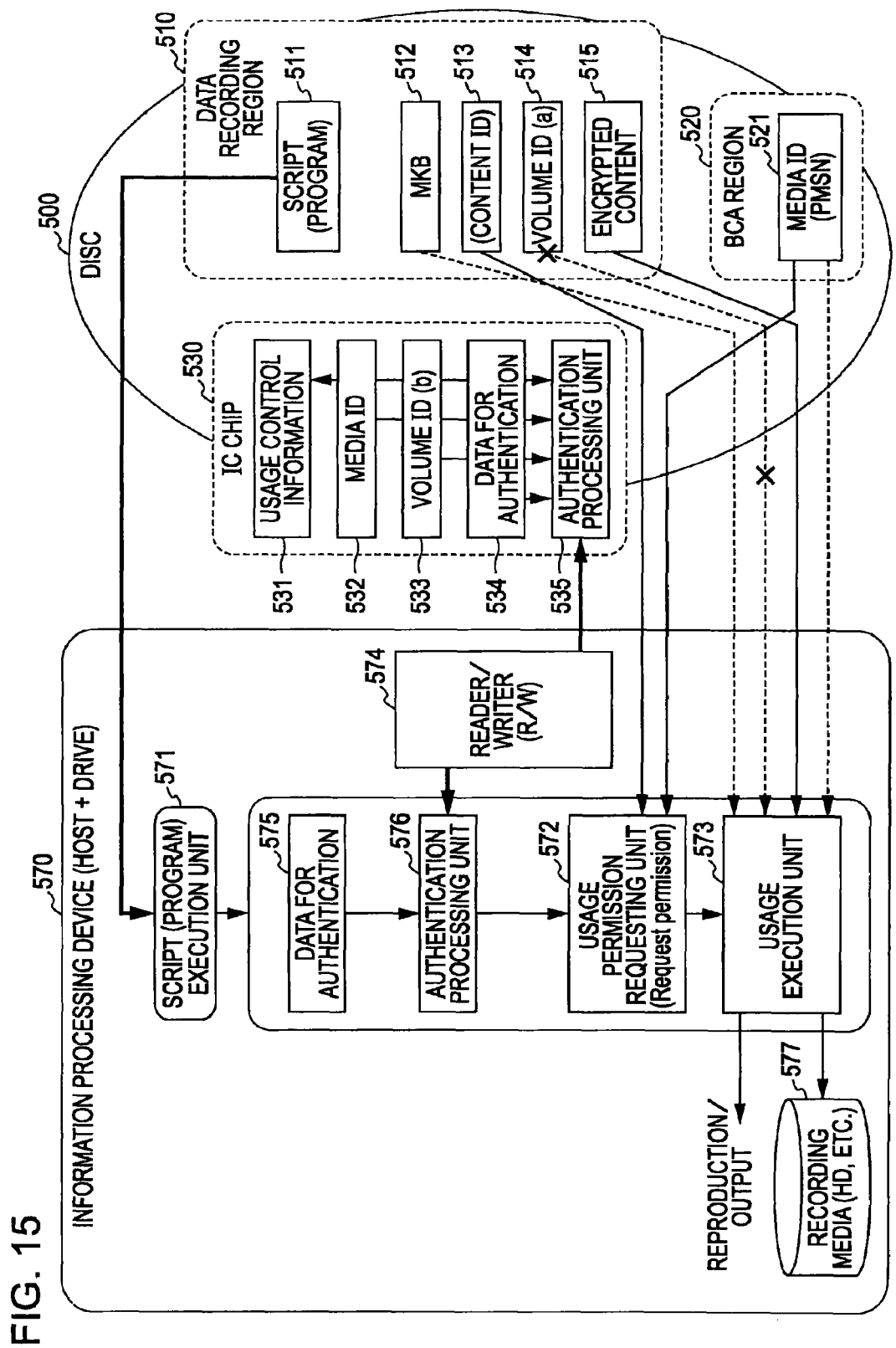
FIG. 15 is a diagram describing a disc recorded content usage sequence according to the fourth embodiment of the present invention.

FIG. 15 illustrates the processing sequence of a processing example for employing a disc recorded content with an information processing device on condition of success in authentication between the information processing device and IC chip.

Example 2

Figure 16:
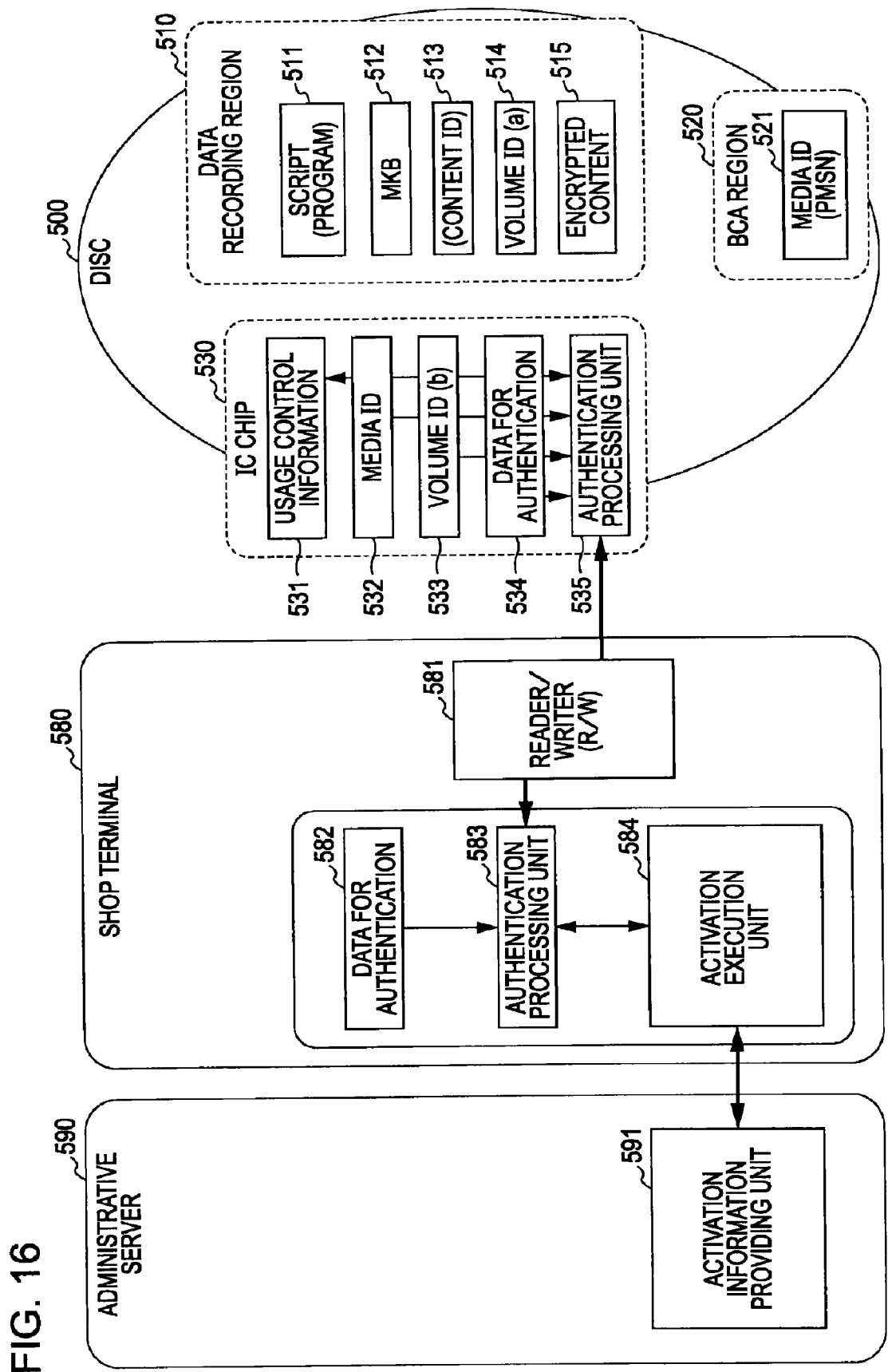
FIG. 16 is a diagram describing a usage control information activation processing sequence as to a disc recorded content according to the fourth embodiment of the present invention.

FIG. 16 illustrates the processing sequence of a processing example for executing authentication between a shop terminal and IC chip at the time of the activation processing of the usage control information stored in the IC chip of a disc.

Example 3

Figure 17:
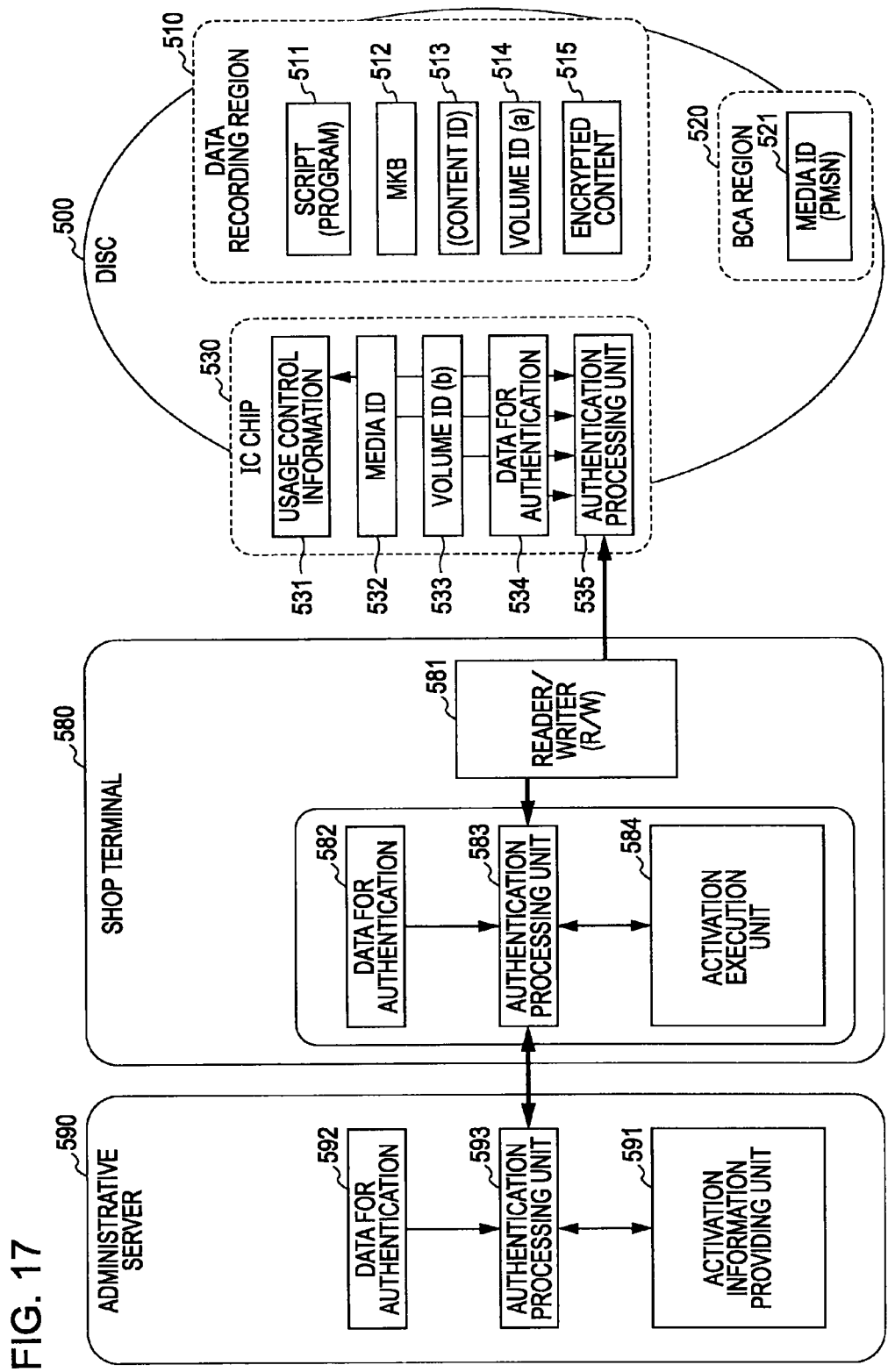
FIG. 17 is a diagram describing a usage control information activation processing sequence as to a disc recorded content according to the fourth embodiment of the present invention.

FIG. 17 illustrates the processing sequence of a processing example for executing authentication between an administrative server, shop terminal, and IC chip at the time of the activation processing of the usage control information stored in the IC chip of a disc.

Example 4

Figure 18:
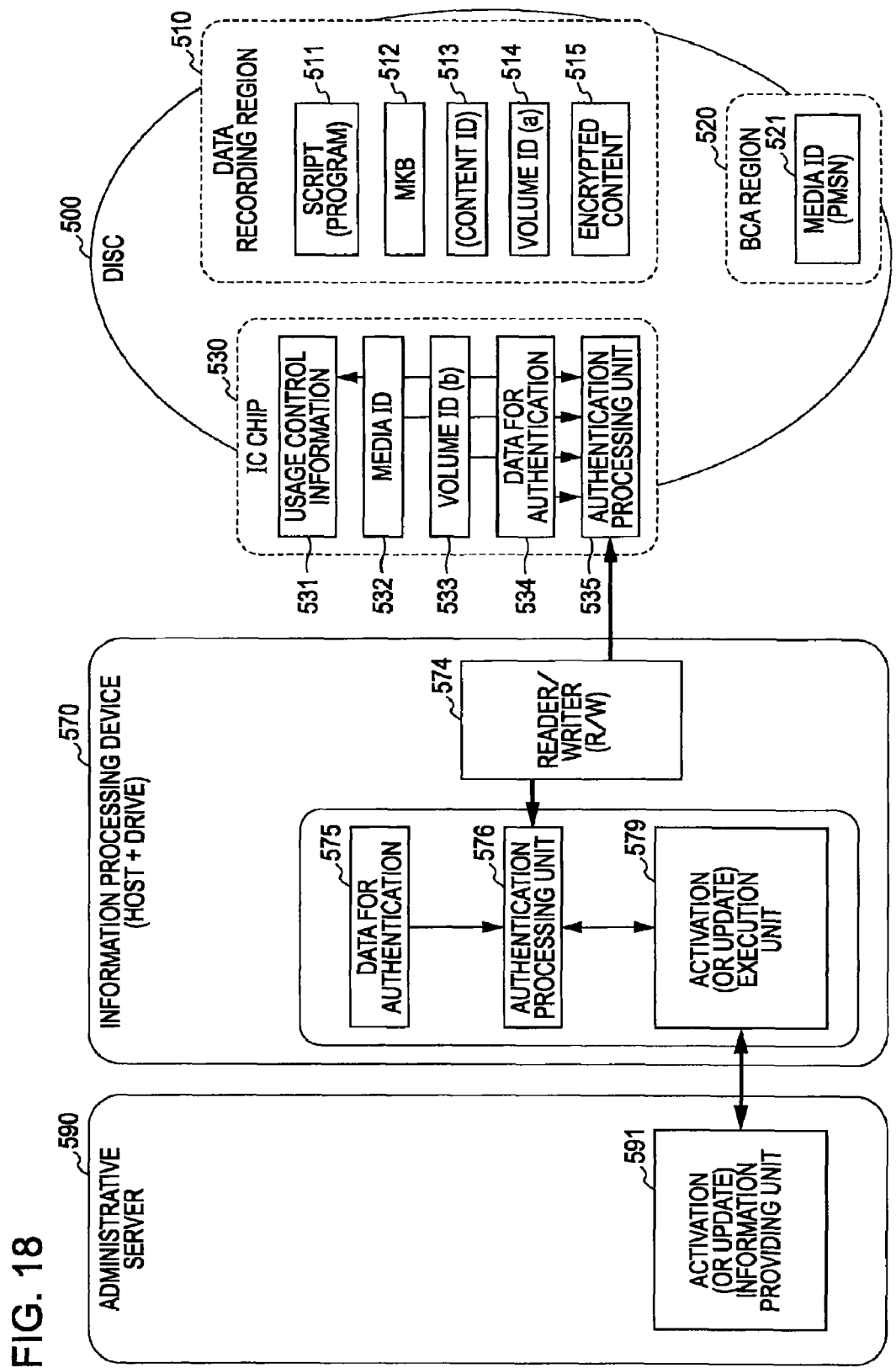
FIG. 18 is a diagram describing a usage control information activation processing sequence as to a disc recorded content according to the fourth embodiment of the present invention.

FIG. 18 illustrates the processing sequence of a processing example for executing authentication between an information processing device and IC chip at the time of the activation (or update) processing of the usage control information stored in the IC chip of a disc.

Example 5

Figure 19:
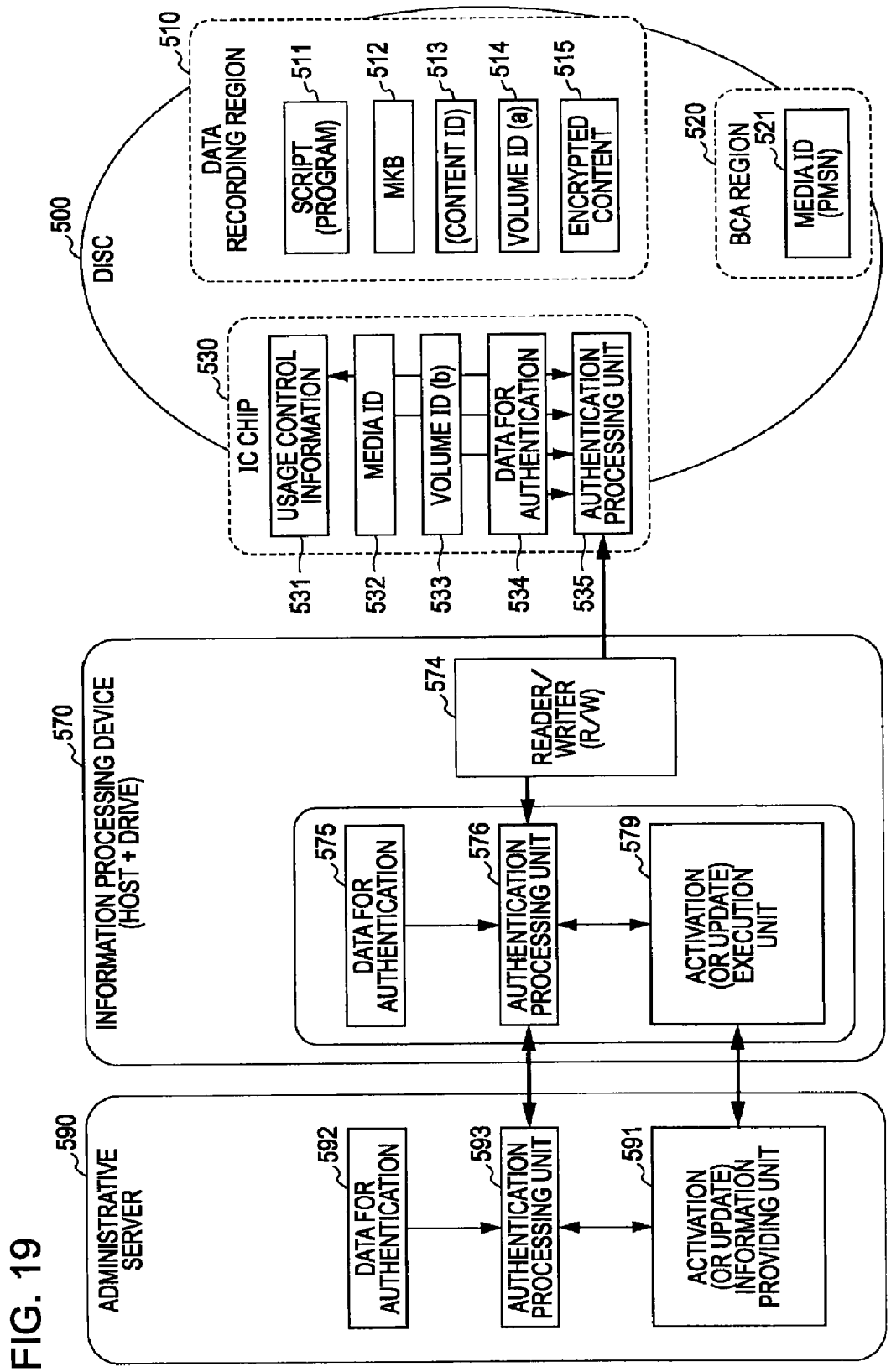
FIG. 19 is a diagram describing a usage control information activation processing sequence as to a disc recorded content according to the fourth embodiment of the present invention.

FIG. 19 illustrates the processing sequence of a processing example for executing authentication between an administrative server, information processing device, and IC chip at the time of the activation (or update) processing of the usage control information stored in the IC chip of a disc.

Example 1

A Processing Example for Employing a Disc Recorded content with an information processing device on Condition of success in authentication between the Information Processing Device and IC Chip First, description will be made regarding a processing example for employing a disc recorded content with an information processing device on condition of success in authentication between the information processing device and IC chip, with reference to FIG. 15.

The information processing device 570 shown in FIG. 15 can perform content reproduction or content copy processing by mounting various types of discs, but it is desirable to perform usage of the content following confirming that the mounted disc is an authorized disc in which an authorized content is stored. Also, from the perspective of the disc side, it is desirable to permit usage of the content only at an authorized information processing device. Note that an authorized device or authorized disc means a device or disc following, for example, the AACS standard, wherein the usage of the content is realized under predetermined content usage control, such as the AACS standard or the like.

The information processing device and disc perform authentication processing as processing for confirming validity. With the present embodiment, an authentication processing unit 535 is provided in the IC chip 530 mounted on the disc, and performs authentication processing with an authentication processing unit 576 of the information processing device 570.

The information processing device 570 includes an authentication processing unit 576, and data for authentication 575, and is configured so as to perform authentication by employing such data. The IC chip 530 also includes an authentication processing unit 535 and data for authentication 534, and is configured so as to perform authentication by employing such data.

The data for authentication 534 including data for authentication, e.g., the public key of the AACS management center, public key and secret key which are set so as to correspond to the IC chip 530, and so forth is recorded in the IC chip 530. Similarly, the data for authentication 575 including the public key of the AACS management center, public key and secret key which are set so as to correspond to the information processing device 570, and so forth is recorded in the information processing device 570. The authentication processing unit 535 within the IC chip 530, and the authentication processing unit 576 of the information processing device 570 employ such data for authentication to perform authentication processing. In this case, the authentication processing unit 576 of the information processing device 570 performs data communication with the authentication processing unit 535 within the IC chip 530 through a reader/writer (R/W) 574.

Following this authentication processing being completed, and validity of both of the information processing device 570 and IC chip 530 (disc 500) being confirmed, the data recorded in the IC chip 530 or disc 500 is used.

Note that at the time of usage of the content, after success in this authentication, in the same way as with the above-mentioned embodiment, the activation confirmation processing of the usage control information 531 is performed. This processing is executed by the usage permission requesting unit 572. Confirmation of activation is executed, for example, as confirmation processing regarding whether or not the volume ID(b) 533 is stored.

Subsequently, with the usage execution unit 573, usage of the content, i.e., usage processing such as reproduction processing, copy processing as to the recording medium 577, or the like is executed. Note that at the time of content decoding, the volume ID(b) 533 stored in the IC chip 530 is employed as encryption key generating information.

Thus, with the present embodiment, an arrangement is made wherein a disc content or data within the IC chip is used on condition of success in authentication processing, whereby usage of an unauthorized disc or the like can be prevented.

With the present embodiment, all of the data for the authentication processing function and authentication processing is stored in the IC chip, whereby authentication processing can be performed without driving the disc, i.e., without reading out the data of the data recording region or BCA region, and accordingly, effective authentication is realized.

Example 2

A Processing Example for Executing Authentication Between a Shop Terminal and IC Chip at the Time of the Activation Processing of the Usage Control Information Stored in the IC Chip of a Disc Next, description will be made regarding an authentication sequence with a processing example for executing authentication between a shop terminal 580 and IC chip 530 at the time of the activation processing of the usage control information stored in the IC chip 530 of the disc 500, with reference to FIG. 16.

The shop terminal 580 includes a reader/writer (R/W) 581 for executing reading/writing of the data of the IC chip 530, data for authentication 582, authentication processing unit 583, and activation execution unit 584.

The data for authentication 534 including data for authentication, e.g., the public key of the AACS management center, public key and secret key which are set so as to correspond to the IC chip 530, and so forth is recorded in the IC chip 530. Similarly, the data for authentication 582 including the public key of the AACS management center, public key and secret key which are set so as to correspond to the shop terminal 580, and so forth is also recorded in the shop terminal 580. The authentication processing unit 535 within the IC chip 530, and the authentication processing unit 583 of the shop terminal 580 employ such data for authentication to perform authentication processing. In this case, the authentication processing unit 583 of the shop terminal 580 performs data communication with the authentication processing unit 535 within the IC chip 530 through a reader/writer (R/W) 581.

Before performing the activation processing of the usage control information 531, authentication processing is executed between the authentication processing unit 583 of the shop terminal 580, and the authentication processing unit 535 within the IC chip 530. That is to say, validity of both of the shop terminal 580 and disc 500 is confirmed. Specifically, it is confirmed that the shop terminal 580 and disc 500 are a terminal and disc, for example, following the AACS standard.

With this authentication processing, the processing proceeds to the activation processing of the usage control information 531 on condition that the validity of the shop terminal and disc has been confirmed. The activation processing of the usage control information 531 may be executed as setting of a flag, or writing processing of specific code information, as described above with reference to FIG. 7, or may be executed as writing processing of the volume ID(b) as to the IC chip described above with reference to FIG. 10.

With regard to the processing in the case of performing writing processing of the volume ID(b) as to the IC chip, the following processing is executed at the shop terminal 580. For example, after a disc is legally purchased, the above-mentioned authentication processing succeeds, and validity of both is confirmed, the activation execution unit 584 of the shop terminal 580 performs writing processing of the volume ID(b) as to the IC chip 530. Note that an arrangement may be made wherein the usage control information 531 is also written along with the volume ID(b) 533 at the time of this activation processing.

This usage control information activation processing may be executed by the shop terminal 210 alone in accordance with a program on the shop terminal 580. Alternatively, an arrangement may be made wherein the disc identification information such as the media ID, and the content identification information such as the content ID are transmitted to an administrative server 590 for performing the usage management of contents, the activation permission information based on confirmation of the identification information at an activation information providing unit 591 of the administrative server 590 is received, thereby performing activation.

Example 3

A Processing Example for Executing Authentication Between an Administrative Server, Shop Terminal, and IC Chip at the Time of the Activation Processing of the Usage Control Information Stored in the IC Chip of a Disc Next, description will be made regarding a processing example for executing authentication between the administrative server 590, shop terminal 580, and IC chip 530 at the time of the activation processing of the usage control information 531 stored in the IC chip 530 of the disc 500. The storage data of the disc 500 is the same data as described with reference to FIGS. 14 through 16. The shop terminal 580 includes a reader/writer (R/W) 581 for executing reading/writing of the data of the IC chip 530, data for authentication 582, authentication processing unit 583, and activation execution unit 584. Also, the administrative server 590 includes data for authentication 592, and authentication processing unit 593.

The data for authentication 534 of the IC chip 530 of the disc 500, the data for authentication 582 of the shop terminal 580, the data for authentication 592 of the administrative server 590 are each data for authentication including data for authentication, e.g., the public key of the AACS management center, the public key and secret key set so as to correspond to each device, and so forth.

Before the activation processing of the usage control information 531 is performed, authentication processing is executed between the authentication processing unit 583 of the shop terminal 580, and the authentication processing unit 535 within the IC chip 530. That is to say, validity of both of the shop terminal 580 and disc 500 is confirmed. Specifically, it is confirmed that the shop terminal 580 and disc 500 are a terminal and disc following, for example, the AACS standard.

Further, authentication processing is executed between the authentication processing unit 583 of the shop terminal 580, and the authentication processing unit 593 of the administrative server 590. That is to say, validity of both of the shop terminal 580 and administrative server 590 is confirmed. Specifically, it is confirmed that the shop terminal 580 and administrative server 590 are a terminal and server following, for example, the AACS standard.

Thus, the two authentication processes of (a) authentication processing between the shop terminal 580 and IC chip 530, and (b) authentication processing between the administrative server 590 and shop terminal 580 are performed, whereby validity between the IC chip (disc), shop terminal, and administrative server can be confirmed mutually.

The processing proceeds to the activation processing of the usage control information 531 on condition of success in such authentication processes. The activation processing of the usage control information 531 is, for example as described above with reference to FIG. 7, the setting of a flag, or the writing processing of particular code information. Alternatively, the activation processing of the usage control information 531 may be executed as the writing processing of the volume ID(b) as to the IC chip described above with reference to FIG. 10.

In a case where the writing processing of the volume ID(b) as to the IC chip is performed as the activation processing, for example, the following processing is executed. The activation execution unit 584 of the shop terminal 580 transmits the disc identification information such as the media ID, and the content identification information such as the content ID to the administrative server 590 for performing content usage management. The activation information providing unit 591 of the administrative server 590 transmits activation permission information based on confirmation of the identification information to the activation execution unit 584 of the shop terminal 580. Upon receiving the activation permission information, the activation execution unit 584 of the shop terminal 580 performs the writing processing of the volume ID(b) 533 as to the IC chip 530.

Thus, such an arrangement is made wherein after authentication between the IC chip, shop terminal, and administrative server is executed, and all of the validity confirmation processes are executed, activation of the usage control information is performed, whereby processing by an unauthorized IC chip, unauthorized shop terminal, or unauthorized administrative server can be prevented.

Note that, with the above-mentioned processing example, description has been made assuming an arrangement wherein authentication is performed between the IC chip and shop terminal, and between the shop terminal and administrative server, but an arrangement may be made wherein authentication is performed between the IC chip and administrative server through the shop terminal. For example, success in authentication between either one pair of the IC chip and shop terminal, and the IC chip and administrative server may be set as the execution condition of the activation processing.

Example 4

A Processing Example for Executing Authentication Between an Information Processing Device and IC Chip at the Time of the Activation (or Update) Processing of the Usage Control Information Stored in the IC Chip of a Disc Next, description will be made regarding a processing example for executing authentication between the information processing device 570 which is a user reproduction device, and IC chip 530 at the time of the activation processing or update processing of the usage control information 531 stored in the IC chip 530 of the disc 500, with reference to FIG. 18.

The storage data of the disc 500 is the same data as described with reference to FIGS. 14 through 17. The information processing device 570 includes a reader/writer (R/W) 574 for executing reading/writing of the data of the IC chip 530, data for authentication 575, authentication processing unit 576, and activation (or update) execution unit 579. Also, the administrative server 590 includes an activation information providing unit 591.

The data for authentication 534 of the IC chip 530 of the disc 500, and the data for authentication 575 of the information processing device 570 are each data for authentication including data for authentication, e.g., the public key of the AACS management center, the public key and secret key set so as to correspond to each device, and so forth.

Before the activation processing or update processing of the usage control information 531 is performed, authentication processing is executed between the authentication processing unit 576 of the information processing device 570, and the authentication processing unit 535 within the IC chip 530. That is to say, validity of both of the information processing device 570 and disc 500 is confirmed. Specifically, it is confirmed that the information processing device 570 and disc 500 are a device and disc following, for example, the AACS standard.

The processing proceeds to the activation processing or update processing of the usage control information 531 on condition of success in such an authentication process. For example, in the case of performing the writing processing of the volume ID(b) as to the IC chip as the activation processing, the following processing is executed. The activation execution unit 579 of the information processing device 570 transmits the disc identification information such as the media ID, and the content identification information such as the content ID to the administrative server 590 for performing content usage management. The activation information providing unit 591 of the administrative server 590 transmits activation permission information based on confirmation of the identification information to the activation execution unit 579 of the information processing device 570. Upon receiving the activation permission information, the activation execution unit 579 of the information processing device 570 performs the writing processing of the volume ID(b) 533 as to the IC chip 530.

Thus, such an arrangement is made wherein after authentication between the IC chip and information processing device is executed, and the validity confirmation process is executed, activation or update of the usage control information is performed, whereby processing by an unauthorized IC chip or unauthorized information processing device can be prevented.

Example 5

A Processing Example for Executing Authentication Between an Administrative Server, Information Processing Device, and IC Chip at the Time of the Activation (or Update) Processing of the Usage Control Information Stored in the IC Chip of a Disc Next, description will be made regarding a processing example for executing authentication between the administrative server 590, information processing device 570, and IC chip 530 at the time of the activation processing or update processing of the usage control information 531 stored in the IC chip 530 of the disc 500, with reference to FIG. 19.

The storage data of the disc 500 is the same data as described with reference to FIGS. 14 through 18. The information processing device 570 includes a reader/writer (R/W) 574 for executing reading/writing of the data of the IC chip 530, data for authentication 575, authentication processing unit 576, and activation (or update) execution unit 579. Also, the administrative server 590 includes an activation information providing unit 591, data for authentication 592, and authentication processing unit 593.

The data for authentication 534 of the IC chip 530 of the disc 500, the data for authentication 575 of the information processing device 570, the data for authentication 592 of the administrative server 590 are each data for authentication including data for authentication, e.g., the public key of the AACS management center, the public key and secret key set so as to correspond to each device, and so forth.

Before the activation processing of the usage control information 531 is performed, authentication processing is executed between the authentication processing unit 576 of the information processing device 570, and the authentication processing unit 535 within the IC chip 530. That is to say, validity of both of the information processing device 570 and disc 500 is confirmed. Specifically, it is confirmed that the information processing device 570 and disc 500 are a device and disc following, for example, the AACS standard.

Further, authentication processing is executed between the authentication processing unit 576 of the information processing device 570, and the authentication processing unit 593 of the administrative server 590. That is to say, validity of both of the information processing device 570 and administrative server 590 is confirmed. Specifically, it is confirmed that the information processing device 570 and administrative server 590 are a device and server following, for example, the AACS standard.

Thus, the two authentication processes of (a) authentication processing between the information processing device 570 and IC chip 530, and (b) authentication processing between the administrative server 590 and information processing device 570 are performed, whereby validity between the IC chip (disc), information processing device, and administrative server can be confirmed mutually.

The processing proceeds to the activation processing or update processing of the usage control information 531 on condition of success in such authentication processes. For example, in the case of performing the writing processing of the volume ID(b) as to the IC chip as the activation processing, the following processing is executed. The activation execution unit 579 of the information processing device 570 transmits the disc identification information such as the media ID, and the content identification information such as the content ID to the administrative server 590 for performing content usage management. The activation information providing unit 591 of the administrative server 590 transmits activation permission information based on confirmation of the identification information to the activation execution unit 579 of the information processing device 570. Upon receiving the activation permission information, the activation execution unit 579 of the information processing device 570 performs the writing processing of the volume ID(b) 533 as to the IC chip 530.

Thus, such an arrangement is made wherein after authentication between the IC chip, information processing device, and administrative server is executed, and all of the validity confirmation processes are executed, activation or update of the usage control information is performed, whereby processing by an unauthorized IC chip, unauthorized information processing device, or unauthorized administrative server can be prevented.

Note that, with the above-mentioned processing example, description has been made assuming an arrangement wherein authentication is performed between the IC chip and information processing device, and between the information processing device and administrative server, but an arrangement may be made wherein authentication is performed between the IC chip and administrative server through the information processing device. For example, success in authentication between either one pair of the IC chip and information processing device, and the IC chip and administrative server may be set as the execution condition of the activation processing or update processing.

Fifth Embodiment

Next, description will be made regarding an arrangement example wherein a signature for tampering verification is set to a program such as a script or the like recorded in a disc, signature verification is executed before execution of the program at the information processing device to confirm the validity of the program, thereby performing processing in accordance with the program, for example, such as content usage processing, activation processing of the usage control information, activation confirmation processing of the usage control information, authentication processing, or the like.

Figure 20:
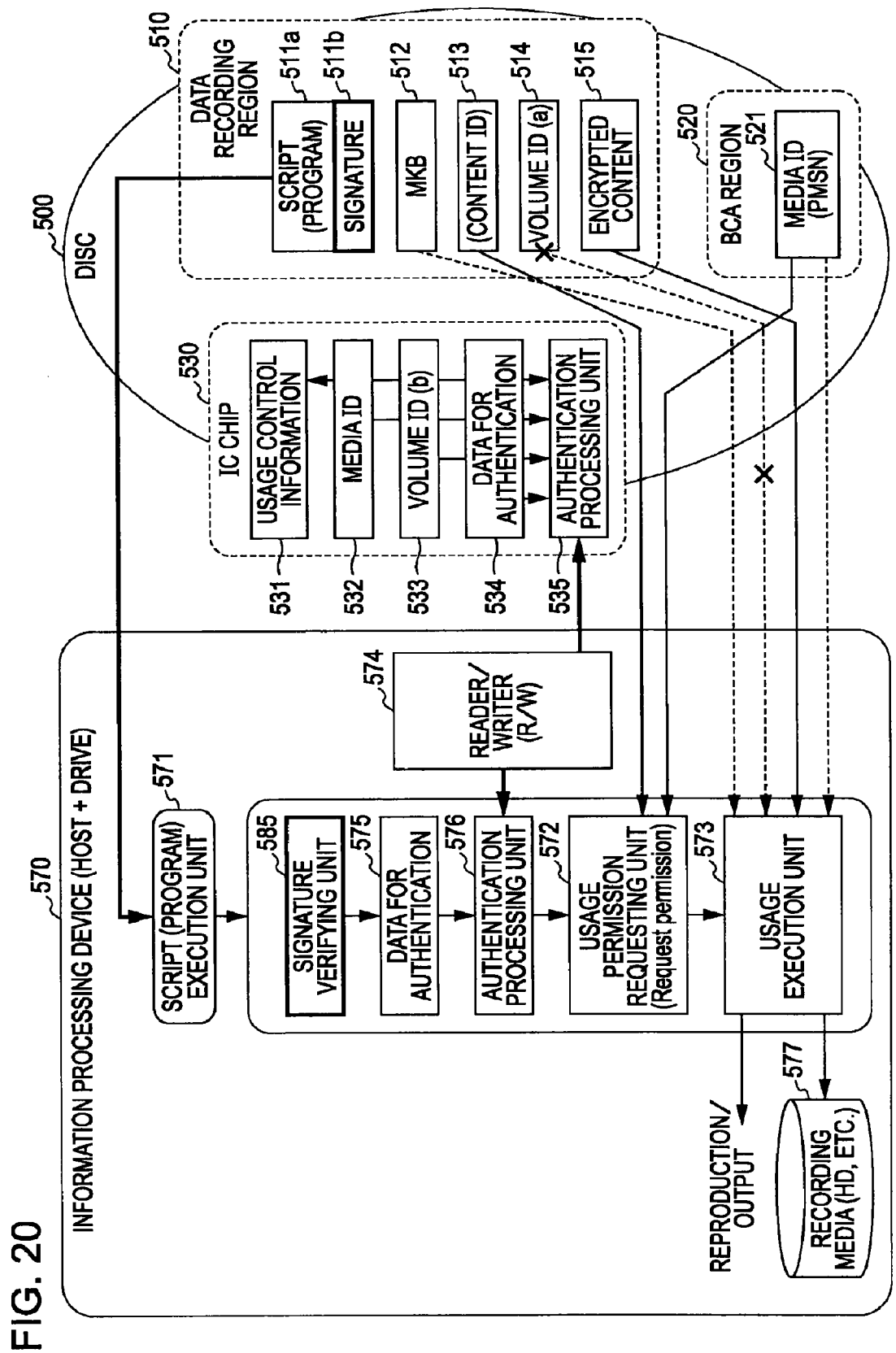
FIG. 20 is a diagram describing a disc recorded content usage sequence according to a fifth embodiment of the present invention.

FIG. 20 is a diagram describing a content usage processing sequence at the information processing device for using the encrypted content 515 recorded in the disc 500. The storage data of the disc 500 shown in FIG. 20 is basically the same as the storage data of the disc described with reference to FIGS. 14 through 19. However, an arrangement is made wherein a signature for tampering verification 511b is set to a script (program) 511a in which a program relating to content usage processing, activation processing of the usage control information, activation confirmation processing of the usage control information, or authentication processing is recorded. The signature is generated, for example, by a secret key of a reliable third party (AACS or the like).

Note that the Java (registered trademark) program may be employed as the script (program). For example, in a case where the disc is a Blu-ray disc, it is desirable to employ BD-J (application specification of BD) which is the Java (registered trademark) program specification corresponding to a Blu-ray disc. BD-J is determined with the application specification of BD, and BD-J (Java (registered trademark)) depends on neither a model nor an OS.

In the case of performing content usage such as reproduction or copy processing of the encrypted content 515, or the like, the information processing device 570 will execute the script (program) 511a in which a program relating to content usage processing is recorded, but before execution of this program, a signature verifying unit 585 executes verification processing of the signature 511b to determine whether or not the script (program) 511a has been tampered. For example, in a case where the signature 511b is generated by the secret key with AACS, signature verification is performed by employing the public key with AACS.

The processing proceeds to the subsequent processing, e.g., authentication processing, activation processing of the usage control information, validity confirmation processing of the usage control information, content usage processing, or the like on condition that confirmation is made that the script (program) 511a has not been tampered.

The processing example shown in FIG. 20 illustrates an example wherein the signature verifying unit 585 executes verification of the signature 511b when executing the authentication processing between the IC chip 530 and information processing device 570, validation confirmation processing of the usage control information at the information processing device 570, content usage processing (reproduction, copy, etc.) in accordance with the script (program) 511a.

The authentication processing is executed on condition that signature verification has succeeded at the signature verifying unit 585, and the script (program) 511a has been determined to be an authorized program which has not been tampered, and subsequently, the validity confirmation processing of the usage control information, and content usage proceeding are performed.

Figure 21:
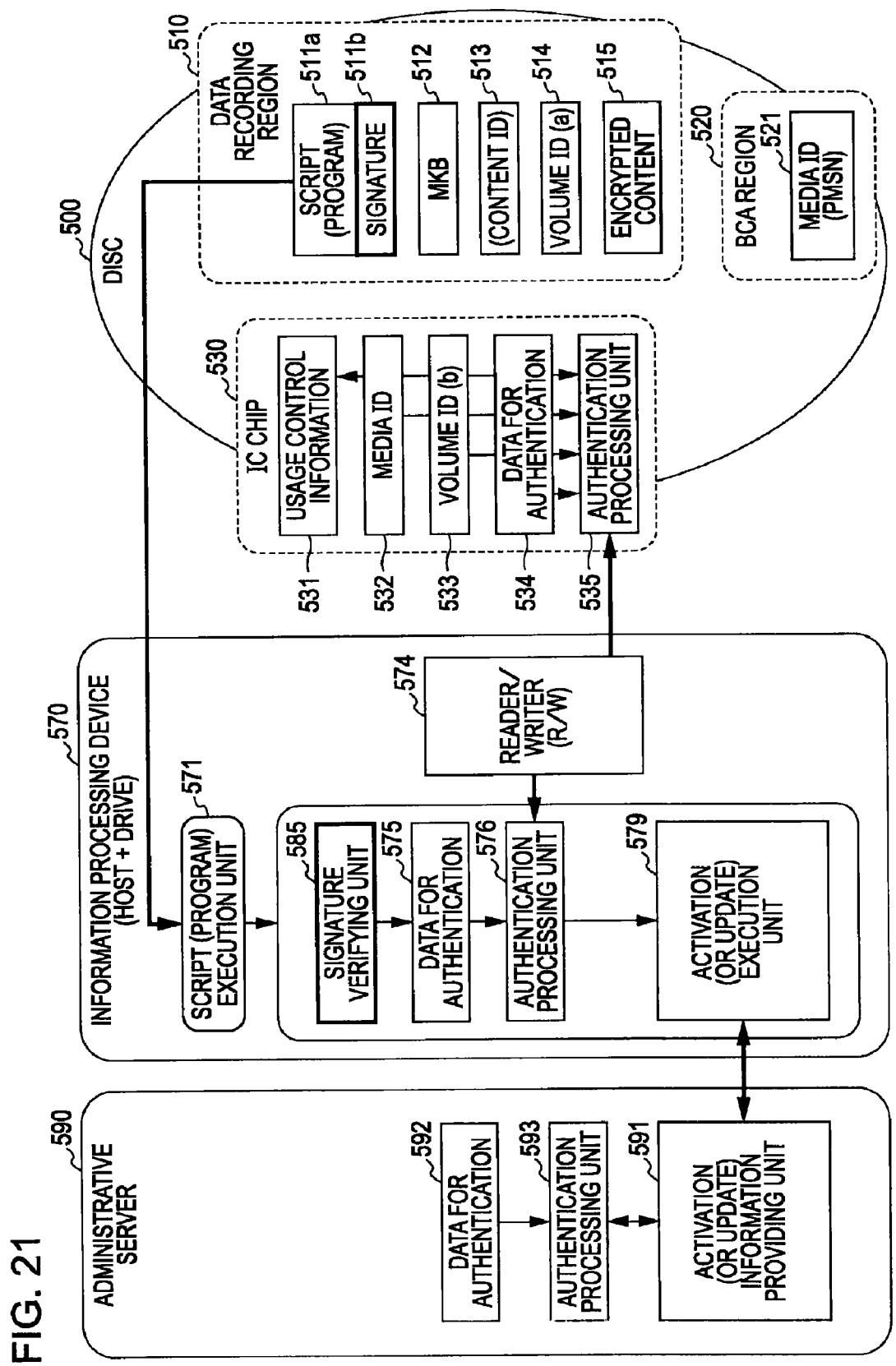
FIG. 21 is a diagram describing a usage control information activation processing sequence as to a disc recorded content according to the fifth embodiment of the present invention.

The processing example shown in FIG. 21 illustrates an example wherein the signature verifying unit 585 executes verification of the signature 511b when executing the authentication processing between the IC chip 530 and information processing device 570, authentication processing between the information processing device 570 and administrative server 590, and activation processing of the usage control information at the information processing device 570 in accordance with the script (program) 511a.

The authentication processing is executed on condition that signature verification has succeeded at the signature verifying unit 585, and the script (program) 511a has been determined to be an authorized program which has not been tampered, and subsequently, the activation processing of the usage control information is performed.

Sixth Embodiment

Figure 22:
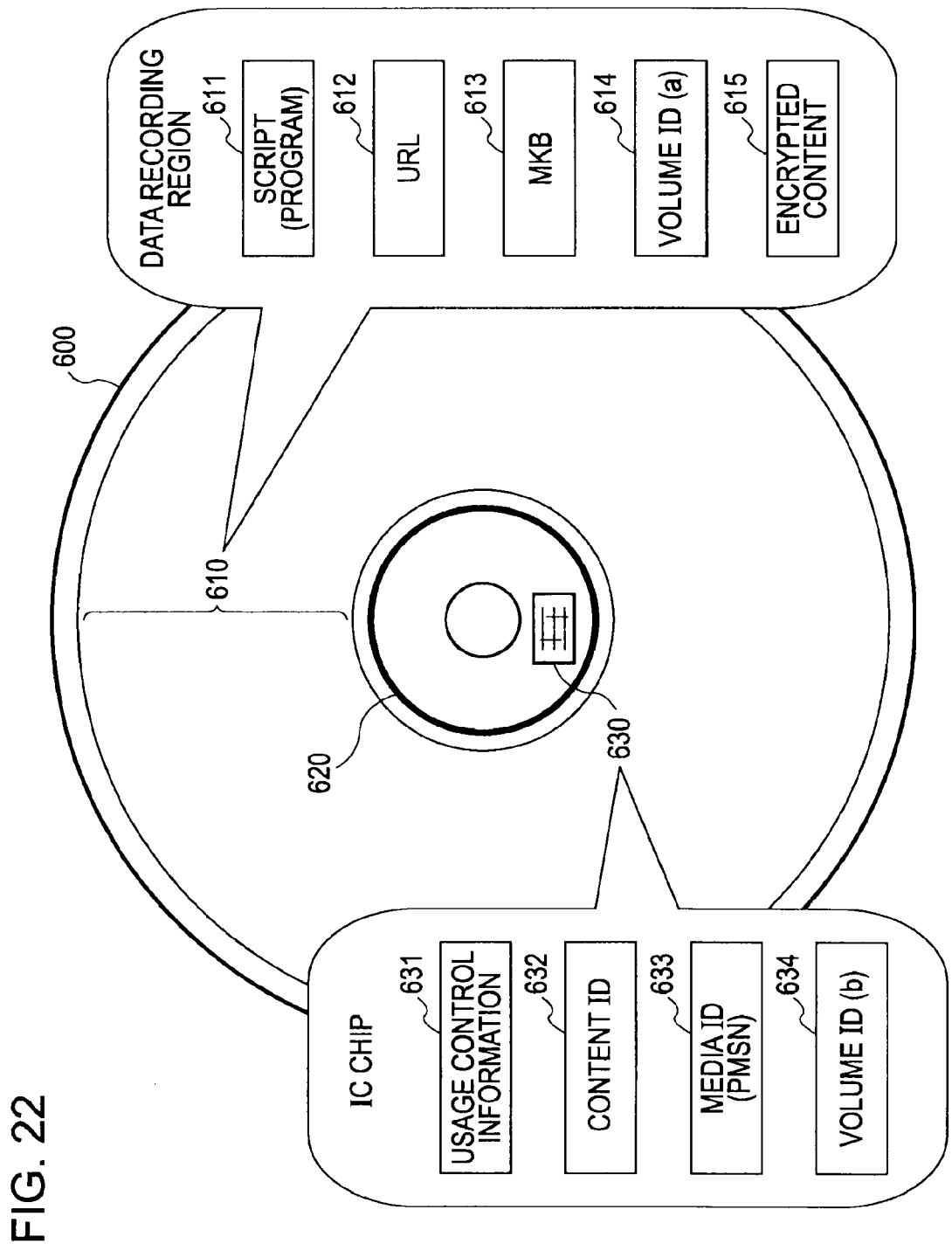
FIG. 22 is a diagram describing a disc data recording configuration example according to a sixth embodiment of the present invention.
Figure 23:
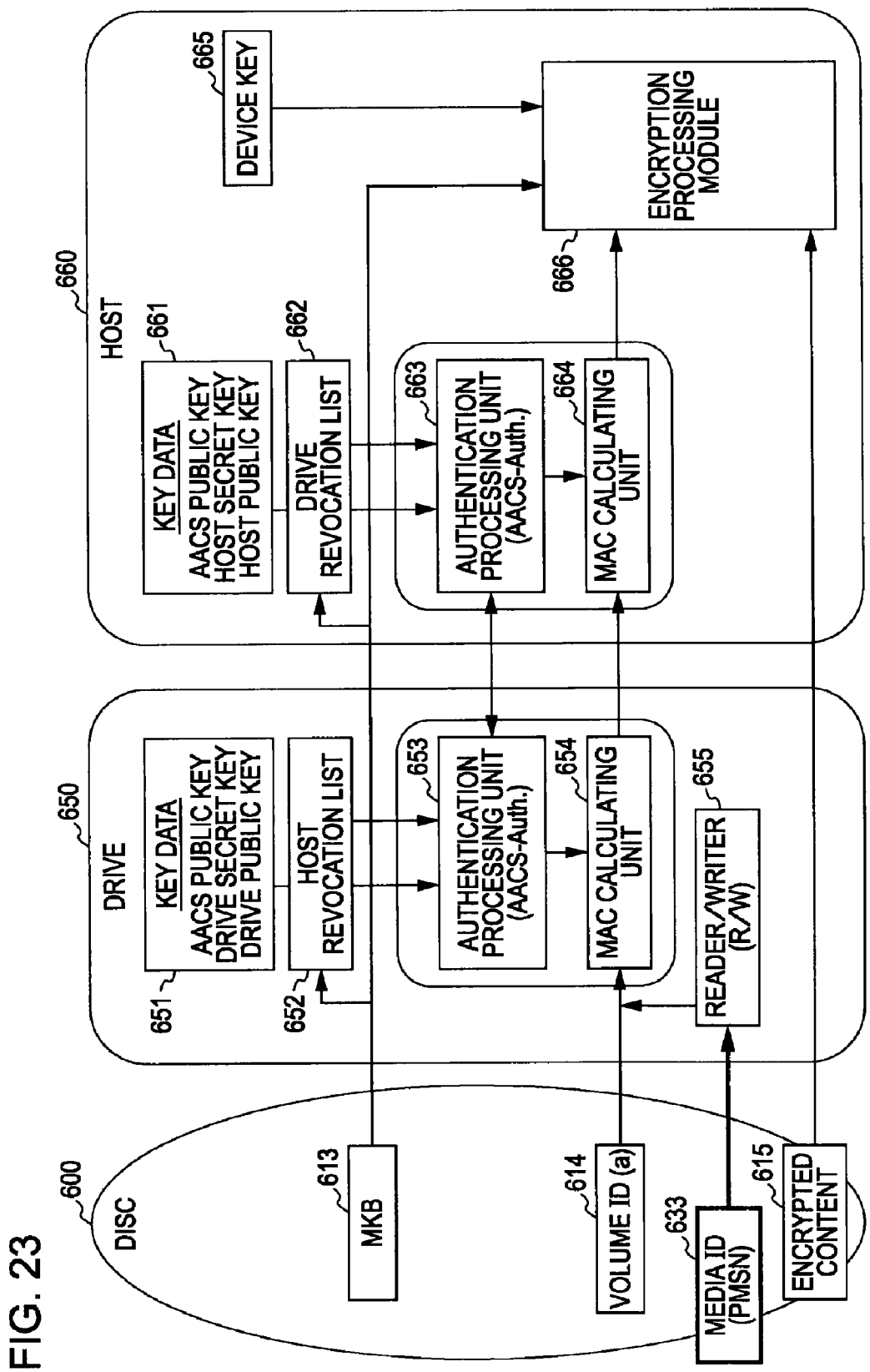
FIG. 23 is a diagram describing a disc recorded content usage sequence according to the sixth embodiment of the present invention.

Arrangement Wherein the Media ID is not Recorded in the BCA but in the IC Chip Alone Next, the arrangement and processing of a sixth embodiment of the present invention will be described with reference to FIGS. 22 through 24. FIG. 22 is a diagram describing the recorded data of a disc (information recording medium) 600 in which a content is recorded. The disc 600 is a disc, for example, such as DVD (Digital Versatile Disc), Blu-ray Disc (registered trademark), or the like, wherein a content such as a movie or the like is recorded in the data recording region thereof.

The disc 600 has a configuration different from the configuration described in the first through fifth embodiments, wherein the media ID (e.g., PMSN) which is identification information unique to a disc is not recorded in a BCA (burst cutting area) region 620. Though the BCA region 620 is illustrated in the drawing, but with the present embodiment, an arrangement may be made wherein the BCA region itself is omitted.

The disc 600 is configured to include a data recording region 610 in which a content or the like is recorded, and an IC chip 630 in which usage control information 631 is recorded.

The IC chip 630 further records

Content ID 632 which is identification information of a later-described encrypted content 615, Media ID (e.g., PMSN) 633 which is identification information unique to a disc, and Volume ID(b) 634 employed as encryption key generating information to be applied to decoding to a later-described encrypted content 615.

The following data is recorded in the data recording region 610 of the disc 600.

Script (program) 611 which is a simple program for executing reproduction or copy processing in accordance with the AACS standard, URL 612 of a server to be connected to obtain permission of copy processing at the time of copy processing of a disc recorded content, MKB (Media Key Block) 613 which is an encryption key block in which key information to be applied to decoding processing of a later-described encrypted content 615 is stored, Volume ID(a) 614 serving as a manufacturing serial No. of the disc 600, and Encrypted content 615 which is data obtained by encrypting a content, for example, such as a movie or the like A reproduction processing sequence of a content recorded in a disc having the data storage configuration shown in FIG. 22 will be described with reference to FIG. 23. FIG. 23 illustrates from the left a disc 600 in which a content is stored, a drive 650 on which the disc 600 is mounted to perform reading of data, and a host 660 which obtains recorded data of the disc 600 through the drive 650 to perform decoding or reproduction of a content. Note that though the drawing illustrates the drive 650 and host 660 as separate configurations, the drive and host may have an integral configuration of one device, for example, such as a reproducing device or the like. The disc (information recording medium) 600 at the left end is a disc having the data storage configuration described with reference to FIG. 22.

The drive 650 includes key data 651 including a public key of the AACS management center, a drive public key, and a drive secret key, and a host revocation list 652. The host revocation list 652 is a list in which the identification information of a host determined to be an unauthorized host by the AACS management center is recorded, i.e., a blacklist. For example, the identification number of a host public key certificate corresponding to the host is recorded as the identification information of the host. A signature by the secret key of the AACS management center is added to the host revocation list 652 so as to prevent tampering.

The host 660 includes key data 661 including a public key of the AACS management center, a host public key, and a host secret key, and a drive revocation list 662. The drive revocation list 662 is a list in which the identification information of a drive determined to be an unauthorized drive device by the AACS management center is recorded, i.e., a blacklist. For example, the identification number of a drive public key certificate corresponding to the drive is recorded as the identification information of the drive. A signature by the secret key of the AACS management center is added to the drive revocation list 662 so as to prevent tampering. Note that an arrangement may be made wherein the host revocation list 652 and drive revocation list 662 are recorded in the disc 600, and the drive 650 and host 660 read and employ the data recorded in the disc 600.

Description will be made regarding a sequence in the case of the host 660 performing reproduction of a content. The host 660 and drive 650 first execute authentication processing between an authentication processing unit 663 of the host 660 and an authentication processing unit 653 of the drive 650. This authentication processing is executed in accordance with the processing sequence stipulated by AACS. With this processing, principal processes executed by each device are as follows.

The drive 650 reads out the host revocation list 652, employs the public key of the AACS management center to perform signature verification of the host revocation list 652, thereby confirming that there is no tampering, and confirming that the identification information of the host 660 has not been described in the host revocation list 652, i.e., that the host 660 has not been revoked.

The host 660 also reads out the drive revocation list 662, employs the public key of the AACS management center to perform signature verification of the drive revocation list 662, thereby confirming that there is no tampering, and confirming that the identification information of the drive 650 has not been described in the drive revocation list 662, i.e., that the drive 650 has not been revoked.

In a case where determination is made that both of the drive 650 and host 660 have not been revoked, communication of encrypted data in accordance with the AACS standard is executed between the drive 650 and host 660, and a shared secret key is generated, and is shared between the drive 650 and host 660.

Upon authentication between the host and drive being completed, the drive 650 reads out the volume ID(a) 614 and media ID (PMSN) 633 from the disc 600. With the present embodiment, the media ID (PMSN) 633 is recorded in the IC chip 630 embedded in the disc 600, and the drive 650 reads out the media ID (PMSN) 633 from the IC chip 630 of the disc 600 through a reader/writer 655.

The drive 650 employs the data read out from the disc to execute MAC generation processing to which the shared key generated at the authentication processing is applied, at an MAC calculating unit 654, and transmits the generated MAC value and media ID (PMSN) 633 to the host 660.

The MAC calculating unit 654 of the host 660 executes MAC verification processing to which the shared key is applied. Specifically, the MAC calculating unit 654 subjects the media ID received from the drive 650 MAC generation processing to which the shared key generated at the authentication processing is applied, and compares the generated MAC value and the MAC value received from the drive 650. In a case where the two MAC values are matched, determination is made that verification has succeeded, and an encryption processing module 666 executes content decoding and reproducing processing.

With the content decoding executed at the encryption processing module 666, according to the processing of the MKB 613 to which a device key [Kd] 665 is applied, a media key [Km] is obtained from the MKB 613, and according to the processing to which the media key [Km] is applied, a key for content decoding is obtained, and accordingly, content decoding processing is executed.

Next, description will be made regarding a content usage processing sequence such as reproduction or copy of a content recorded in the disc having the data storage configuration shown in FIG. 22.

Figure 24:
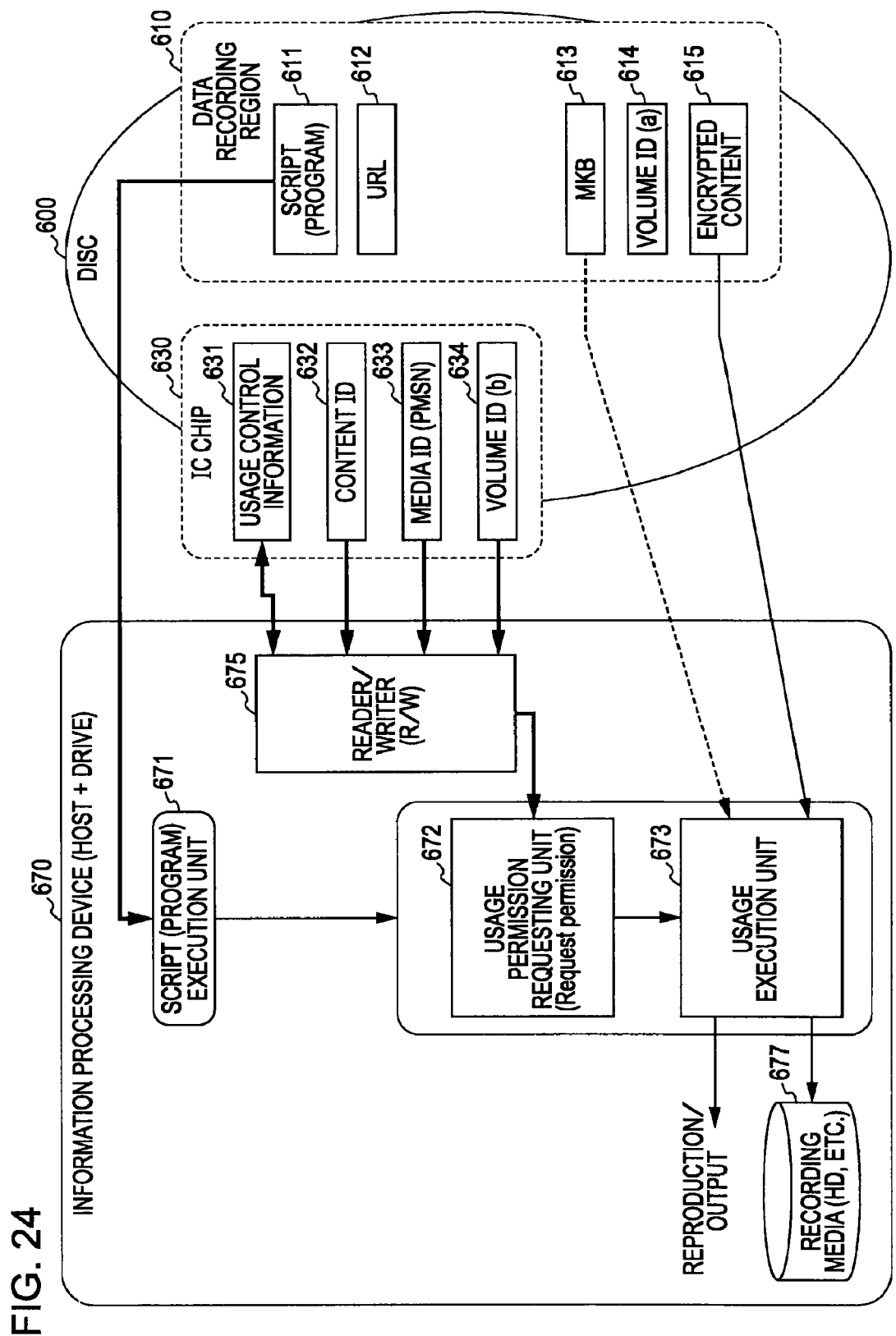
FIG. 24 is a diagram describing a disc recorded content usage sequence according to the sixth embodiment of the present invention.

FIG. 24 illustrates an information processing device 670 for executing content usage processing, and the disc 600 in which a content to be used is stored. The disc 600 is a disc having the data storage configuration described with reference to FIG. 22, and has a configuration wherein the media ID (PMSN) is not recorded in the BCA region but in the IC chip 630 alone.

The information processing device 670 is a device having both of a function serving as a host for executing usage of the content such as content reproduction processing or copy processing or the like, and a drive function for performing driving of a disc, and reading of data.

When performing reproduction of the encrypted content 615 recorded in the disc 600, or copying thereof to a recording medium 677, the information processing device 670 determines the validity of reproduction and copying in accordance with the usage control information 631 recorded in the IC chip 630 provided in the disc 600 without obtaining permission information from the administrative server, and in the case of confirming that reproduction and copying are permitted, performs content usage.

In response to the content usage request from an unshown user input unit, a usage permission requesting unit 672 of the information processing device 670 first reads out the usage control information 631 from the IC chip 630 through the reader/writer (R/W) 675, and further, reads out the content ID 632 of the content corresponding to the content usage request, and media ID (PMSN) 633 from the IC chip 630.

The usage permission requesting unit 672 employs the media ID (PMSN) 633 and content ID 632 to confirm whether or not the content determined with the content ID 632 is a content of which the usage is permitted at the usage control information 631. Content usage permission information according to the media ID (PMSN) and content ID is recorded in the usage control information 631, and the usage permission requesting unit 672 determines whether or not the usage is permitted based on this recorded information. That is to say, the usage permission requesting unit 672 performs determination regarding whether or not content usage is permitted by employing the usage control information 631 recorded in the IC chip 630.

Note that before the usage control information is referenced, confirmation is made whether or not the usage control information is activated. Subsequently, the usage control information 631 confirmed as valid is referenced to confirm whether or not the content determined with the content ID 632 is a content of which the usage is permitted. In the case of confirming that the content is a content of which the usage is permitted, a usage execution unit 673 reads out the encrypted content 615 recorded in the data recording region 610 of the disc 600 to execute reproduction, or copy processing or the like.

Note that at the time of content usage processing, the decoding processing of the encrypted content 615 is executed. At this time, in the same way as with the above-mentioned embodiments, the volume ID(b) 634 is employed as the encryption key generating information.

Thus, with the content usage processing according to the present embodiment, an arrangement is made wherein the content ID and media ID (PMSN) are also recorded in the IC chip 630, thereby enabling reading of data from the data recording region 610, and reading of data from the BCA region 620 to be omitted at the time of content usage validity determination, and accordingly, enabling rapid determination processing to be performed.

Seventh Embodiment

Installation of Software and Usage Control Processing Examples

Next, description will be made as a seventh embodiment regarding installation of software and usage control processing examples with reference to FIG. 25 and thereafter.

Figure 25:
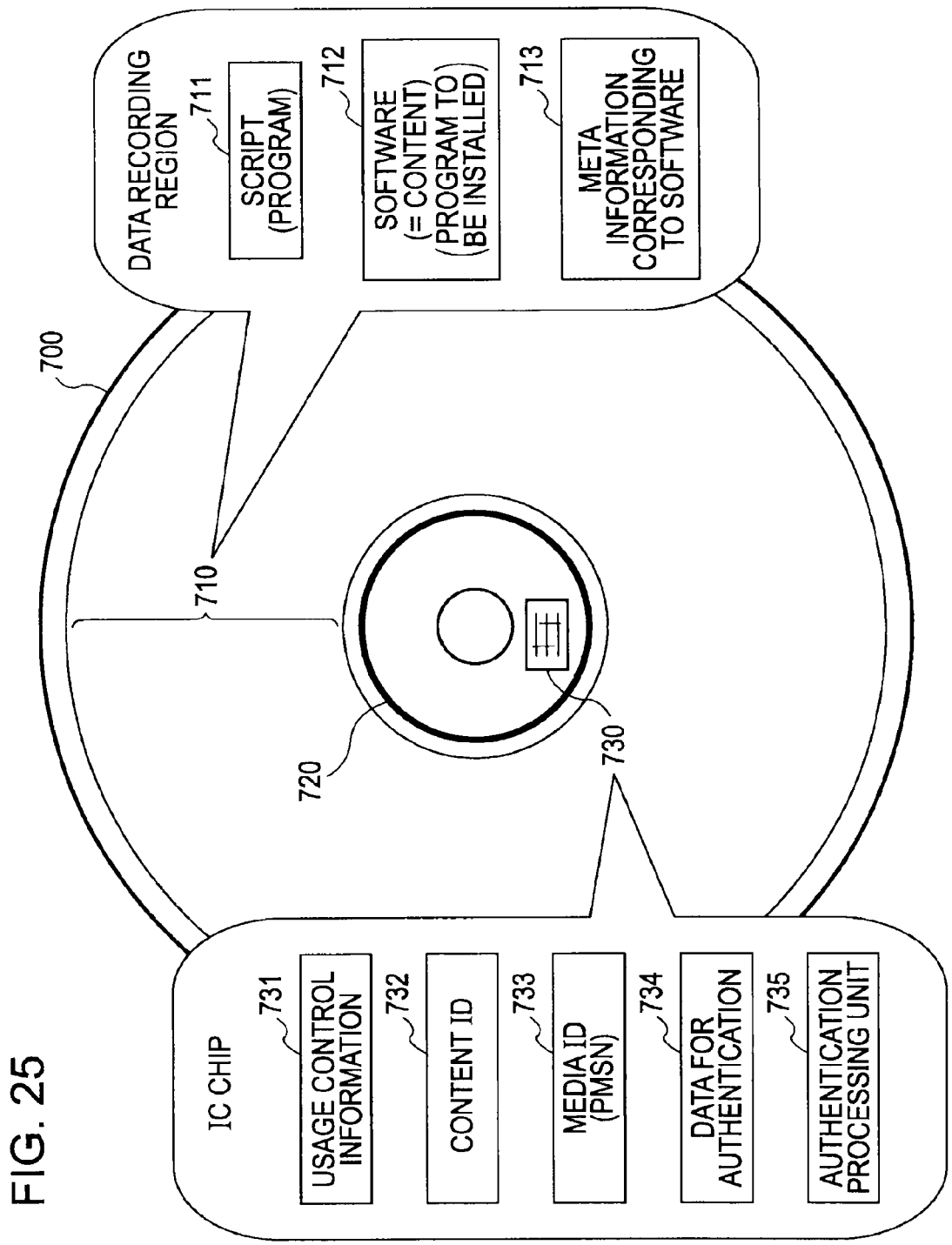
FIG. 25 is a diagram describing a disc data recording configuration example according to a seventh embodiment of the present invention.

The disc 700 shown in FIG. 25 includes, as with the above-mentioned embodiments, a data recording region 710, BCA region 720, and IC chip 730.

The following data is recorded in the data recording region 710.

Script (program) 711 for executing various types of data processing,

Software (content) 712 which is a program to be installed to an information processing device such as a PC or the like, and Meta information corresponding to software 713 set so as to correspond to the software 712

The IC chip includes

Usage control information 731 including usage permission information corresponding to the software (content) 712, Content ID 732 serving as identification information corresponding to the software (content) 712, Media ID 733 serving as an identifier corresponding to the media (disc), Data for authentication 734, and Authentication processing unit 735.

Figure 26:
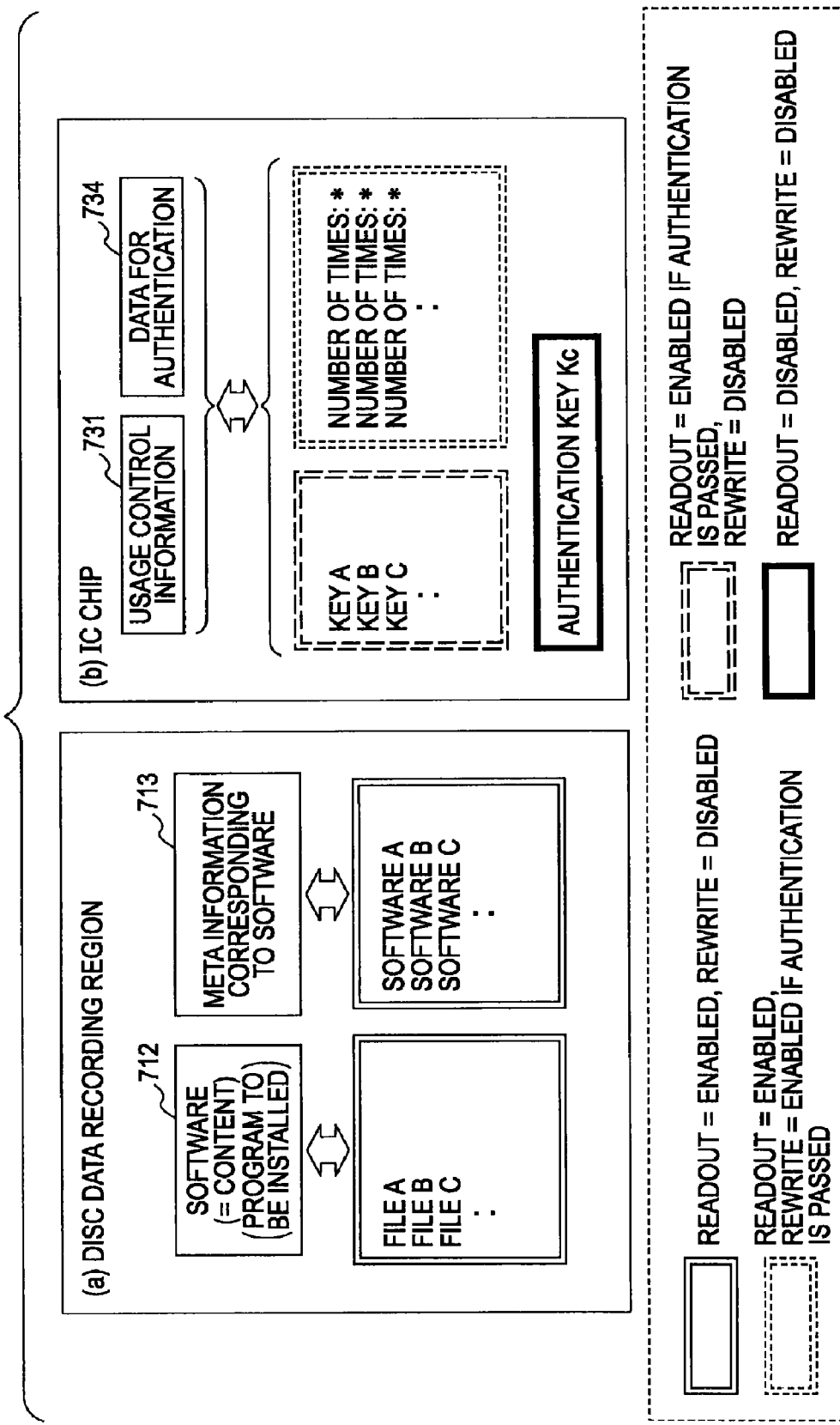
FIG. 26 is a diagram describing a data recording configuration example of a disc or IC chip according to the seventh embodiment of the present invention.

FIG. 26 illustrates a diagram describing the recording mode of each piece of data. In a case where software for installation is provided with a disc, as shown in (a) in FIG. 26, one or multiple software files are recorded in the data recording region of the disc as the software 712 in a non-rewritable state. Further, information including identification information corresponding to each program file (e.g., file name) and so forth is recorded in a non-rewritable state as the meta information corresponding to software 713.

Also, the usage control information 731 including the usage permission information of the software 712, and various types of key information is recorded in the IC chip. Key information (encryption key or decryption key) and usage control information are recorded in the usage control information 731. Further, an authentication key Kc may be recorded in the usage control information 731 as information for mutual authentication processing. The authentication key Kc may be stored in the data for authentication 734.

The key information within the IC chip 730 can be read out externally only in the case where mutual authentication processing has been executed correctly to prevent this key information from being read out by an unauthorized tool to install the corresponding software in an unauthorized manner. Also, correlation with a software file within the data region has to be maintained, so rewriting of the key information is disabled. The usage control information 731 includes information including the usage permission mode of software such that how many times the corresponding software file can be installed from now on.

Figure 27:
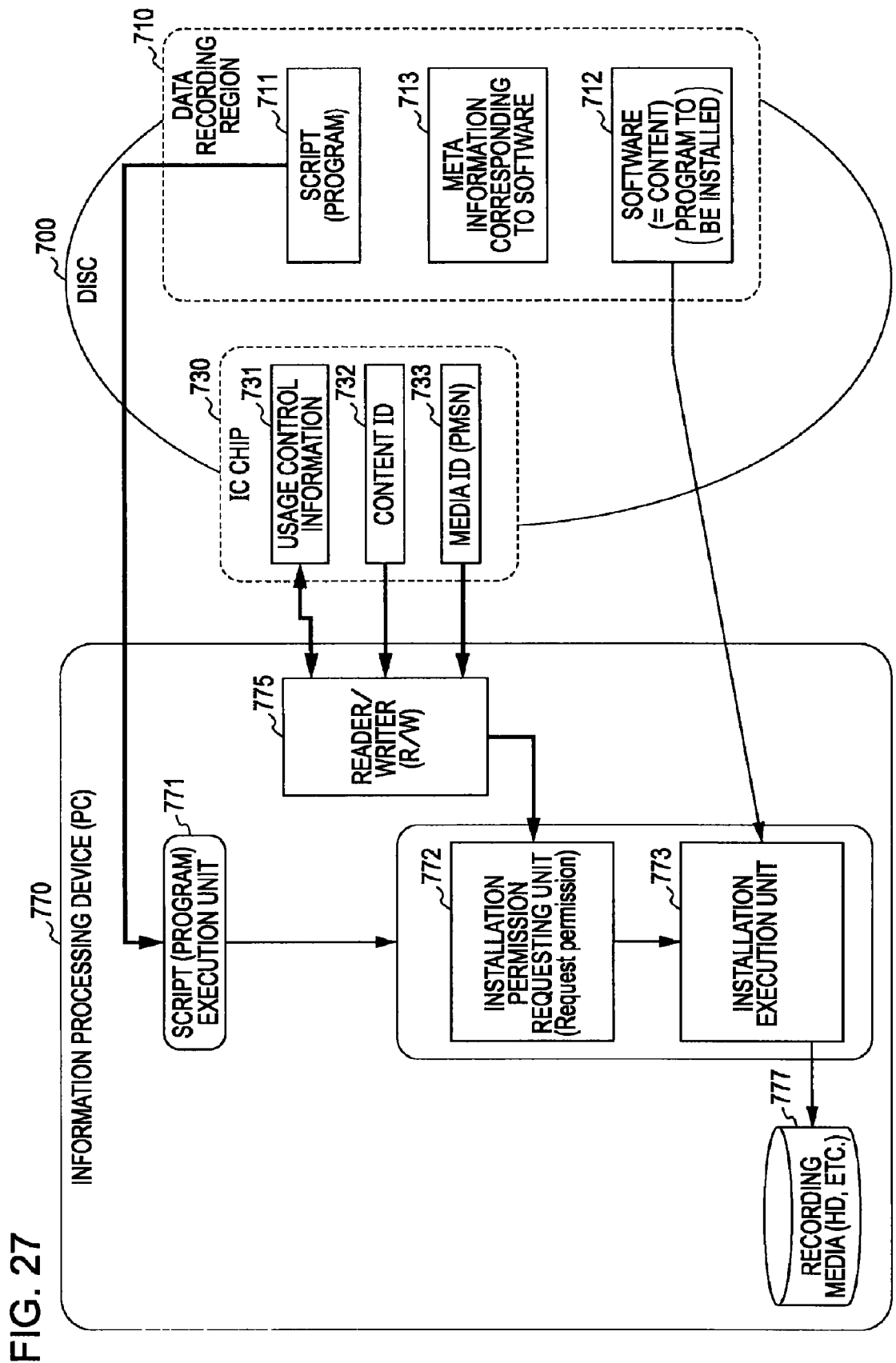
FIG. 27 is a diagram describing a disc recorded software installation processing sequence according to the seventh embodiment of the present invention.

Description will be made regarding a processing example in the case of installing the software 712 of the disc 700 to an information processing device 770 such as a PC or the like, with reference to FIG. 27. FIG. 27 illustrates the information processing device 770 such as a PC or the like for executing installation processing of the software 712 recorded in the disc 700, and the disc 700 in which the software (content) 712 to be installed is stored.

The information processing device 770 executes the script (program) 711 recorded in the disc 700 at a script execution unit 771 to perform installation processing. Installation processing is made up of the processing of an installation permission requesting unit 772, and the processing of an installation execution unit 773.

In response to the installation request from an unshown user input unit, the installation permission requesting unit 772 of the information processing device 770 first reads out the usage control information 731 from the IC chip 730 through a reader/writer (R/W) 775, and further, reads out the content ID 732 corresponding to the software (content) to be installed, and the media ID (PMSN) 733 from the IC chip 730.

The installation permission requesting unit 772 employs the media ID (PMSN) 733 and content ID 732 to confirm whether or not the software (content) determined with the content ID 732 is software (content) of which the installation and usage are permitted with the usage control information 731. Software (content) usage permission information according to the media ID (PMSN) and content ID is recorded in the usage control information 731, so the installation permission requesting unit 772 also determines based on this recorded information whether or not installation there of is permitted. That is to say, the installation permission requesting unit 772 employs the usage control information 731 recorded in the IC chip 730 to perform determination whether or not the installation is permitted.

Note that before the usage control information is referenced, confirmation is made whether or not the usage control information is activated. Regarding whether or not the usage control information is activated is executed as at least one of the following confirmation processes in the same way as with the above-mentioned embodiment.

Confirmation regarding whether or not the flag included in the usage control information is valid, Confirmation regarding whether or not code indicating that the usage control information is valid, and Confirmation regarding whether or not the volume ID is recorded in the IC chip In a case where the validity of the usage control information 731 has been confirmed according to the above-mentioned confirmation process, the usage control information 731 is referenced to confirm that the software (content) determined with the content ID 732 is an installation permitted content. In a case where this confirmation is mage in an affirmable manner, the installation execution unit 773 reads out the software 712 recorded in the data recording region 710 of the disc 700 to execute installation processing.

Note that, with the present processing example as well, the IC chip may be mounted on a portion other than the disc such as a disc case or the like in addition to the arrangement wherein the IC chip is mounted on the disc. Description will be made regarding a specific sequence of software installation procedures in a case where the IC chip is not embedded in the disc but mounted on a disc case, with reference to FIG. 28.

Figure 28:
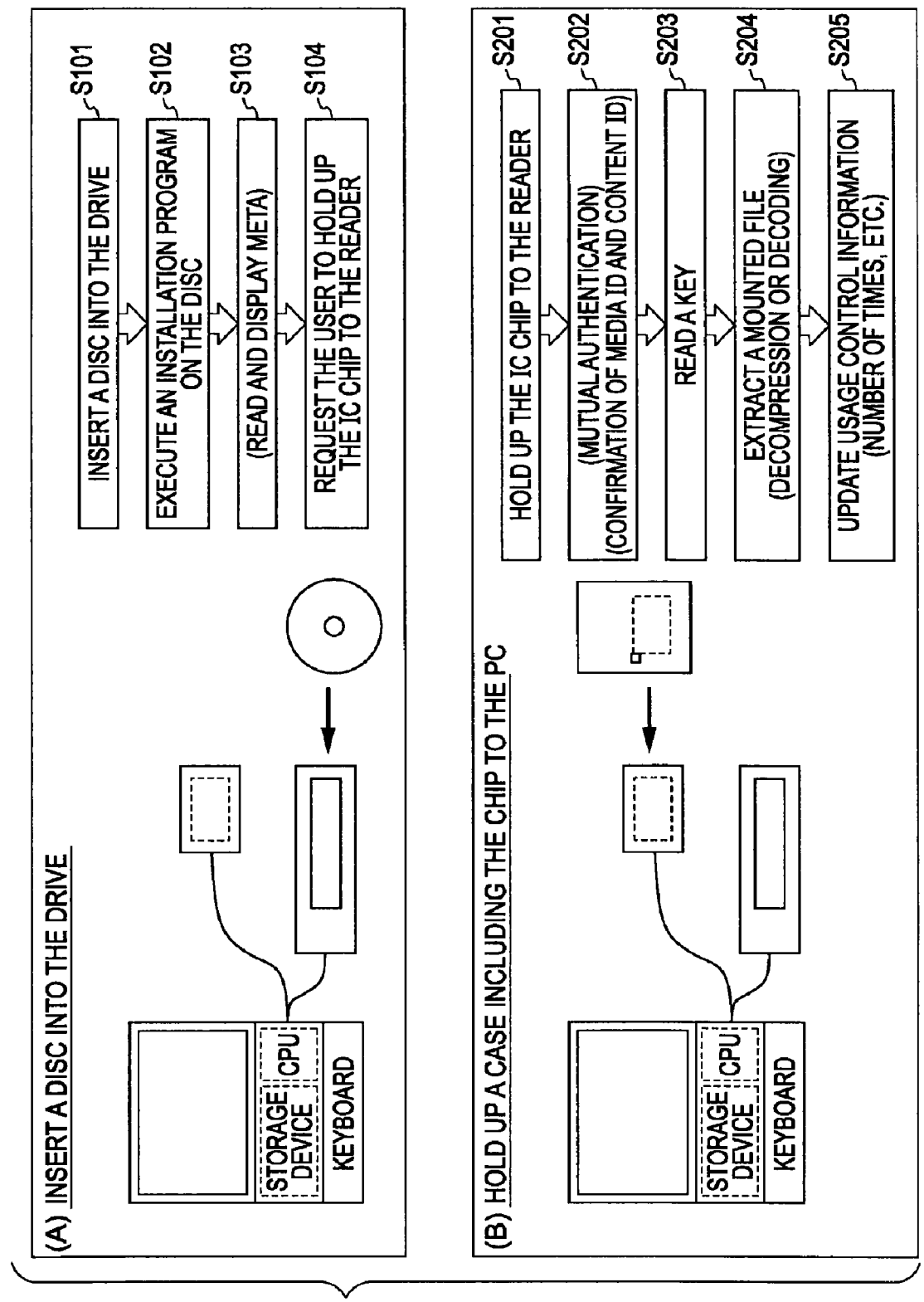
FIG. 28 is a diagram describing a disc recorded software installation processing sequence according to the seventh embodiment of the present invention.

In the case of an arrangement wherein the IC chip is mounted on a disc case, as shown in FIG. 28, the following two processes are executed.

(A) Processing to be executed by the disc being inserted into the drive, and (B) Processing to be executed by the IC chip being held up to the reader/writer of the information processing device such as a PC or the like First, description will be made regarding (A) processing to be executed by the disc being inserted into the drive. This processing is processing in steps S101 through S104 shown in FIG. 28.

First, in step S101, the disc is inserted into the drive, and in step S102 the installation program on the disc is executed. This execution program is the script (program) 711 on the disc 700 shown in FIG. 25.

Next, in step S103, the software meta information on the disc is read out and displayed on the display. Note that this processing is, for example, processing for the case where the user is allowed to select the installation program, and this processing can be omitted, for example, in a case where only one installation program is recorded. Next, in step S104 the user is requested to hold up the IC chip to the reader/writer portion.

The next processing is (B) processing to be executed by the IC chip being held up to the reader/writer of the information processing device such as a PC or the like, and is processing in steps S201 through S205.

First, in step S201 the user holds up the IC chip to the reader/writer of the information processing device such as a PC or the like. According to this processing, in step S202 the authentication processing between the IC chip and information processing device is started.

The processing proceeds to step S203 on condition of success in the authentication. In step S203, the key for decoding of the encrypted software is read out from the usage control information 731. Note that confirmation is made regarding whether or not the usage control information is activated before reading of data from the usage control information. In a case where the usage control information is not activated, the processing ends.

Note that regarding whether or not the usage control information is activated is executed as at least one of the following confirmation processes as described above.

Confirmation regarding whether or not the flag included in the usage control information is valid, Confirmation regarding whether or not code indicating that the usage control information is valid, and Confirmation regarding whether or not the volume ID is recorded in the IC chip In a case where the usage control information is activated, the key is obtained, and in step S204 decoding processing, decompression processing, or the like of the encrypted software is executed, thereby performing installation. Subsequently, in step S205, in a case where updating such as the record of the number of times of installation recorded in the usage control information, or the like has to be performed, updating of the usage control information is executed, and the processing ends.

Next, description will be made regarding an activation processing sequence of the usage control information, with reference to FIGS. 29 and 30.

Figure 29:
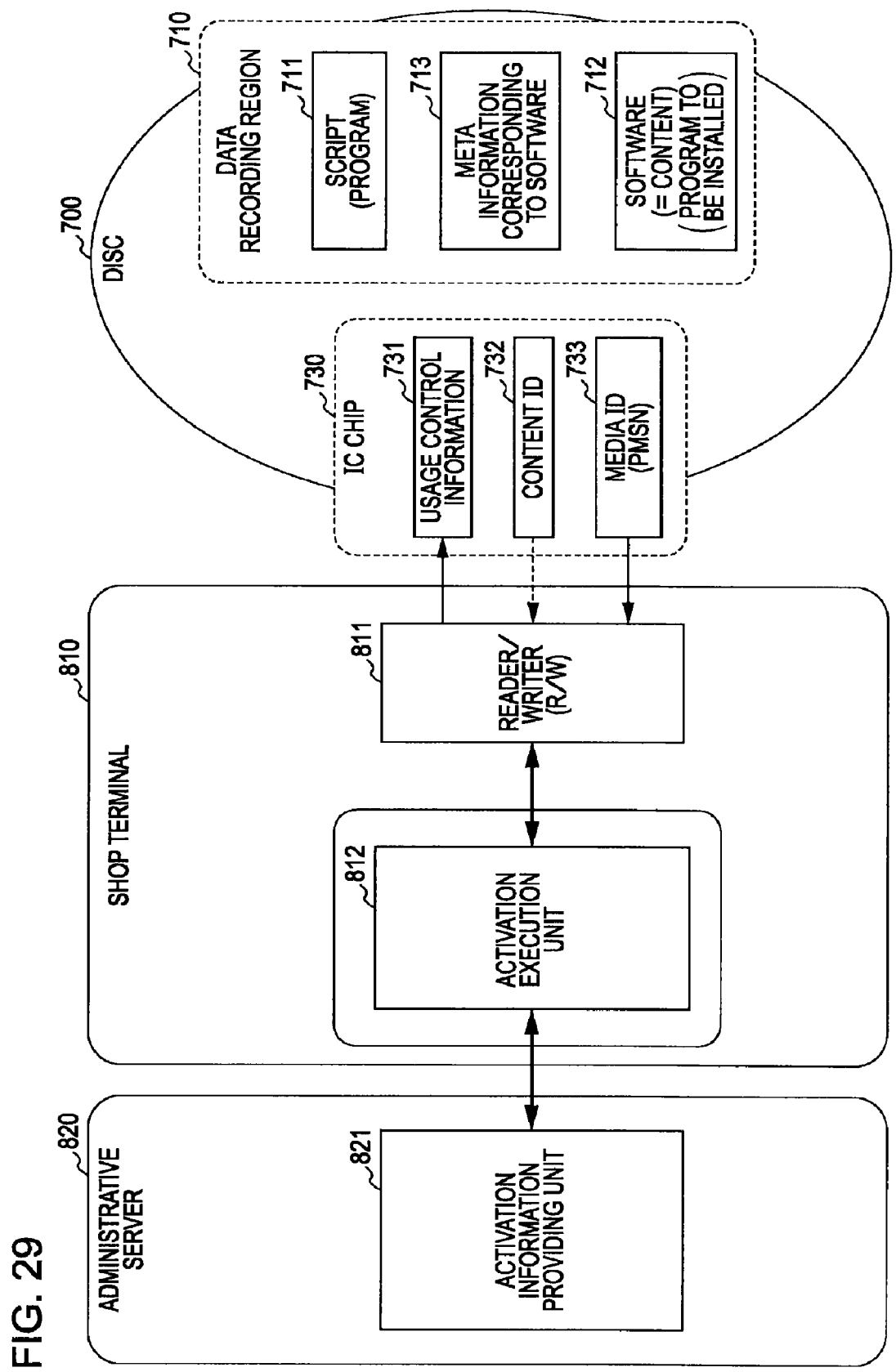
FIG. 29 is a diagram describing a usage control information activation processing sequence as to a disc recorded content according to the seventh embodiment of the present invention.

FIG. 29 is a diagram describing an activation processing example in a case where one of the following processes is executed regarding whether or not the usage control information is activated.

Figure 30:
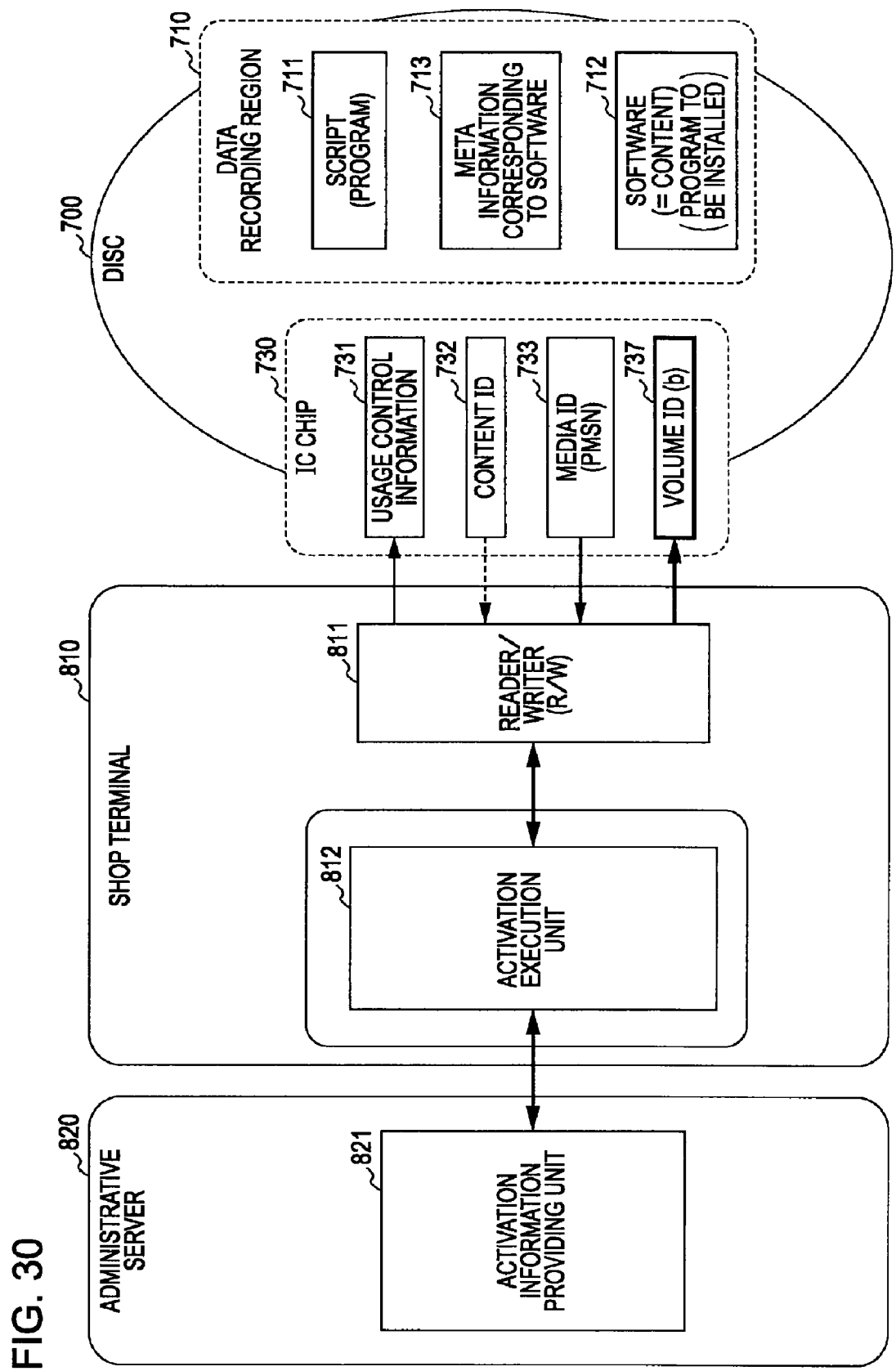
FIG. 30 is a diagram describing a usage control information activation processing sequence as to a disc recorded content according to the seventh embodiment of the present invention.

Confirmation regarding whether or not the flag included in the usage control information is valid, and Confirmation regarding whether or not code indicating that the usage control information is valid FIG. 30 is a diagram describing an activation processing example in a case where the following process is executed regarding whether or not the usage control information is activated.

Confirmation Regarding Whether or not the Volume ID is Recorded in the IC Chip

First, description will be made regarding an activation processing sequence in a case where one of the following processes is executed regarding whether or not the usage control information is activated.

Confirmation regarding whether or not the flag included in the usage control information is valid, and Confirmation regarding whether or not code indicating that the usage control information is valid FIG. 29 illustrates a disc 700 to be provided to a user, a shop terminal 810 provided in a shop for providing the disc 700 to a user, and an administrative server 820 for performing communication with the shop terminal 810 through a network. The shop terminal 810 includes a reader/writer 811 for performing reading/writing of the data of the IC chip 730, and an activation execution unit 812 for executing activation processing. The administrative server 820 includes an activation information providing unit 821 for providing activation permission information and so forth to the shop terminal 810.

The disc 700 has a configuration including the IC chip 730 in which the usage control information 731 is recorded. For example, in a case where the disc is legally purchased, the shop terminal 810 executes the activation processing of the usage control information 731 in the IC chip 730 in the disc 700. Specifically, the shop terminal 810 performs processing for setting the flag set in the configuration data of the usage control information 731 to an active state (setting to a value indicating an activated state), or performs writing of stipulated code, or executes rewriting processing.

This usage control information activation processing may be executed by the shop terminal 810 alone in accordance with a program on the shop terminal 810. Alternatively, an arrangement may be made wherein the disc identification information such as a media ID, and the content identification information such as a content ID are transmitted to the administrative server 820 for performing the usage management of contents, the activation permission information based on confirmation of the identification information at the activation information providing unit 821 of the administrative server 820 is received, thereby performing activation.

Now, let us say that, with regard to processing for determining a disc to be activated, a method is employed such that external information (number described in a disc/case, bar code) is input to the shop terminal 810, or the like. Alternatively, an arrangement may be made wherein the media ID 733 within the IC chip 730 is read out and determined. Note that the media ID 733 is recorded at the time of shipment (at the time of manufacturing) beforehand. Note that in the case of direct sales, or in a case where activation has to be performed at a shop, activation may be performed at the time of manufacturing or shipment.

FIG. 30 is a diagram describing an activation processing sequence in a case where the following process is executed regarding whether or not the usage control information is activated.

Confirmation Regarding Whether or not the Volume ID is Recorded in the IC Chip

FIG. 30 illustrates, as with FIG. 29, a disc 700 to be provided to a user, a shop terminal 810 provided in a shop for providing the disc 700 to a user, and an administrative server 820 for performing communication with the shop terminal 810 through a network. The shop terminal 810 includes a reader/writer 811 for performing reading/writing of the data of the IC chip 730, and an activation execution unit 812 for executing activation processing. The administrative server 820 includes an activation information providing unit 821 for providing activation permission information and so forth to the shop terminal 810.

The disc 700 has a configuration including the IC chip 730 in which the usage control information 731 is recorded. Note that the volume ID(b) 737 to be written in the IC chip 730 in the case where the usage control information is activated is illustrated in the drawing.

For example, in a case where the disc is legally purchased, the shop terminal 810 executes the activation processing of the usage control information 731 in the IC chip 730 in the disc 700. With the present processing example, writing processing of the volume ID(b) 737 is executed.

This usage control information activation processing may be executed by the shop terminal 810 alone in accordance with a program on the shop terminal 810. Alternatively, an arrangement may be made wherein the disc identification information such as a media ID, and the content identification information such as a content ID are transmitted to the administrative server 820 for performing the usage management of contents, the activation permission information based on confirmation of the identification information at the activation information providing unit 821 of the administrative server 820 is received, thereby performing activation.

Now, let us say that, with regard to processing for determining a disc to be activated, a method is employed such that external information (number described in a disc/case, bar code) is input to the shop terminal 810, or the like. Alternatively, an arrangement may be made wherein the media ID 733 within the IC chip 730 is read out and determined. Note that the media ID 733 is recorded at the time of shipment (at the time of manufacturing) beforehand. Note that in the case of direct sales, or in a case where activation has to be performed at a shop, activation may be performed at the time of manufacturing or shipment.

Figure 31:
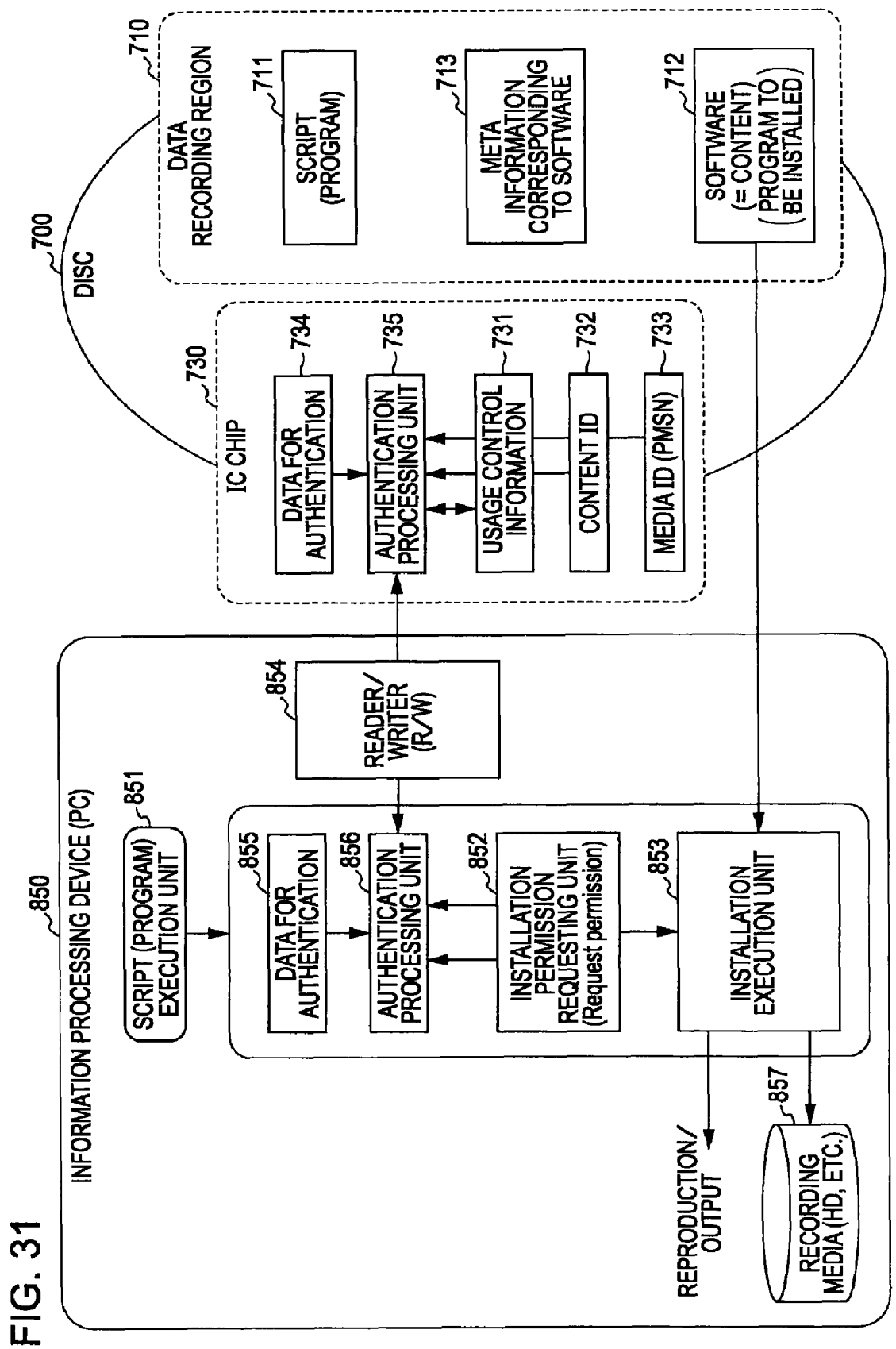
FIG. 31 is a diagram describing a disc recorded software installation processing sequence according to the seventh embodiment of the present invention.

Next, description will be made regarding a processing example for executing authentication between the IC chip and information processing device at the time of installation of software recorded in the disc, with reference to FIG. 31. The information processing device 850 shown in FIG. 31 is, for example, a PC, and performs processing for installing the software 712 stored in the disc 700 in a recording medium 857, for example, such as an HD or the like.

Authentication processing is performed as processing for confirming the validity of the information processing device and disc before execution of this installation processing. The IC chip 730 mounted on the disc 700 includes an authentication processing unit 735 for executing authentication processing, which performs authentication with an authentication processing unit 856 of the information processing device 850.

The information processing device 850 includes an authentication processing unit 856 and data for authentication 855, and has an arrangement wherein authentication to which such data is applied can be performed. The IC chip 730 also includes an authentication processing unit 735 and data for authentication 734, and has an arrangement wherein authentication to which such data is applied can be performed.

The data for authentication 734 including data for authentication, e.g., the public key of the AACS management center, public key and secret key which are set so as to correspond to the IC chip 730, and so forth is recorded in the IC chip 730. Similarly, the data for authentication 855 including the public key of the AACS management center, public key and secret key which are set so as to correspond to the information processing device 850, and so forth is recorded in the information processing device 850. The authentication processing unit 735 within the IC chip 730, and the authentication processing unit 856 of the information processing device 850 employ such data for authentication to perform authentication processing. In this case, the authentication processing unit 856 of the information processing device 850 performs data communication with the authentication processing unit 735 within the IC chip 730 through a reader/writer (R/W) 854.

Following this authentication processing being completed, and validity of both of the information processing device 850 and IC chip 730 (disc 700) being confirmed, further the activation confirmation processing of the usage control information 731, and the installation processing of the software 712 are performed.

Note that the activation confirmation processing of the usage control information 731 is executed at an installation permission requesting unit 852. The activation confirmation processing is executed as at least one of the following confirmation processes, as described above.

Confirmation regarding whether or not the flag included in the usage control information is valid, Confirmation regarding whether or not code indicating that the usage control information is valid, and Confirmation regarding whether or not the volume ID is recorded in the IC chip After the activation confirmation of the usage control information 731 is performed, the installation processing of the software 712 is executed at an installation execution unit 853. Note that, with an arrangement wherein the software 712 is encrypted, and the volume ID is recorded in the IC chip 730, the volume ID stored in the IC chip 730 is employed as encryption key generating information.

As described above, description has been made in detail regarding the present invention with reference to the specific embodiments. Note however, it is clearly evident that one skilled in the art can perform various modifications and alternations of the embodiments without departing from the essence of the present invention. That is to say, the present invention has been disclosed in an exemplification mode, and is not to be interpreted in a limited manner. The Claims should be referred to in order to determine the scope (essence) of the present invention.

The present invention includes, for example, the following arrangement. In a case where the above-mentioned usage control information includes encryption key generating information to be applied to decoding of a disc recorded content, and the usage control information is valid, the usage control information can include the generating information of an encryption key to succeed decoding of a disc recorded content. Note that the encryption key generating information is a volume ID serving as identification information set for every predetermined manufacturing increment of discs. With this arrangement, the activation execution unit for executing the activation processing of the usage control information which is set according to a disc recorded content executes recording processing of the encryption key generating information to be applied to decoding processing of the disc recorded content as writing processing of the activation information of the usage control information.

Also, with the above-mentioned embodiments, various setting examples regarding IC chips have been described, but an arrangement wherein the IC chip is provided integral with the disc, or an arrangement wherein the IC chip is provided separately from the disc may be employed. Further, an arrangement wherein the IC chip is provided integral with a case in which the disc is stored, or an arrangement wherein the IC chip is provided integral with a card correlated with the disc may be employed.

As described above, description has been made in detail regarding the present invention with reference to the specific embodiments. Note however, it is clearly evident that one skilled in the art can perform various modifications and alternations of the embodiments without departing from the essence of the present invention. That is to say, the present invention has been disclosed in an exemplification mode, and is not to be interpreted in a limited manner. The Claims should be referred to in order to determine the scope (essence) of the present invention.

The series of processing described in the present Specification may be executed by hardware, or software, or a compound arrangement of both. In a case of executing the processing by software, a program in which the processing sequence is recorded may be installed for execution in memory within a computer embedded in dedicated hardware, or the program may be installed for execution in a general-purpose computer which can execute various types of processing. For example, the program may be recorded in a recording medium beforehand. The program may be installed in a computer from the recording medium, and also may be received through a network such as a LAN (Local Area Network) or the Internet, and installed in a recording medium such as a built-in hard disk or the like.

Note that the various types of processing described in the present Specification may be executed not only in time-sequence following the order laid forth but also in parallel or individually according to the processing capabilities of a device for executing the processing or as appropriate. Also, with the present Specification, the term "system" represents a logical group arrangement of multiple devices, which is not restricted to an arrangement wherein the devices each having an individual configuration are housed in the same casing.

The present application contains subject matter related to that disclosed in Japanese Priority Patent Application JP 2008-121907 filed in the Japan Patent Office on May 8, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device comprising:
a processor programmed to
read, from an IC chip of a disc, a content ID identifying encrypted content of the disc or a media ID identifying information unique to the disc, and a volume ID of the disc serving as identification information for every predetermined manufacturing increment of said disc;
determine a content of the disc to be used based on the content ID or media ID,
read, from the IC chip, usage control information corresponding to the content determined based on the content ID or media ID,
confirm the validity of said usage control information by determining whether data indicating the validity of usage control information is recorded in said IC chip, the data indicating the validity of said usage control information being the volume ID, and
perform usage of said content in accordance with a usage permission mode recorded in said usage control information when the validity of said usage control information is confirmed.

2. The information processing device according to claim 1, wherein, to execute confirmation of the validity of the usage control information, said processor determines whether a flag indicating validity is set to said usage control information or whether a code indicating that said usage control information is valid is recorded in said usage control information.

3. The information processing device according to claim 1, wherein data indicating the validity of said usage control information is generating information of an encryption key to be applied to decoding processing of said content.

4. The information processing device according to claim 1, wherein said usage control information includes encryption key generating information to be applied to decoding of said disc recorded content, and when said usage control information is valid, said usage control information includes generating information of an encryption key to succeed at decoding of said content.

5. The information processing device according to claim 4, wherein the generating information of said encryption key is the volume ID.

6. The information processing device according to claim 5, wherein the processor
reads both the content ID and the media ID,
determines a content of the disc to be used based on the content ID and media ID, and
reads, from the IC chip, usage control information corresponding to the content determined based on the content ID and media ID.

7. The information processing device according to claim 4, wherein the processor
reads both the content ID and the media ID,
determines a content of the disc to be used based on the content ID and media ID, and
reads, from the IC chip, usage control information corresponding to the content determined based on the content ID and media ID.

8. The information processing device according to claim 1, wherein the processor is further programmed to
execute authentication processing by executing usage processing of recorded data of said IC chip or disc when authentication processing is successful.

9. The information processing device according to claim 8, wherein said processor performs confirmation processing of the validity of said usage control information when said authentication processing is successful.

10. The information processing device according to claim 1, wherein said processor executes validity confirmation processing of said usage control information in accordance with a program stored in said content.

11. The information processing device according to claim 10, wherein the processor is further programmed to
execute signature verification set in a program stored in said content;
wherein said processor executes validity confirmation processing of said usage control information in accordance with said program when the validity of said program has been confirmed by said signature verification.

12. The information processing device according to claim 1, wherein said content is software to be installed in said information processing device, and said usage control information is usage control information corresponding to said software;
and wherein said processor performs installation of said software in accordance with a usage permission mode recorded in said usage control information on condition that the validity of said usage control information has been confirmed.

13. The information processing device according to claim 1, wherein said IC chip is configured integrally with said disc.

14. The information processing device according to claim 1, wherein said IC chip is configured separately from said disc.

15. The information processing device according to claim 1, wherein the volume ID is an identifier serving as a manufacturing serial number of the disc.

16. The information processing device according to claim 1, wherein the processor
reads both the content ID and the media ID,
determines a content of the disc to be used based on the content ID and media ID, and
reads, from the IC chip, usage control information corresponding to the content determined based on the content ID and media ID.

17. An IC chip comprising:
a memory that stores
usage control information corresponding to a content recorded in a disc,
a content ID identifying encrypted content of the disk or a media ID identifying information unique to the disc, and a volume ID of the disc serving as identification information for every predetermined, and
validity determination data for determining the validity of said usage control information by determining whether data indicating the validity of usage control information is recorded in said IC chip, the data indicating the validity of said usage control information being the volume ID,
wherein
an information process devices reads the content ID or media ID,
determines a content to be used based on the content ID or and media ID,
reads usage control information corresponding to content of the disc determined based on the content ID or media ID, and
usage of the content in accordance with said usage control information is performed on condition that at the time of employing the content with the information processing device, determination has been made that said usage control information has validity by executing reading of validity determination data from said IC chip, and executing validity determination processing.

18. A non-transitory computer-readable medium storing computer readable instructions thereon that when executed by a computer cause the computer to perform a method comprising:
reading, from an IC chip, a content ID identifying encrypted content of the disc or a media ID identifying information unique to the disc, and a volume ID of the disc serving as identification information for every predetermined;
determining a content of the disc to be used based on the content ID or media ID;
reading, from the IC chip of a disc, usage control information corresponding to content determined based on the content ID or media ID;
confirming the validity of said usage control information by determining whether data indicating the validity of usage control information is recorded in said IC chip, the data indicating the validity of said usage control information being the volume ID; and
performing usage of said content in accordance with a usage permission mode recorded in said usage control information when the validity of said usage control information has been confirmed.

19. An information processing method implemented by an information processing device, comprising:
reading, from an IC chip, a content ID identifying encrypted content of the disc or a media ID identifying information unique to the disc, and a volume ID of the disc serving as identification information for every predetermined, and
determining a content of the disc to be used based on the content ID or media ID, reading, from the IC chip of a disc, usage control information corresponding to content determined based on the content ID or media ID, and
confirming the validity of said usage control information by determining whether data indicating the validity of usage control information is recorded in said IC chip, the data indicating the validity of said usage control information being the volume ID; and
performing usage of said content in accordance with a usage permission mode recorded in said usage control information when the validity of said usage control information has been confirmed in said usage permission requesting step.

* * * * *